(12) United States Patent
Gandhi et al.

(10) Patent No.: US 7,085,814 B1
(45) Date of Patent: *Aug. 1, 2006

(54) DATA DRIVEN REMOTE DEVICE CONTROL MODEL WITH GENERAL PROGRAMMING INTERFACE-TO-NETWORK MESSAGING ADAPTER

(75) Inventors: Amar S. Gandhi, Redmond, WA (US); Andrew J. Layman, Bellevue, WA (US); Daniel R. Weisman, Kirkland, WA (US); Shyamalan Pather, Redmond, WA (US); William Michael Zintel, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 932 days.

This patent is subject to a terminal disclaimer.

(21) Appl. No.: 09/706,446

(22) Filed: Nov. 2, 2000

Related U.S. Application Data

(63) Continuation-in-part of application No. 09/432,854, filed on Nov. 2, 1999.

(60) Provisional application No. 60/139,137, filed on Jun. 11, 1999, provisional application No. 60/160,235, filed on Oct. 18, 1999.

(51) Int. Cl.
*G06F 15/16* (2006.01)
(52) U.S. Cl. ..................... 709/208; 719/328
(58) Field of Classification Search ............ 709/208, 709/246, 203; 719/328, 329; 345/746
See application file for complete search history.

(56) References Cited

U.S. PATENT DOCUMENTS

| | | | |
|---|---|---|---|
| 5,394,556 A | 2/1995 | Oprescu | |
| 5,491,800 A | 2/1996 | Goldsmith et al. | |
| 5,546,574 A * | 8/1996 | Grosskopf et al. | 707/201 |
| 5,559,967 A | 9/1996 | Oprescu et al. | |
| 5,627,964 A | 5/1997 | Reynolds et al. | |

(Continued)

FOREIGN PATENT DOCUMENTS

WO 99/35856 7/1999

(Continued)

OTHER PUBLICATIONS

HOMEPnP Specification Version 1.0, Copyright 1999.*

(Continued)

*Primary Examiner*—William C. Vaughn, Jr.
(74) *Attorney, Agent, or Firm*—Klarquist Spartkan, LLP

(57) ABSTRACT

A general programmatic interface-to-network messaging adapter exposes a suitable object integration interface or application programming interface to applications on a controller device and sends network data messages to invoke services or query status of a controlled device. The adapter maps application calls to the interface into network data messages according to service protocols of the controlled device. The general adapter provides the interface suitable to any specific service of a controlled device based on a data description of the interface, and converts the application calls to network data messages based on a data description of a protocol and format for network data messages to interact with the specific service. Once the interface/messaging description is obtained, applications on the controller device can programmatically interact with the adapter, and the adapter then handles appropriate message exchanges with the service of the controlled device. The general adapter allows controller device applications to be written using object-oriented programming, while avoiding code download.

21 Claims, 37 Drawing Sheets

U.S. PATENT DOCUMENTS

| | | | |
|---|---|---|---|
| 5,748,980 A | 5/1998 | Lipe et al. | |
| 5,764,930 A | 6/1998 | Staats | |
| 5,787,246 A | 7/1998 | Lichtman et al. | |
| 5,787,259 A | 7/1998 | Haroun et al. | |
| 5,793,979 A | 8/1998 | Lichtman et al. | |
| 5,809,331 A | 9/1998 | Staats et al. | |
| 5,819,092 A * | 10/1998 | Ferguson et al. | 717/113 |
| 5,881,230 A | 3/1999 | Christensen et al. | |
| 5,903,728 A | 5/1999 | Semenzato | |
| 5,903,894 A | 5/1999 | Reneris | |
| 5,938,752 A | 8/1999 | Leung et al. | |
| 5,956,487 A * | 9/1999 | Venkatraman et al. | 709/218 |
| 5,960,439 A * | 9/1999 | Hamner et al. | 707/103 R |
| 5,987,135 A * | 11/1999 | Johnson et al. | 709/224 |
| 6,085,236 A * | 7/2000 | Lea | 709/220 |
| 6,101,499 A | 8/2000 | Ford et al. | |
| 6,115,545 A * | 9/2000 | Mellquist | 709/220 |
| 6,122,362 A * | 9/2000 | Smith et al. | 379/230 |
| 6,130,892 A * | 10/2000 | Short et al. | 370/401 |
| 6,185,613 B1* | 2/2001 | Lawson et al. | 709/224 |
| 6,230,307 B1* | 5/2001 | Davis et al. | 716/16 |
| 6,233,611 B1* | 5/2001 | Ludtke et al. | 709/223 |
| 6,282,568 B1* | 8/2001 | Sondur et al. | 709/223 |
| 6,334,178 B1* | 12/2001 | Cannon et al. | 712/28 |
| 6,370,141 B1* | 4/2002 | Giordano et al. | 370/386 |
| 6,389,464 B1* | 5/2002 | Krishnamurthy et al. | 709/220 |
| 6,401,132 B1* | 6/2002 | Bellwood et al. | 709/246 |
| 6,405,310 B1* | 6/2002 | Simpson | 713/1 |
| 6,405,366 B1* | 6/2002 | Lorenz et al. | 717/107 |
| 6,430,570 B1* | 8/2002 | Judge et al. | 707/103 R |
| 6,457,066 B1* | 9/2002 | Mein et al. | 719/330 |
| 6,480,860 B1* | 11/2002 | Monday | 707/102 |
| 6,496,860 B1* | 12/2002 | Ludtke et al. | 709/223 |
| 6,529,936 B1* | 3/2003 | Mayo et al. | 709/202 |
| 6,546,419 B1* | 4/2003 | Humpleman et al. | 709/223 |
| 6,658,464 B1* | 12/2003 | Reisman | 709/219 |

FOREIGN PATENT DOCUMENTS

| | | | |
|---|---|---|---|
| WO | WO 99/35856 | * | 7/1999 |

OTHER PUBLICATIONS

White Paper, "HAVi, the A/V digital network revolution," *HAVi Organization* pp. 1-7 (1999).

"Specification of the Home Audio/Video Interoperability (HAVi) Architecture," *The HAVi Specification, Version 1.0* (Jan. 18, 2000).

Anderson, "FireWire System Architecture: Second Edition, IEEE 1394a", chapters 1-4 (1999).

Technical White Paper, "Jini Architectural Overview," *Sun Microsystems, Inc.* (1999).

"Salutation Consortium Frequently Asked Questions," *The Salutation Consortium*, pp. 1-6 (prior to filing date).

"Salutation Architecture Specification (Part-1), Version 2.0c," *The Salutation Consortium* (Jul. 1, 1999).

"How it works," *Thalia*, pp. 1-3 (prior to filing date).

"Sun Microsystems and Thalia Products Inc. to Collaborate to Co-Develop Network Software and Protocols for the Home, Results to Make Networked Appliances for the Home a Reality," *Sunbeam Corporation*, pp. 1-2 (2000).

"Sunbeam Joins Microsoft in the Universal Plug and Play Forum to Establish A 'Universal' Smart Appliance Technology Standard," *Sunbeam Corporation*, pp. 1-2 (2000).

"Time For Smart Talk Is Over, Sunbeam Trumps Small Appliance Industry with Smart Appliance Debut," *Sunbeam Corporation*, pp. 1-4 (2000).

"Lonworks Core Technology," *Echelon Corporation*, pp. 1-2 (2000).

"Underlying Protocol of Echelon's LONWORKS® Networks Adopted as New ANSI Standard, Free Reference Implementation Available to Developers," *Echelon Corporation*, pp. 1-2 (2000).

Handley et al., "SIP: Session Initiation Protocol," *The Internet Society*, pp. 1-130 (Aug. 6, 2000).

Rosenberg et al., "SIP Extensions for Instant Messaging," *Internet Engineering Task Force*, pp. 1-30 (Jun. 15, 2000).

Rosenberg et al., "SIP Extensions for Presence," *Internet Engineering Task Force*, pp. 1-77 (Jun. 15, 2000).

Tsang et al., "Requirements for Networked Appliances: Wide-Area Access, Control, and Interworking," *Internet Engineering Task Force*, pp. 1-9 (Sep. 2000).

Tsang et al., "SIP Extensions for Communicating with Networked Appliances," *Internet Engineering Task Force*, pp. 1-9 (Nov. 2000).

Moyer et al., "Framework Draft for Networked Appliances using the Session Initiation Protocol," *Internet Engineering Task Force*, pp. 1-31 (Nov. 2000).

Marples, "Naming and Accessing Network Appliances using extensions to the Session Initial Protocol," *SIP for Toaster*, Telcordia Technologies (2000).

"Networked Appliance," *AR Greenhouse*, Telcordia Technologies, pp. 1-2 (Dec. 15, 2000).

Moyer et al., "SIP for Light Bulbs, Using SIP to Support Communication with Networked Appliances," Telcordia Technologies (Aug. 2, 2000).

Bennett et al., "Integrating Presence with Multi-media Communications," *White Paper*, Dynamicsoft., pp. 1-18 (2000).

Rosenberg et al., "An Application Server Architecture for Communications Services," *White Paper*, Dynamicsoft., pp. 1-13 (2000).

"EIB Technology," EIB (2000).

Freeman et al., "JavaSpaces™ Principles, Patterns, and Practice," Addison-Wesley Longman, Inc., Reading, Massachusetts (1999, Sun Microsystems, Inc.).

Arnold et al., "The Jini™ Specification," Addison-Wesley Longman, Inc., Reading, Massachusetts (1999, Sun Microsystems, Inc.).

Edwards, "Core Jini™, Second Edition," Prentice Hall PTR, Upper Saddle River, New Jersey (2001).

"Home Plug & Play™: CAL-based Interoperability for Home Systems," HomePNP™Specification, Version 1.0, pp. 1-111, (Apr. 9, 1998).

* cited by examiner

FIG. 14

```xml
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn:schemas-upnp-org:device:deviceType:v</deviceType>
    <friendlyName>short user-friendly title</friendlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
      <icon>
        <mimetype>image/format</mimetype>
        <width>horizontal pixels</width>
        <height>vertical pixels</height>
        <depth>color depth</depth>
        <url>URL to icon</url>
      </icon>
      XML to declare other icons, if any, go here
    </iconList>
    <serviceList>
      <service>
        <serviceType>urn:schemas-upnp-org:service:serviceType:v</serviceType>
        <serviceId>urn:upnp-org:serviceId:serviceID</serviceId>
        <SCPDURL>URL to service description</SCPDURL>
        <controlURL>URL for control</controlURL>
        <eventSubURL>URL for eventing</eventSubURL>
      </service>
      Declarations for other services (if any) go here
    </serviceList>
    <deviceList>
      Description of embedded devices (if any) go here
    </deviceList>
    <presentationURL>URL for presentation</presentationURL>
  </device>
</root>
```

FIG. 15

```
<device>
  ...
  <iconList>
    <icon>
       <size>16</size>
       <color>0</color>
       <depth>8</depth>
       <imageType>PNG</imageType>
       <image>"http://device.local/iconpath/icon16bw.png"</image>
    </icon>
    <icon>
       <size>32</size>
       <color>0</color>
       <depth>8</depth>
       <imageType>PNG</imageType>
       <image>"http://device.local/iconpath/icon32bw.png"</image>
    </icon>
    <icon>
       <size>48</size>
       <color>0</color>
       <depth>8</depth>
       <imageType>PNG</imageType>
       <image>"http://device.local/iconpath/icon48bw.png"</image>
    </icon>
    <icon>
       <size>16</size>
       <color>1</color>
       <depth>8</depth>
       <imageType>PNG</imageType>
       <image>"http://device.local/iconpath/icon16c.png"</image>
    </icon><device>
    <icon>
       <size>32</size>
       <color>0</color>
       <depth>8</depth>
       <imageType>PNG</imageType>
       <image>"http://device.local/iconpath/icon32c.png"</image>
    </icon>
    <icon>
       <size>48</size>
       <color>0</color>
       <depth>8</depth>
       <imageType>PNG</imageType>
       <image>"http://device.local/iconpath/icon48c.png"</image>
    </icon>
    ...
  </iconList>
  ...
</device>
```

FIG. 16

```xml
<?xml version="1.0"?>
<scpd xmlns="urn:schemas-upnp-org:service-1-0">
 <specVersion>
  <major>1</major>
  <minor>0</minor>
 </specVersion>
 <actionList>
  <action>
   <name>actionName</name>
   <argumentList>
    <argument>
     <name>formalParameterName</name>
     <direction>in xor out</direction>
     <retval />
     <relatedStateVariable>stateVariableName</relatedStateVariable>
    </argument>
    Declarations for other arguments (if any) go here
   </argumentList>
  </action>
  Declarations for other actions (if any) go here
 </actionList>
 <serviceStateTable>
  <stateVariable sendEvents="yes">
   <name>variableName</name>
   <dataType>variable data type</dataType>
   <defaultValue>default value</defaultValue>
   <allowedValueList>
    <allowedValue>enumerated value</allowedValue>
    Other allowed values (if any) go here
   </allowedValueList>
  </stateVariable>
  <stateVariable sendEvents="yes">
   <name>variableName</name>
   <dataType>variable data type</dataType>
   <defaultValue>default value</defaultValue>
   <allowedValueRange>
    <minimum>minimum value</minimum>
    <maximum>maximum value</maximum>
    <step>increment value</step>
   </allowedValueRange>
  </stateVariable>
  Declarations for other state variables (if any) go here
 </serviceStateTable>
</scpd>
```

FIG. 17

```xml
<?xml version="1.0"?>
<Schema name="upnp_scpdl"
  xmlns="urn:schemas-microsoft-com:xml-data"
  xmlns:dt="urn:schemas-microsoft-com:datatypes">

<!-- Common Elements and Attributes -->

<ElementType name="name" content="textOnly" dt:type="string" />

<!-- Service State Table -->

<ElementType name="minimum" content="textOnly" dt:type="number" />
  <ElementType name="maximum" content="textOnly" dt:type="number" />
  <ElementType name="step" content="textOnly" dt:type="number" />

<ElementType name="allowedValueRange" content="eltOnly" model="closed">
    <element type="minimum" />
    <element type="maximum" />
    <element type="step" minOccurs="0" />
  </ElementType>

<ElementType name="allowedValue" content="textOnly" />

<ElementType name="allowedValueList" content="eltOnly" model="closed">
    <element type="allowedValue" minOccurs="1" maxOccurs="*" />
  </ElementType>

<ElementType name="dataType" content="textOnly" dt:type="string" />

<ElementType name="stateVariable" content="eltOnly" model="closed">
    <element type="name" />
...
```

FIG. 18

```
...
    <element type="dataType" />

<group minOccurs="0" maxOccurs="1" order="one">
      <element type="allowedValueRange" />
      <element type="allowedValueList" />
    </group>
  </ElementType>

<ElementType name="deviceStateTable" content="eltOnly" model="closed">
  <element type="stateVariable" minOccurs="1" maxOccurs="*" />
</ElementType>

<!-- Action List -->

<ElementType name="relatedStateVariable" content="textOnly" dt:type="string" />

<ElementType name="argument" content="eltOnly" model="closed">
  <element type="name" />
  <element type="relatedStateVariable" />
</ElementType>

<ElementType name="action" content="eltOnly" model="closed">
  <element type="name" />
  <element type="argument" minOccurs="0" maxOccurs="*" />
</ElementType>

<ElementType name="actionList" content="eltOnly" model="closed">
  <element type="action" minOccurs="0" maxOccurs="*" />
</ElementType>

<!-- Root Element -->

<ElementType name="dcpd" content="eltOnly" model="closed">
  <element type="deviceStateTable" />
  <element type="actionList" />
</ElementType>
</Schema>
```

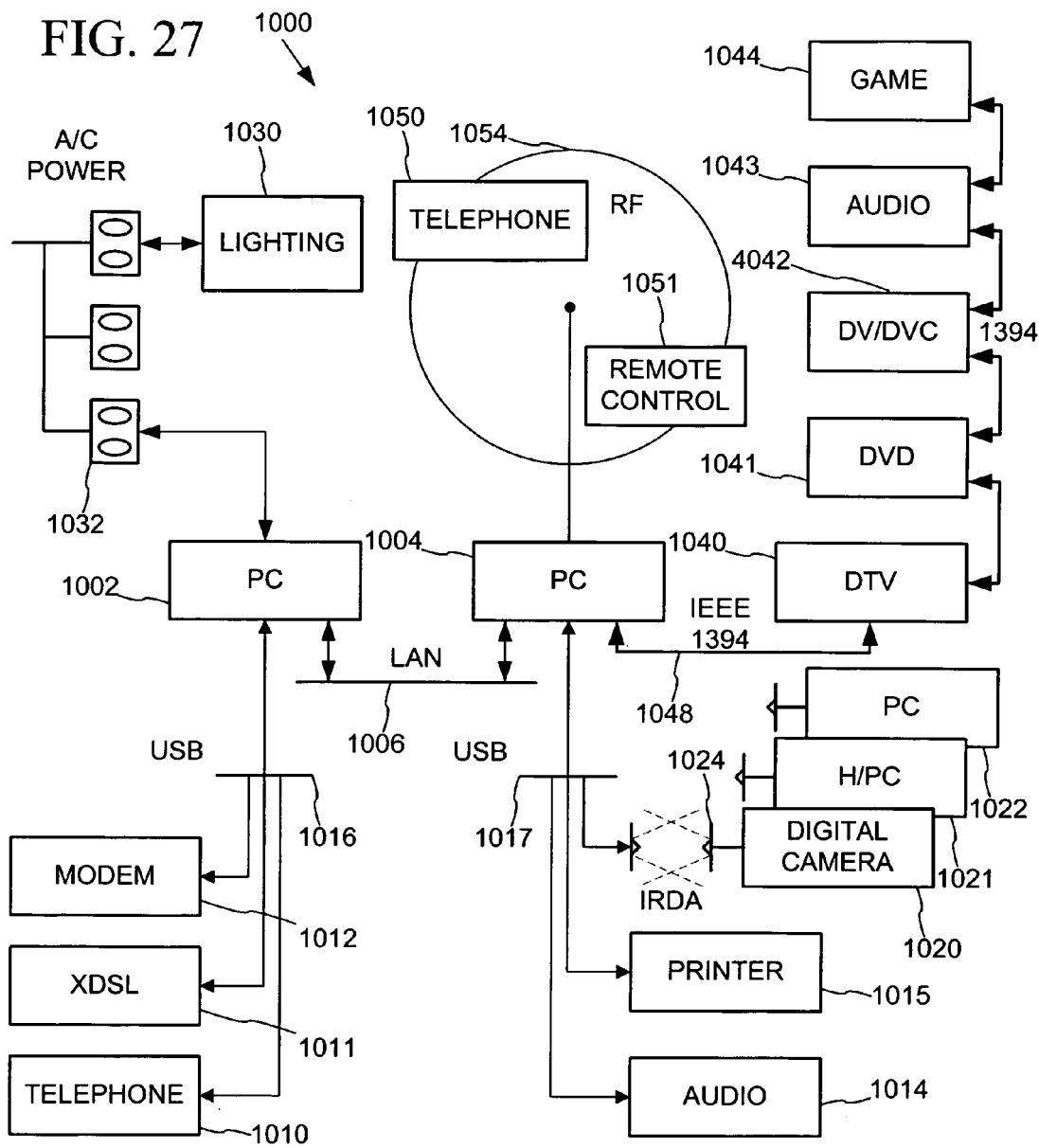

FIG. 28

```
[
object,
uuid(<foo>),
dual,
helpstring("IUPNPDevice interface"),
pointer_default(unique)
]
    interface IUPNPDevice : IDispatch
{

[propget, id(DISPID_UPNPDEVICE_DESCRIPTIONDOCUMENT),
      helpstring("returns the document from which the properties of this device are being read")]
    HRESULT DescriptionDocument([restricted, hidden, out, retval]
IUPNPDescriptionDocument ** ppuddDocument);
        purpose: returns the document from which the properties of this device are being read.
        parameters: ppuddDocument, A reference to the description document object from which data about the device is being read.  This must be freed when no longer needed.
        return values: S_OK, ppuddDocument is a refernce to the device's description document.

[propget, id(DISPID_UPNPDEVICE_ISROOTDEVICE),
      helpstring("denotes whether the physical location information of this device can be set")]
    HRESULT IsRootDevice([out, retval] VARIANT_BOOL * pvarb);
        parameters: pvarb, the address of a VARIANT_BOOL that will receive the value of VARIANT_TRUE if the current device is the topmost device in the device tree, and will receive the value of VARIANT_FALSE otherwise.
        return values: S_OK, varb is set to the appropriate value
        note: if a device is a root device, calls RootDevice() or ParentDevice() will return NULL

[propget, id(DISPID_UPNPDEVICE_ROOT),
      helpstring("returns the top device in the device tree")]
    HRESULT RootDevice([out, retval] IUPNPDevice ** ppudDeviceRoot);
        purpose: returns the top device in the device tree
    ...
```

FIG. 29

...
    parameters: ppudDeviceRoot, On return, this refers to the "root" device of the current device tree. The root device is the topmost parent of the current device. If the current device is the root device this method will set *ppudDeviceRoot to null, and return S_FALSE.
    return values: S_OK, *ppudDeviceRoot contains a reference to the root device. S_FALSE, the current device is the root device. *ppudDeviceRoot is null.

[propget, id(DISPID_UPNPDEVICE_PARENT),
   helpstring("returns the parent of the current device")]
  HRESULT ParentDevice([out, retval] IUPNPDevice ** ppudDeviceParent);
    parameters: ppudDeviceParent, On return, if the device has a parent, this is the address of a IUPNPDevice object which can describe the parent. This must be released when no longer needed. If the device has no parent (it is a "root" device), than this value will be set to null.
    return values: S_OK, ppudDeviceParent contains a reference to the device's parent. S_FALSE, the current device is the root device, which has no parent. *ppudDeviceRoot is null.

[propget, id(DISPID_UPNPDEVICE_CHILDREN),
   helpstring("returns a collection of the children of the current device")]
  HRESULT Children([out, retval] IUPNPDevices ** ppudChildren);
    parameters: ppudChildren, On return, this is the address of a newly-created IUPNPDevices collection that can enumerate this device's children. This must be released when no longer needed. If the device has no children, this method will return a collection object with a length of zero.
    return values: S_OK, ppudChildren contains a list of the device's children.

[propget, id(DISPID_UPNPDEVICE_UDN),
   helpstring("returns the UDN of the device")]
  HRESULT UniqueDeviceName([out, retval] BSTR * pbstrUDN);
    parameters: pbstrUDN, On return, this contains the address of a newly-allocated string which contains the device's Unique Device Name (UDN). The UDN is globally unique across all devices - no two devices will ever have the same UDN. This value must be freed when no longer needed.
    return values: S_OK    pbstrUDN contains the UDN of the device
...

FIG. 30

```
...
    [propget, id(DISPID_UPNPDEVICE_DISPLAYNAME),
      helpstring("returns the (optional) display name of the device")]
    HRESULT DisplayName([out, retval] BSTR * pbstrDisplayName);
        parameters: pbstrDisplayName, On return, this contains the address of the
device's display name. This value must be freed when no longer needed. If the
device does not specify a display name, this parameter will be set to null.
        return values: S_OK, bstrDisplayName contains the display name of the
device. pbstrDisplayName must be freed. S_FALSE, the device did not specify a
display name. *pbstrDisplayName is set to null.
        note: it is possible for multiple devices to have the same display name.
Applications should use UniqueDeviceName() to determine if two device objects
refer to the same device.

[propget, id(DISPID_UPNPDEVICE_CANSETDISPLAYNAME),
      helpstring("denotes whether the physical location information of this device can
be set")]
    HRESULT CanSetDisplayName([out, retval] VARIANT_BOOL * pvarb);
        parameters: pvarb, the address of a VARIANT_BOOL. This is true (!=0) on
return when the device's display name can be set (via SetDisplayName)
        return values: S_OK     varb is set to the appropriate value

[id(DISPID_UPNPDEVICE_SETDISPLAYNAME),
      helpstring("sets the display name on the device")]
    HRESULT SetDisplayName([in] BSTR bstrDisplayName);
        parameters: bstrDisplayName, the value to set the device's display name to.
        return values: S_OK, varb is set to the appropriate value.
        note: On success, this method sets the display name used by a device.
Note that this method changes the display name on the device itself, not simply on
the local object. This will block while the name is being set.
Additionally, this change will be made on the device alone, and will not be reflected
in the current device object. After a successful call to this method, DisplayName
will continue to return the 'old' value). To read the device's current name, the caller
must re-load the device's description.

[propget, id(DISPID_UPNPDEVICE_DEVICETYPE),
    ...
```

helpstring("returns the device type URI")]
    HRESULT Type([out, retval] BSTR * pbstrType);
        parameters: pbstrType, On return, this contains the address of a newly-allocated string containing the device's type URI. This value must be freed when no longer needed.
        return values: S_OK, bstrType contains the type URI of the device, and must be freed when no longer needed.

[propget, id(DISPID_UPNPDEVICE_SERVICES),
   helpstring("returns the collection of services exposed by the device")]
    HRESULT Services([out, retval] IUPNPServices ** ppusServices);
        parameters: ppusServices, On return, this is the address of a newly-created IUPNPServices collection that can enumerate the services exposed by the device. This must be released when no longer needed. If the device exposes no services, this method will return a collection object with a length of zero.
        return values: S_OK, pusServices contains a list of the device's children.

[propget, id(DISPID_UPNPDEVICE_SERVICEIDENTIFIER),
   helpstring("returns the (optional) service identifier of the device")]
    HRESULT ServiceIdentifier([out, retval] BSTR * pbstrServiceID );
        parameters: pbstrServiceID, On return, this contains the address of a newly-allocated string containing the contents of the device's ServiceIdentifier element, if the device specifies one. This value must be freed when no longer needed. If the device does not specify a ServiceIdentifier value, this parameter will be set to null.
        return value: S_OK, bstrServiceID contains the service identifier of the device. pbstrServiceID must be freed. S_FALSE, the device did not specify a service identifier. *pbstrServiceID is set to null.
        note having a ServiceIdentifier is mutually exclusive with having services. Any device will either have a list of services or a ServiceIdentifier, but not both.

[id(DISPID_UPNPDEVICEDESCRIPTION_LOADSMALLICON),
   helpstring("loads a small (titlebar-sized) icon representing the device, encoded in the specified format")]
    HRESULT LoadSmallIcon([in] BSTR bstrEncodingFormat,
     [out, retval] BSTR * pbstrIconURL);
        parameters:

...
bstrEncodingFormat, A string containing the mime-type representing the desired encoding format of the icon. pbstrIconURL, On return, *pbstrIconURL contains a newly-allocated string representing the URL from which the icon can be loaded. This string must be freed when no longer needed.
 return values: S_OK, *pbstrIconURL contains a reference to an icon, encoded in the desired encoding format.

[id(DISPID_UPNPDEVICEDESCRIPTION_LOADICON),
     helpstring("loads a standard-sized icon representing the device, encoded in the specified format")]
    HRESULT LoadIcon([in] BSTR bstrEncodingFormat,
     [out, retval] BSTR * pbstrIconURL);
       parameters: bstrEncodingFormat, A string containing the mime-type representing the desired encoding format of the icon. pbstrIconURL, On return, *pbstrIconURL contains a newly-allocated string representing the URL from which the icon can be loaded. This string must be freed when no longer needed.
     return values: S_OK, *pbstrIconURL contains a reference to an icon, encoded in the desired encoding format.

[propget, id(DISPID_UPNPDEVICEDESCRIPTION_PRESENTATIONURL),
     helpstring("obtains a presentation URL to a web page that can control the device")]
    HRESULT PresentationURL([out, retval] BSTR * pbstrURL);
       parameters: pbstrURL, on return, the address of a newly-allocated string containing the web-page-based control URL. If the device did not specify a presentation URL, an empy string ("") will be returned.
     return values:S_OK, bstrURL contains a newly-allocated URL that must be freed when no longer needed. S_FALSE, the device does not have a presentation URL. pbstrURL is set to null.

[propget, id(DISPID_UPNPDEVICEDESCRIPTION_PHYSICALLOCATION),
     helpstring("a set of properties describing the device's physical location")]
    HRESULT PhysicalLocation([out, retval] IUPNPPropertyBag * pupl);
       parameters: pupl    on return, the address of a newly-allocated UPNPPropertyBag object which contains information about the device's physical location
     return values
...

FIG. 33

...
    S_OK    upl contains a newly-allocated object that the caller must free when it is no longer needed.
    note: if the object does not provide any description information, an empy property bag will be returned. See SetPhysicalLocation for a listing of defined values in a physical location property bag.

[propget,
id(DISPID_UPNPDEVICEDESCRIPTION_CANSETPHYSICALLOCATION),
  helpstring("denotes whether the physical location information of this device can be set")]
    HRESULT CanSetPhysicalLocation([out, retval] VARIANT_BOOL * pvarb);
        parameters: pvarb   the address of a VARIANT_BOOL. This is true (!=0) on return when the device's physical location can be set (via SetPhysicalLocation)
        return values: S_OK    varb is set to the appropriate value

[id(DISPID_UPNPDEVICEDESCRIPTION_SETPHYSICALLOCATION),
  helpstring("writes a set of properties describing the device's physical location to the device")]
    HRESULT SetPhysicalLocation([in] IUPNPPropertyBag * pupl);
        parameters: pupl   A UPNPPropertyBag object which contains the name-value pairs representing the device's current location. the function will not free the object.
        return values: S_OK    he device has been updated with the supplied physical location information
        note: the following are standard values in the physical location property bag: country, campus, building, floor, wing, room, latitude, longitude, altitude. These values can be used programmatically to implement sorting or filtering functionality based on the device's location. Additionally the property bag supports the following value: description, which contains a user-displayable string representing a device's location which does not have programattic significance. Additionally, the physical location update will be made on the device alone, and will not be reflected in the current device object. After a successful call to this method, PhysicalLocation will continue to return the 'old' value. To read the device's current name, the caller must re-load the device's description.
}
...

[propget, id(DISPID_UPNPDEVICEDESCRIPTION_PRODUCTNAME),
   helpstring("a displayable string containing the product name")]
   HRESULT ProductName([out, retval] BSTR * pbstr);
      parameters: pbstr on return, the address of a newly-allocated string containing the product name of the device.
      return values:   S_OK pbstr contains a newly-allocated string that must be freed when no longer needed.

[propget, id(DISPID_UPNPDEVICEDESCRIPTION_DESCRIPTION),
   helpstring("displayable summary of the device's function")]
   HRESULT Description([out, retval] BSTR * pbstr);
      parameters: pbstr on return, the address of a newly-allocated string containing a short description of the device meaningful to the user.
      return values:   S_OK pbstr contains a newly-allocated string that must be freed when no longer needed.

[propget, id(DISPID_UPNPDEVICEDESCRIPTION_MODELNAME),
   helpstring("displayable model name")]
   HRESULT ModelName([out, retval] BSTR * pbstr);
      parameters: pbstr on return, the address of a newly-allocated string containing the manufactuer's model name of the device.
      return values: S_OK   pbstr contains a newly-allocated string that must be freed when no longer needed.

[propget, id(DISPID_UPNPDEVICEDESCRIPTION_SERIALNUMBER),
   helpstring("displayable serial number")]
   HRESULT SerialNumber([out, retval] BSTR * pbstr);
      parameters: pbstr on return, the address of a newly-allocated string containing the manufacturer's serial number of the device.
      return values: S_OK   pbstr contains a newly-allocated string that must be freed when no longer needed.
      note: a device's serial number is not guaranteed to be globally unique. The DeviceUniqueName should always be used to distinguish devices.

[propget, id(DISPID_UPNPDEVICEDESCRIPTION_MANUFACTURERNAME),
   helpstring("displayable manufacturer name")]
   HRESULT ManufacturerName([out, retval] BSTR * pbstr);
      parameters

...
pbstr, on return, the address of a newly-allocated string containing the name of the device's manufactuer.
    return values: S_OK, pbstr contains a newly-allocated string that must be freed when no longer needed.

[propget, id(DISPID_UPNPDEVICEDESCRIPTION_MANUFACTURERURL),
    helpstring("URL to the manufacturer's website")]
  HRESULT ManufacturerURL([out, retval] BSTR * pbstr);
    parameters: pbstr, on return, the address of a newly-allocated string containing the URL of the manufacturer's website.
    return values: S_OK, pbstr contains a newly-allocated string that must be freed when no longer needed.

[propget, id(DISPID_UPNPDEVICEDESCRIPTION_MODELNAME),
    helpstring("displayable model name")]
  HRESULT ModelName([out, retval] BSTR * pbstr);
    parameters: pbstr, on return, the address of a newly-allocated string containing the manufactuer's model name for the device.
    return values: S_OK, pbstr contains a newly-allocated string that must be freed when no longer needed.

[propget, id(DISPID_UPNPDEVICEDESCRIPTION_SUPPORTLIST),
    helpstring("technical support contact information")]
  HRESULT SupportList([out, retval] BSTR * pbstr);
    parameters: pbstr, on return, the address of a newly-allocated, multi-line string containing phone numbers and other information that can guide the user to technical support. This string must be freed when no longer needed.
    return values: S_OK, pbstr contains a newly-allocated string that must be freed when no longer needed.

[propget, id(DISPID_UPNPDEVICEDESCRIPTION_FAQLIST),
    helpstring("FAQ access display information")]
  HRESULT FAQList([out, retval] BSTR * pbstr);
    parameters: pbstr, on return, the address of a newly-allocated, multi-line string containing FAQ information that can provide the user with URLs at which device FAQs may be located.
    return values: S_OK, pbstr contains a newly-allocated string that must be freed when no longer needed.

```
...
[propget, id(DISPID_UPNPDEVICEDESCRIPTION_UPDATELIST),
    helpstring("information explaining where the user can update the device's
firmware")]
   HRESULT UpdateList([out, retval] BSTR * pbstr);
      parameters: pbstr, on return, the address of a newly-allocated, multi-line
string containing information and URLs from which the user can download updates
for the device's firmware.
      return values: S_OK, pbstr contains a newly-allocated string that must be
freed when no longer needed.
```

FIG. 37

```
[
object,
uuid(FDBC0C73-BDA3-4C66-AC4F-F2D96FDAD68C),
dual,
helpstring("IUPNPDevices Interface"),
pointer_default(unique)
]
IUPNPPropertyBag
{

[propget, id(DISPID_UPNP_PROPERTYBAG_READ),
     helpstring("reads a value from the property bag")]
    HRESULT Read([in] BSTR bstrName, [out, retval] VARIANT * pvarResult);
         parameters: bstrName, name of the property to read.  case is ignored.
pvarResultvalue of the property.  if the property doese not exist, this is of type
VT_EMPTY
         return values: S_OK, the value was found in the property bag, and returned
in pvarResult.  S_FALSE, there was no value with the given name in the property
bag.  *pvarResult is of type VT_EMPTY

[propget, id(DISPID_UPNP_PROPERTYBAG_WRITE),
     helpstring("writes a value to the property bag")]
    HRESULT Write([in] BSTR bstrName, [in] VARIANT * pvarValue);
         parameters: bstrName, name of the property to write.  case is preserved
when writing. The supplied value will replace any other values of the same name,
even if they differ in case.  pvarValue, value of the property to write.
         return values: S_OK, the value was written to the property bag, replacing the
value currently associated with this property, if it existed.

[propget, id(DISPID_UPNP_PROPERTYBAG_DELETE),
     helpstring("removes a value from the property bag")]
    HRESULT Delete([in] BSTR bstrName);
         parameters: bstrName, name of the value to remove from the property gab.
case is ignored when finding a value to remove.
         return values: S_OK, the value has been removed from the property bag.
S_FALSE, the value was not found in the property bag.

```
interface IUPnPService : IDispatch
{
    [id(DISPID_UPNPSERVICE_QUERYSTATEVARIABLE),
      helpstring("method QueryStateVariable")]
    HRESULT QueryStateVariable([in] BSTR bstrVariableName,
                [out, retval] VARIANT *pValue);

[id(DISPID_UPNPSERVICE_INVOKEACTION),
      helpstring("method InvokeAction")]
    HRESULT InvokeAction([in] BSTR bstrActionName,
            [in] VARIANT vInActionArgs,
            [in, out] VARIANT * pvOutActionArgs,
            [out, retval] VARIANT *pvRetVal);

[propget, id(DISPID_UPNPSERVICE_SERVICETYPEIDENTIFIER),
      helpstring("property ServiceTypeIdentifier")]
    HRESULT ServiceTypeIdentifier([out, retval] BSTR *pVal);

[id(DISPID_UPNPSERVICE_ADDSTATECHANGECALLBACK),
      helpstring("method AddStateChangeCallback")]
    HRESULT AddCallback([in] IUnknown * pUnkCallback);

[propget, id(DISPID_UPNPSERVICE_SERVICEID),
      helpstring("property Id")]
    HRESULT Id([out, retval] BSTR *pbstrId);

[propget, id(DISPID_UPNPSERVICE_LASTTRANSPORTSTATUS),
      helpstring("property LastTransportStatus")]
    HRESULT LastTransportStatus([out, retval] long * plValue);
};
```

FIG. 39

```
[
object,
uuid(FDBC0C73-BDA3-4C66-AC4F-F2D96FDAD68C),
dual,
helpstring("IUPNPDevices Interface"),
pointer_default(unique)
]
    interface IUPNPDevices : IDispatch
{
[propget, id(1), helpstring("property Count")]
HRESULT Count(
[out, retval] long *pVal
);

[propget, id(DISPID_NEWENUM), helpstring("property _NewEnum")]
HRESULT _NewEnum(
[out, retval] LPUNKNOWN *pVal
);

[propget, id(DISPID_VALUE), helpstring("property Item")]
HRESULT Item(
[in] long lIndex,
[out, retval] VARIANT *pVal
);
};
```

FIG. 40

```
[
object,
uuid(3F8C8E9E-9A7A-4DC8-BC41-FF31FA374956),
dual,
helpstring("IUPNPServices Interface"),
pointer_default(unique)
]
interface IUPNPServices : IDispatch
{
[propget, id(1), helpstring("property Count")]
HRESULT Count(
[out, retval] long *pVal
);

[propget, id(DISPID_NEWENUM), helpstring("property _NewEnum")]
HRESULT _NewEnum(
[out, retval] LPUNKNOWN *pVal
);

[propget, id(DISPID_VALUE), helpstring("property Item")]
HRESULT Item(
[in] long lIndex,
[out, retval] VARIANT *pVal
);
};
```

… # DATA DRIVEN REMOTE DEVICE CONTROL MODEL WITH GENERAL PROGRAMMING INTERFACE-TO-NETWORK MESSAGING ADAPTER

RELATED APPLICATION DATA

This application is a continuation-in-part of U.S. patent application Ser. No. 09/432,854, filed Nov. 2, 1999, which is based on provisional application No. 60/139,137 filed Jun. 11, 1999, and provisional application No. 60/160,235 filed Oct. 18, 1999.

TECHNICAL FIELD

This invention relates generally to dynamic configuration of interconnectivity among distributed devices and services, and more particularly relates to providing a capability to access device- or service-specific operational information and perform remote automation and control of embedded computing devices using a data-driven remote programming model, such as in a pervasive computing environment

BACKGROUND AND SUMMARY

The cost of computing and networking technologies have fallen to the point where computing and networking capabilities can be built into the design of many electronic devices in the home, the office and public places. The combination of inexpensive and reliable shared networking media with a new class of small computing devices has created an opportunity for new functionality based mainly on the connectivity among these devices. This connectivity can be used to remotely control devices, to move digital data in the form of audio, video and still images between devices, to share information among devices and with the unconstrained World Wide Web of the Internet (hereafter "Web") and to exchange structured and secure digital data to support things like electronic commerce. The connectivity also enables many new applications for computing devices, such as proximity-based usage scenarios where devices interact based at least in part on geographical or other notions of proximity. A prevalent feature of these connectivity scenarios is to provide remote access and control of connected devices and services from another device with user interface capabilities (e.g., a universal remote controller, handheld computer or digital assistant, cell phones, and the like). These developments are occurring at the same time as more people are becoming connected to the Internet and as connectivity solutions are falling in price and increasing in speed. These trends are leading towards a world of ubiquitous and pervasive networked computing, where all types of devices are able to effortlessly and seamlessly interconnect and interact.

In accordance with a new device connectivity architecture known as Universal Plug and Play, devices and services are controlled by exchanging well-defined XML-format data messages. At the programmatic level, on the other hand, it is useful and productive to work in an object-oriented framework.

Prior connectivity models are not adequate to bridge between object interfaces and the data messages exchanged with the controlled device over a network. Some prior connectivity models require a controlling device to download the program code (such as a device driver, Jini code, etc.) for interacting with the controlled device or service from a networked source. Such a code download requirement is unsuitable to the Web and other ubiquitous computing scenarios. Other connectivity models require use of a custom-written object for specific classes of services. This approach leads to deployment hassles (e.g., user setup and configuration) and also is unsuitable to ubiquitous computing.

In accordance with a technology described herein, a general programmatic interface-to-network messaging adapter (called a "rehydrator") is a module that exposes a suitable object integration interface or application programming interface to applications on a controller device and sends network data messages to invoke services or query status of a controlled device. The adapter maps application calls to the interface into network data messages according to service protocols of the controlled device. The described adapter preferably is generic to all devices and services compatible with the connectivity model, and adapts itself to specific of the devices based on a Service Description. In other words, this adapter operates as a universal module through which network data message-driven services on other networked computing devices can remote programmatic application programming interfaces, including object integration interfaces according to an object model such as Microsoft's COM, CORBA, JAVA, and the like.

More specifically, this general adapter provides the interface suitable to any specific service of a controlled device based on a data description of the interface, and converts the application calls to network data messages based on a data description of network data messages to interact with the specific service. Once the Service Description is obtained, applications on the controller device can programmatically interact with the adapter, and the adapter then handles appropriate message exchanges with the service of the controlled device. With the described adapter, no code download is required, only the interface/messaging description is needed. The description can be obtained from the controlled device, a network server computer, or by pre-loading or caching on the controller device. The technology allows controller device applications to be written using object-oriented programming, while avoiding code download.

Additional features and advantages will be made apparent from the following detailed description of the illustrated embodiment which proceeds with reference to the accompanying drawings.

BRIEF DESCRIPTION OF THE DRAWINGS

FIG. 14 is a listing showing a layout of a description document in the device control model of FIG. 3.

FIG. 15 is a listing of an exemplary icon list of a Description Document in the device control model of FIG. 3.

FIG. 16 is a listing of an exemplary Service Description in a Description Document in the device control model of FIG. 3.

FIGS. 17 and 18 are a listing of an XML schema for a Service Description Language used in the device control model of FIG. 3.

FIG. 27 is a block diagram of an exemplary home or office pervasive computing environment having a variety of computers as per FIG. 21 and embedded computing devices as per FIG. 22 interconnected per UPNP standards that may be used in the device control model of FIG. 3.

FIGS. 28 through 40 are program listings of interfaces used in the Rehydrator implementation design of FIG. 9.

DETAILED DESCRIPTION

Figure 1:
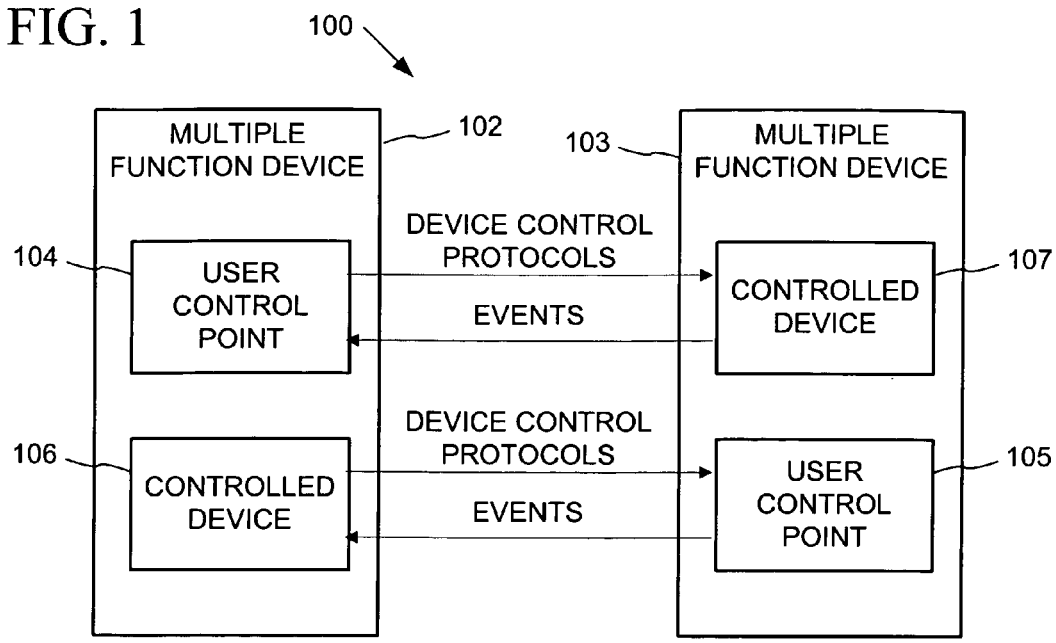
FIGS. 1 and 2 are block diagrams of a device architecture per Universal Plug and Play using Control Points, controlled devices and bridges for connectivity between devices.

The following detailed description is directed toward a general programmatic interface-to-network messaging adapter (also known as a "rehydrator") in a device control model. In one described implementation, the rehydrator is used in a device architecture 100 (FIG. 1) of a pervasive peer-to-peer networking connectivity protocol proposed by Microsoft Corporation, called Universal Plug and Play ("UPnP"), which is discussed in more detail in the Appendix section below entitled, "Universal Plug and Play Device Architecture." Although described in the context of a device control model, and specifically UPnP, the general programmatic interface-to-network messaging adapter of the invention also is more generally applicable in other distributed networking environments to provide an object-oriented or like application programming interface to applications for interacting remotely using network data messages.

UPnP provides a device-driven auto-configuration capability that preserves the experience that customers have on the web. Today, it is possible to navigate around the web without loading programs beyond the browser itself. Since UPnP enables the browser to be extended to control devices, and because UPnP devices are controlled with explicit protocols, the browser must somehow learn how to talk to UPnP devices. This learning process is driven entirely from the device itself and is accomplishing entirely by uploading an XML document that describes the capabilities of the device. The architectural component that enables device-driven auto-configuration is called the Rehydrator. The job of the Rehydrator is to convert between APIs and protocols.

Since the auto-configuration process itself is driven only by the exchange of formatted data, there is very little opportunity for a malicious attack from a hostile piece of code.

There are some scenarios where the web UI model is not sufficient for a rich customer experience. It would not be convenient to have to a web UI for each light switch in a house. To support a rich user interface and to enable the aggregation of devices into a single UI, UPnP enables programmatic control in addition to browser control of devices. This is achieved simply by enabling applications to call the same Rehydrator APIs that the browser does. Applications can also directly generate and consume the raw UPnP control protocols, provided they are not interested in the device-driven auto-configuration enabled by the Rehydrator.

UPnP assumes that there will be more than one device with UI that wants to control other devices in any given network, and it provides a simple mechanism that enables these Control Points to remain in sync. This mechanism can easily support device front panels and wireless remotes that do not run UPnP protocols. The UPnP control model is third-party control; any device can transfer bulk data (e.g. files) or A/V data streams from any device on the network, to any device on the network, under the control of any device on the network.

Control Points, Controlled Devices and Bridges

Figure 2:
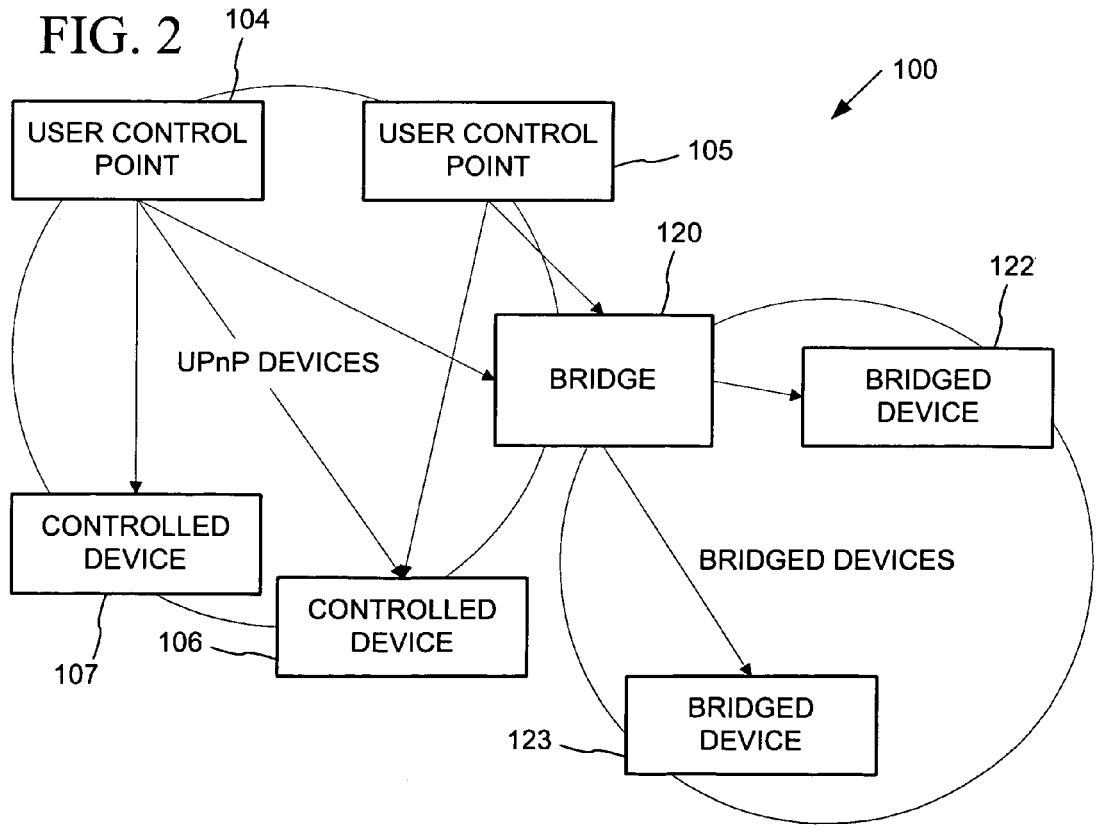

With reference now to FIGS. 1 and 2, UPnP is an application-level distributed network architecture where the logical nodes on the network are Control Points 104–105, Controlled Devices 106–107 and Bridges 120. These classifications refer to functionality rather than physical entities. The functionality of UPnP Control Points 104–105, Controlled Devices 106–107 and Bridges 120 can be packaged into physical entities (e.g., multiple function devices 102–103) in any combination.

A Control Point is a set of modules that enable communication with a UPnP Controlled Device. A module is a component of a device, software program, or system that implements some "functionality", which can be embodied as software, hardware, firmware, electronic circuitry, or etc. Control Points initiate discovery and communication with Controlled Devices, and receive Events from Controlled Devices. Control Points are typically implemented on devices that have a user interface. This user interface is used to interact with Controlled Devices over the network. The modules minimally include a Discovery Client, a Description Client and a Rehydrator. Control Points may also include Visual Navigation, an Event Subscription Client, Event Sink, a web browser and an application execution environment. Control Points can add value to the network by aggregating the control of multiple Controlled Devices (the universal remote) or they can implement a function as simple as initiating the transfer of data to or from a Controlled Device. Examples of devices that could be Control Points are the personal computer (PC), digital television (DTV), set-top box (STB), handheld computer and smart mobile phone, and the like. Nothing prevents a single device from implementing the functionality of a Control Point and one or more Controlled Devices at the same time.

A Controlled Device is a set of modules that enable communication with a Control Point. Controlled Devices respond to discovery requests, accept incoming communications from Control Points and may send Events to Control Points. Devices that support Controlled Device functionality may also support local user interfaces such as front panel displays or wireless remotes. The modules minimally include a Discovery Server, a Description Server and a Control Server. Controlled Devices may also include a Presentation (web) Server, Event Subscription Server and Event Source. Examples of devices that could be Controlled Devices are the VCR, DVD player or recorder, heating/ventilation/air-conditioning equipment (HVAC), lighting controller, audio/video/imaging playback device, handheld computer, smart mobile phone and the PC, and the like. Nothing prevents a single device from implementing the functionality of a Control Point and one or more Controlled Devices at the same time.

A Bridge is a set of modules that enables Bridged and Legacy Devices to interact with native UPnP devices. The bridge itself exposes a collection of UPnP Controlled Devices to Control Points. The Bridge maps between native UPnP Device Control Protocols and the underlying protocols exposed by the Bridged and Legacy Devices. Optionally, such a device could expose UPnP Controlled Devices to Legacy Devices in the manner required by the Legacy Devices. Nothing prevents a single device from implementing the functionality of a Control Point, one or more Controlled Devices and a Bridge at the same time. Bridges 120 (FIG. 2) expose devices that do not expose native UPnP protocols as native UPnP Controlled Devices. The Bridge itself looks to other UPnP Control Points like a set of Controlled Devices.

The Bridged Device is a device that cannot participate in UPnP at the native protocol level, either because the device does not have sufficient resources or because the underlying media is unsuitable to run TCP and HTTP. Examples of devices that could be Bridged Devices are power line-controlled A/V equipment, light switches, thermostats, wristwatches and inexpensive toys. Bridged Devices are UPnP complaint and are exposed to other UPnP devices through a UPnP Bridge. The Legacy Device is any non-UPnP compliant device that must be exposed to other UPnP devices through a UPnP Bridge.

The primary distinction between a Control Point 104–105 and a Controlled Device 106–107 is that the Control Point is always the communication initiator of control operations (for discovery, the Controlled Device may be the initiator). After the initial communication, Control Points can receive events from Controlled Devices.

Controlled Devices 106–107 are responsible for storing the state of Services. Control Points are required to synchronize to the state on Controlled Devices.

Control Points typically have user interface that is used to access one or more Controlled Devices on the network. Controlled Devices only have local user interfaces.

The following table lists the modules in the Control Points 104–105 and Controlled Devices 106–107, along with their functions.

| Control Point | | Controlled Device | |
|---|---|---|---|
| Function | Module | Function | Module |
| Initiate discovery of Controlled Devices. | Discovery Client | Respond to discovery requests. | Discovery Server |
| Retrieve Device Descriptions. | Description Client | Provide Device Descriptions. | Description Server |
| Display a folder of icons per discovered Device and allow transfer of control to a selected device. | Visual Navigation | | |
| View user interface exposed by a Controlled Device. | Web Browser | Provide user inteface for remote Control Points. | Presentation (Web) Server |
| Execute applications. | Application Execution Environment | | |
| Invoke Actions on a Controlled Device by sending Service Control Protocols in response to local API calls. | Rehydrator | Accept incoming Actions in SCPs and execute them. | Control Server plus native control logic |
| Inform a Controlled Device of a desire to receive Events. | Event Subscription Client | Accept requests for Events and remember them. | Event Subscription Server |
| Receive an Event. | Event Sink | Send an Event. | Event Source |

Device Model

Figure 3:
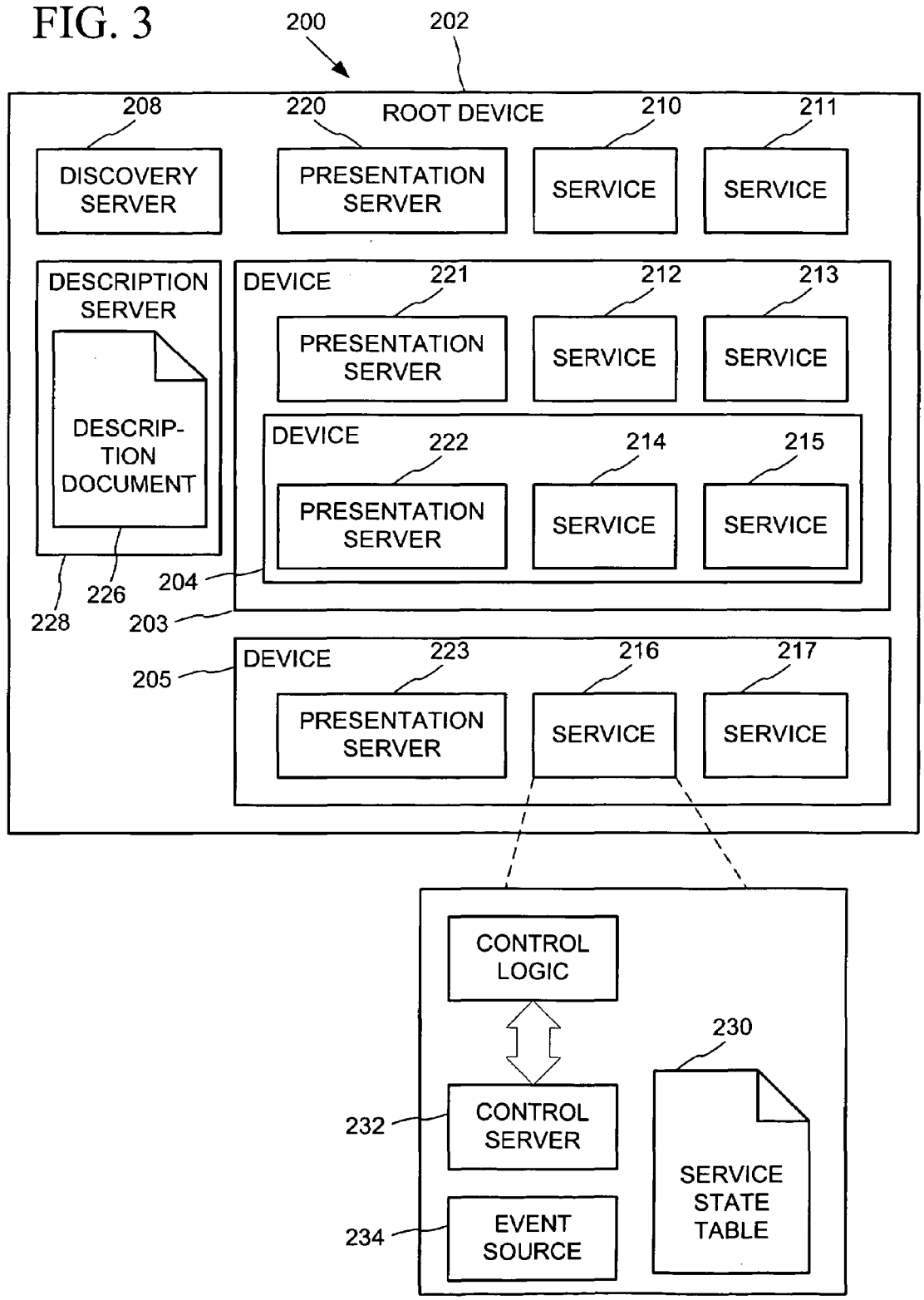
FIG. 3 is a block diagram of a device model per Universal Plug and Play.

The UPnP Device Model 200 shown in FIG. 3 is the model of a UPnP Controlled Device or Bridge that is emulating native Controlled Devices. The Device Model includes the addressing scheme, eventing scheme, Device Description schema, Devices and Services schema and hierarchy, and the functional description of modules. The UPnP Device Model extends beyond simple API or a command and control protocol descriptions to enable multiple Control Points to have a consistent view of Controlled Devices. This requires that the state of running services be formally modeled and that all state changes be visible to Control Points. Central to the distributed UPnP architecture is the rule that Controlled Devices are the ultimate authority for the state of Services running on them.

Service

The fundamental controllable entity in UPnP is a Service 210–217. An example of a Service is "Clock". Services are defined with a mandatory common base set of functionality. Vendors can extend the base set with proprietary extensions provided the base functionality is implemented. Service Descriptions are versioned and later versions are constrained to be supersets of previous versions. UPnP enables searches for all Devices that contain a specified Service of a minimum version. This search would find all clocks, regardless of their packaging. A search for Device Type "Clock" would be used to find only stand-alone clocks.

Every running instance of a Service includes:

A Service State Table (SST) 230, which represents the current state of the Service. The Service State Table is a logical table consisting of rows of [Variable, Type, Legal Values, Default Value, Current Value] that represents the current electrical, mechanical and/or logical state of a Service. SST instances are stored on the Controlled Device itself and are the ultimate authority of the state of the Service. All local user interface, such as front panels or wireless remotes are required to update the SST on UPnP compliant devices.

The SST 230 can be used to represent the operational mode of device or to act as an information source or sink for structured data or simple files. The SST of a VCR 254 (FIG. 4) could represent the current transport mode, tuner channel selection, input and output switch selections, audio and video decoding format and current timer program. The SST of clock 251 (FIG. 4) would likely represent the current time. The SST of an image rendering device could implement a video frame-buffer that can accept raw pixel information or formatted JPG files. The SST of an audio or video playback device could implement a transfer buffer or queue of material to be played. The SST of PDA could implement a collection of formatted data that has changed and needed to be synchronized with another device, in addition to a transfer buffer for accepting incoming formatted data.

The logical structure of a SST published in the Service Description, but the actual storage format of an instance of a SST is entirely up the device. The only interaction with a SST is through a formal application level network protocol.

A Control Server 232, which accepts incoming Actions. The Actions are declared in the Service's Service Description. This module runs in a Controlled Device or Bridge and responds to Actions invoked on a Service by a Control Point. Actions are encoded using the Service Control Protocol (SCP) specified in the Service Description. This service consists of a TCP/HTTP server than passes control to the native control logic of a Service, updates the SST and generates an event if the SST changes. The Control Server passes the Action to the Service's native Action processing logic and waits for Action completion. When the Action is completed successfully, the SST is updated, an event is generated, if necessary, and a successful response is returned to the Control Point. In case of an illegal Action or unsuccessful Action, no changes are made to the SST and a failure response is returned. The Action and response sequence is payload to a TCP/HTTP request/response.

An Event Subscription Server and Event Source 234. The Event Subscription Server is a module that runs in a Controlled Device or Bridge that responds to GENA SUBSCRIBE requests from Control Points. A SUBSCRIBE informs the Controlled Device or Bridge of the Control Point's desire to receive future events. This service consists of a TCP/HTTP server that adds the Control Point's Event Sink URL to the list of destinations to be NOTIFY'd whenever the Service State Table (SST) associated with the Service changes. The Event Subscription Server accepts incoming GENA SUBSCRIBE messages from Control Points and adds them to a list of Control Points interested in SST change events from the Service.

The Event Source is a module that runs in a Controlled Device or Bridge that sends GENA NOTIFYs to the Event Sink Servers of SUBSCRIBES Control Points. The Event Source initiates a TCP/HTTP connection to each interested Control Point and sends a GENA NOTIFY each time the Service's SST changes. The NOTIFY payload includes the changed contents of the SST.

A Control URL that identifies the Control Server. This URL can be used by a Control Point to navigate to the Control Server of a Controlled Device or Bridge. This URL is returned in the Device Description and is valid as an address for the lifetime of the Hostname embedded in the URL. All Services have an associated Control URL.

An Event URL that identifies the Event Subscription Server. The Event URL can be used by a Control Point to navigate to the Event Subscription Server of a Controlled Device or Bridge. This URL is returned in the Device Description and is valid as an address for the lifetime of the Hostname embedded in the URL. Only services that have evented state variables have an associated Event Subscription URL.

The formal definition of a Service includes:

The definition of the SST. SST layouts are logically specified in terms of rows of [Variable, Type, Legal Values, Default Value]. The actual instance of a SST would also include a Current Value field in every row.

The definition of the Service Action set that can be invoked against the Service's SST. Actions are logically specified in terms of Action (Variable=New Value, Variable=New Value, . . . ). If an Action results in more than a single Variable change, the updates are atomic and the Action will fail if it is illegal to make the specified change to any one Variable.

The definition of a structured unit of data called a Service Description. Service Description is used to advertise the layout (schema) of the SST and Action set of the Service to a Control Point or Bridge. The Service Description enables the Control Point to invoke Actions (through the Rehydrator) on the Controlled Device without any prior or persistent knowledge of the capabilities of the device. The Service Description is uploaded from the Controlling Device as part of the Device Description. An automated tool that accepts the SST definition and Action set definition as inputs can generate the Service Description for a Service.

The Service Description is a formal representation of the schema of a Service. The Service Description declares the rows of a Service's SST and the associated Action set. Service Descriptions are uploaded from Controlling Devices in their Device Descriptions and enable Control Points or Bridges to invoke Actions on the Service without any prior or persistent knowledge of the capabilities (or schema) of the Service. There is exactly one Service Description per Service Definition. Service Descriptions adhere to XML grammar.

The definition of a network protocol used to invoke Actions against the SST associated with a Service and to return results. An automated tool that accepts the SST definition and Action set definition as inputs can generate a Service Control Protocol (SCP) for a Service. The SCP can also be generated from the Service Description. The Rehydrator's job is to convert Service Descriptions into messages that conform to the SCP. The reason for a formal SCP specification is to enable the implementation of the Control Server itself and to enable simple peer-to-peer device interoperation using only published protocols.

The Service Control Protocol (SCP) is the protocol used to invoke Actions of a Service and to return results. There is exactly one SCP per Service Definition. SCPs adhere to the grammar of SCP XML schema. SCPs can be generated by an automated tool that accepts a SST Definition and an Action Set Definition as input.

An identifier, called the Service Type Identifier, that identifies a unique Service Definition. The Service Type is a classification of Services by their function. Service Definitions are versioned in controlled manner. Every later version of a Service must be proper superset of the previous version. This identifier adheres to the format of a Uniform Resource Identifier (URI). See, T. Berners-Lee, R. Fielding, L. Masinter, *Uniform Resource Identifiers (URI): Generic Syntax*, IETF RFC 2396 (August 1998).

Device

According to the device model 200 shown in FIG. 3, a UPnP Device 202–205 (e.g., multiple function devices 102–103 of FIG. 1 and bridged devices 122–123 of FIG. 2) is a logical container of one or more Services 210–217. Generally a Device represents a physical entity such as a VCR. Typical Services in the VCR Device example might be "TRANSPORT", "TUNER", "TIMER" and "CLOCK". While Devices are often physical entities, a PC emulating the traditional functions of a VCR could also be modeled in the same way as the stand-alone VCR. Devices can contain other Devices. An example would be a TV/VCR 250 (FIG. 4) packaged into a single physical unit. A Device (e.g., devices 202–203) may also be a logical container of other Devices. The top-most Device in a hierarchy of nested Devices 203–205 is called the Root Device 202. A Device with no nested Devices is always a Root Device.

The UPnP Device Model was designed to be general and flexible. It should be possible to model an entire Nuclear Power Plant as a single Service or as a deeply nested hierarchy of Devices and Services. In general, a Service 210–217 is cohesive set of functions that enables flexible packaging into a variety of Devices. Services can be versioned independently of Devices.

Figure 4:
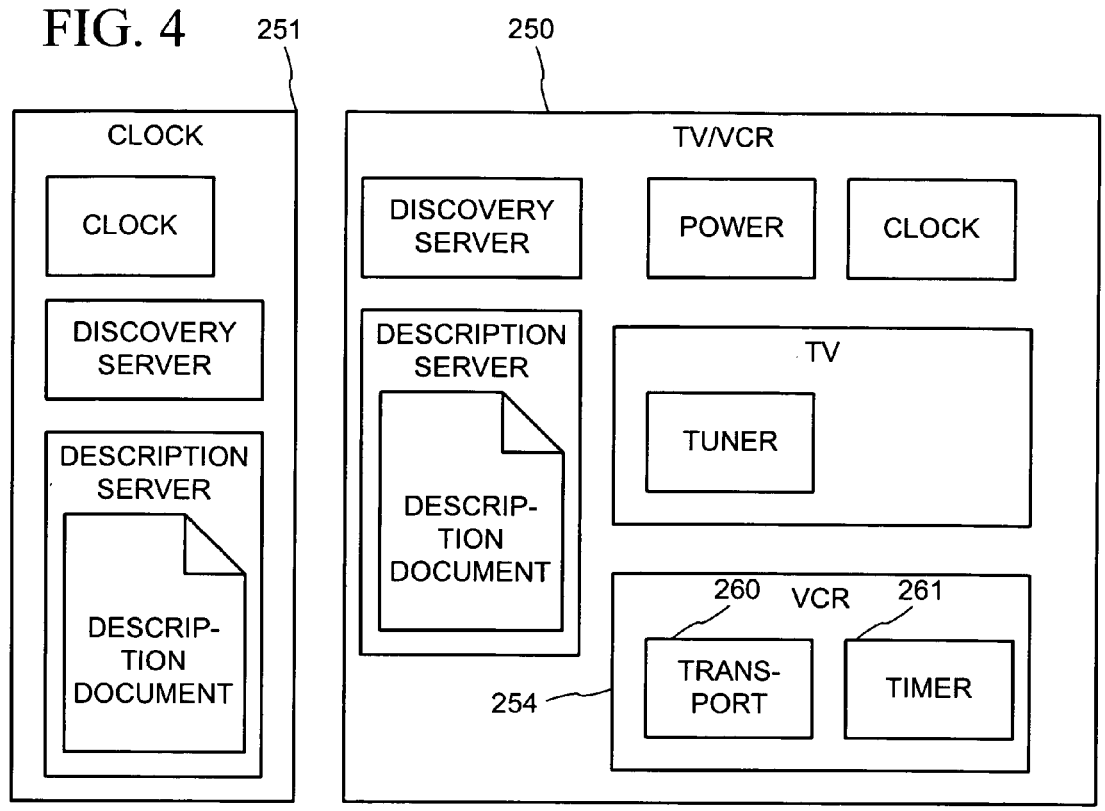
FIG. 4 is a block diagram illustrating example devices conforming to the device model of FIG. 3.

All Devices, including Root Devices belong to one or more Device Types. Device Types are intended to enable instances of Devices to be simply and automatically grouped for presentation. An example of a Device Type is "VCR" 254 (FIG. 4). Device Types are formally defined in terms of a minimal set of versioned Services that a Device of Device Type must support. Device Types are not formally versioned. Device Type is a relatively high level grouping. A Device of Device Type only ensures that minimal set of Services of a minimal version is present. There can be other Services, higher versioned Services and Services with vendor extensions present on such a Device.

UPnP enables SSDP level searches for a unique instance of a Device (by UDN), all Devices of type Device Type and all Devices that contain at least one Service Type of minimum version. The result of an SSDP search is always a URL that points to the Device Description contained in the Root Device. In the event that matching Device is not the Root Device, the Device Description has a tree of nested Devices that can be traversed to find the matching Device.

Every Device includes:
One or more Device Types.
One or more Services.
Optionally, one or more Devices.
Optionally, a Presentation (web) Server 220–223 that can be used to expose Device user interface. The Presentation Server is a module that runs in a Controlled Device that responds to HTTP GETs or Presentation URLs and returns user interface using web technologies (JavaScript, Jscript®, ECMAScript, VBScript, ActiveX®, Java Applet, etc.). Every Presentation Server has an associated Presentation URL that can be used by a Control Point to navigate to the Presentation Server of a Controlled Device. This URL is returned in the Device Description and is valid as an address for the lifetime of the Hostname embedded in the URL. All Devices, including non-Root Devices, can have an associated Presentation URL.

A globally unique identifier called the Unique Device Name (UDN). The UDN is the fundamental identifier of an instance of a Device. The UDN is globally unique and permanent, even across power cycles and physical location changes. The UDN is the only UPnP device identifier guaranteed never to change. UPnP enables searches for devices by UDN. Every Device, including Root Devices, has exactly one UDN.

A Device Friendly Name. The Device Friendly Name is a human readable string that is initialized by vendors at the time of manufacture of a Device. Every Device, including Root Devices, has a Device Friendly Name. A typical Device Friendly Name will contain manufacturer and model information, and is used to enable a more precise identification of a UPnP Device from the set of discovered Devices. Once identified, the Unique Device Name (UDN) can be used to unambiguously identify the same Device in the future. UPnP enables Device Friendly Names to be changed by Control Points. The Device Friendly Name should not be used as device identifier.

The Root Device 202 includes a Discovery Server 208, which is a module that runs in a Controlled Device or Bridge that responds to SSDP queries. This Server is unique in that it must support UDP/HTTP rather than just TCP/HTTP.

Every Root Device 202 also includes the Device Description 226 and Description Server 228 for all Devices under and including itself. The Device Description is a structured unit of data that is used by a Control Point or UPnP Bridge to learn the capabilities of a Controlled Device. Device Descriptions are retrieved from the Description Server on a UPnP Controlled Device. There is one Device Description for every Root Device that describes the Root Device and all non-Root Devices. Device Descriptions adhere to XML grammar. To support localization, multiple Device Descriptions can exist. A Control Point requests the preferred localized Device Description by using the standard HTTP "accept-language" header. The Description Server is a module that runs in a Controlled Device or Bridge that responds to HTTP GETs and returns Device Descriptions. This service consists of a TCP/HTTP server than can retrieve and return a Device Description from persistent storage (like a filesystem).

The formal definition of a Device (Device Definition 226) includes:
The fixed elements of the Device Description that describe the Device.
The required hierarchy of Devices and Service Definitions.
There can be many Device Definitions that belong to a single Device Type.

Device Types

The formal definition of a Device Type includes:
A Device Type Identifier. The Device Type Identifier is a unique identifier that identifies a Device Definition. This identifier adheres to the format of a Uniform Resource Identifier (URI). See, T. Berners-Lee, R.

Fielding, L. Masinter, *Uniform Resource Identifiers (URI): Generic Syntax*, IETF RFC 2396 (August 1998).

The required hierarchy of Devices and Service Definitions of minimum versions.

Service State Table

A Service State Table (SST) logically consists of rows of:

Variable, Type, Legal Values, Default Value, Current Value

Although entries of the Service State Table in UPnP consist of these five items, the state table alternatively can contain fewer or additional items. Generally, each entry will minimally consist of a Variable name or identifier, and its current value.

Various Types of variables available in UPnP are listed in the Appendix.

The reason for representing Services this way is to ensure that the state of a Service is easily available in a common way to multiple Control Points.

An SST can be used to represent to current operational mode of device, act as an information source or sink and/or simply be a repository for Actions. The SST of a VCR Service could represent the current transport mode, tuner channel selection, input and output switch selections, audio and video decoding format and current timer program. Alternatively, the VCR 254 could be represented as a Transport Service 260, Tuner Service, I/O Switch Service, A/V Decoding Configuration Service and Programmable Timer Service 261.

The SST of a clock 251 would likely represent the current time. Additionally an alarm clock could include Service Variables to configure the clock.

The SST of an image rendering device could implement a video frame-buffer that can accept raw pixel information or formatted JPG files. The SST of an audio or video playback device could implement a transfer buffer or queue of material to be played. The SST of PDA could implement a collection of formatted data that has changed and needed to be synchronized with another device, in addition to a transfer buffer for accepting incoming formatted data.

Control Point Synchronization

Figure 5:
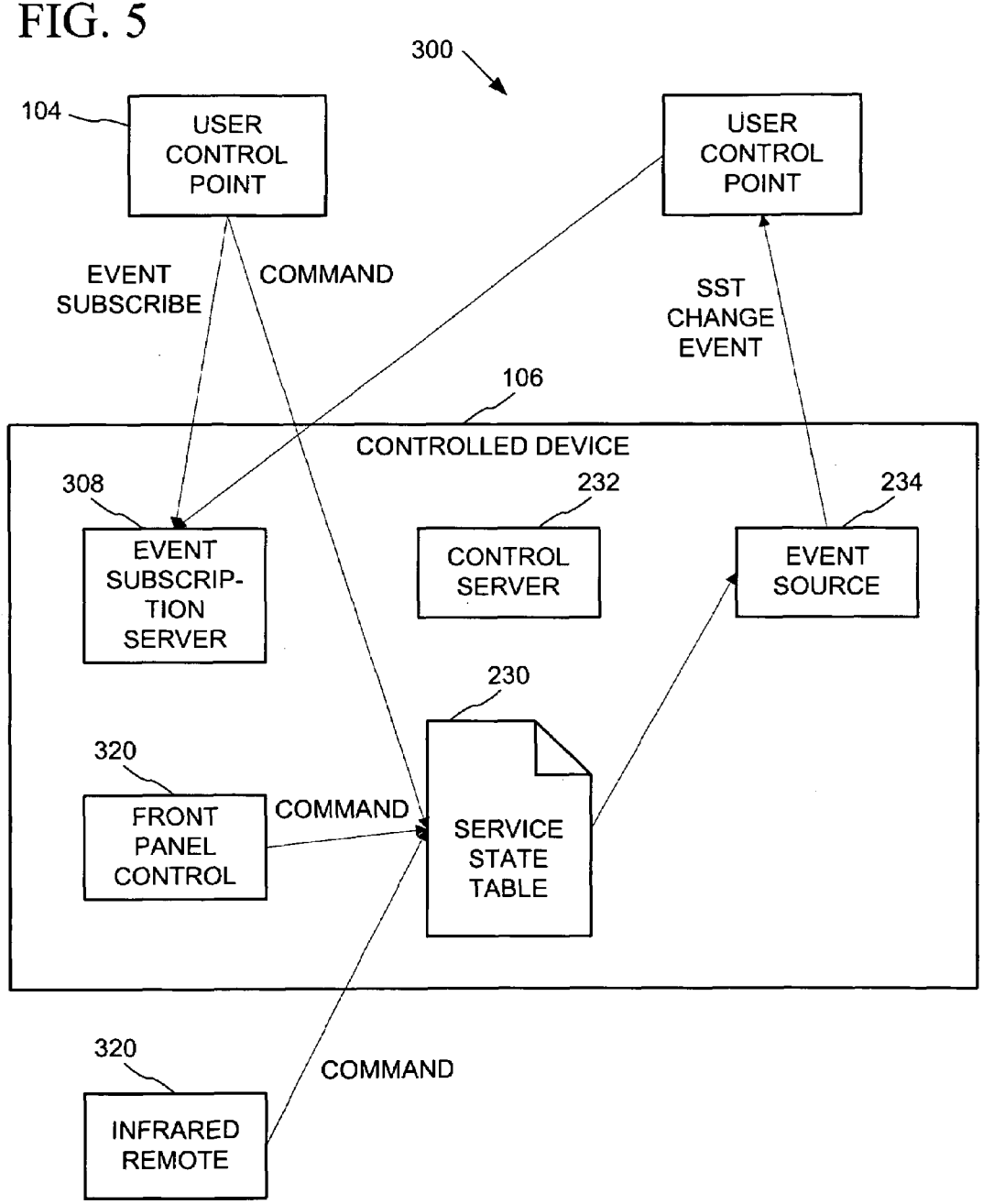
FIG. 5 is a block diagram illustrating device state synchronization using a state table and eventing.

In accordance with an device state and eventing model illustrated in FIG. 5, UPnP rules require that every change to an evented variable in an SST generate a corresponding event to announce the change to the all interested Control Points.

An event is an unsolicited message generated by a Controlled Device and delivered to one or more Control Points. Events are used to maintain a consistent view of the state of Service across all interested Control Points. UPnP leverages the GENA event architecture (see "Generic Event Notification") to transport event messages. All events are delivered using TCP/IP for reliability.

Device Addressing

Figure 6:
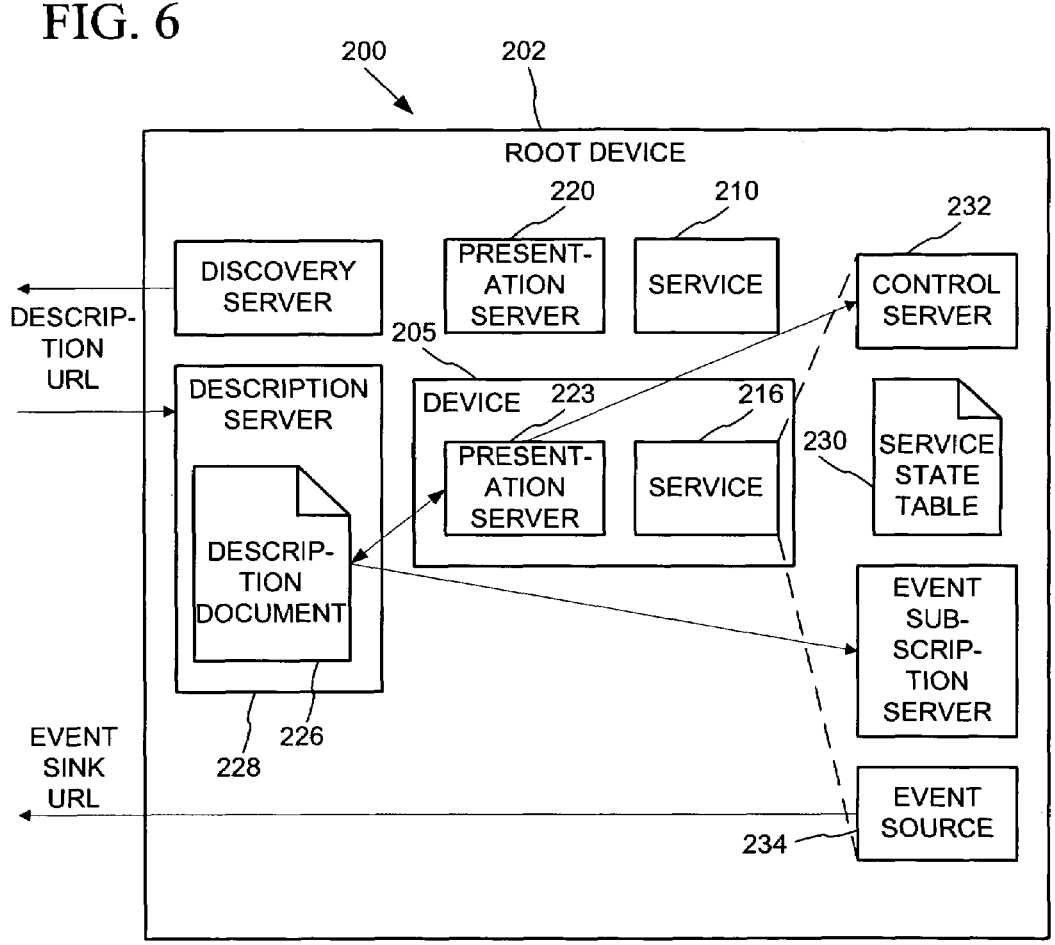
FIG. 6 is a block diagram illustrating device addressing.

With reference now to FIG. 6, UPnP is built on top of HTTP and leverages the native address format of the web, Uniform Resource Locators (URLs). URLs are a format for expressing web addresses. URLs minimally contain an identification of the protocol family that the URL is valid for, a Hostname, and a path. UPnP uses URLs as addresses whenever the module accepting the incoming connection is an HTTP server. URLs minimally contain an identification of the application protocol family ("http") that the URL is valid for, a Hostname and a path. In the context of UPnP, the path part of a URL can represent either a filesystem path or simply an identifier of the local system module and context that can process incoming messages.

A Hostname is the Domain Name System (DNS) or NetBIOS Name Service (NBNS) that, when resolved to an IP address, represents a network interface that can be used to establish TCP/IP level connectivity to Control Points, Controlled Devices or Bridges. Hostnames can be used to provide persistent network level addressing on a network where IP addresses are dynamically assigned and of unknown lifespan or to integrate with an existing managed network. UPnP provides an algorithm for seeding a device's hostname from its UDN at manufacturing time.

While UPnP modules are described as HTTP servers, there is no requirement that implementations be based on actual web servers. The HTTP Server is a module that accepts incoming TCP/HTTP connections and either returns a web page or forwards the payload data to another module. Client and Server describe only the direction of initiation of TCP/HTTP connections. There is no relationship between the low level concepts of Client and Server and the high level concepts of Control Point and Controlled Devices. Logically, Control Points always discover and initiate communication with Controlled Devices, but this communication requires Client and Server functionality on both sides. In most cases, the job of the HTTP server is simply to accept the incoming connection, look at the local destination part of the address (the path) and forward the payload to another module. UPnP enables, but does not require, that all HTTP Servers be based on a common software implementation or runtime instance. Controlled Devices and Bridges can include a TCP port specification as part of a URL to override the default value of 80.

The successful result of a UPnP SSDP level search is always one or more Description URLs. These URLs can be used to navigate to the Device Description of a Controlled Device or Bridge. This URL always points to a Description Server on the Controlled Device. An HTTP GET can be issued on this URL to retrieve the Device Description. This URL is valid as an address for the lifetime of the Hostname embedded in the URL. A Control Point uploads the Device Description and extracts the URLs of the Servers running on the Controlled Device or Bridge.

All URLs returned in the Device Description have a lifetime equal to the lifetime of the Hostname embedded in them. Control Points can store these URLs as addresses without going through a search sequence first. Once they have been advertised in a Device Description, Controlled Device and Bridges cannot arbitrarily change Server URLs.

Whenever a Hostname changes, all URLs associated with all Devices addressed by that Hostname are invalidated. The UDN is the only UPnP identifier guaranteed never to change. Any persistent associations maintained by applications should at least store the UDN to able to unambiguously identify the target Device.

The lifetime of a Description URL is determined by Controlled Device or Bridge that advertises it. If a Controlled Device or Bridge allows an SSDP advertisement of a Description URL to expire, the URL is invalidated.

Control Points use the Event Subscription URL returned by the Controlled Device or Bridge to connect to the Event Subscription Server. This server does the housekeeping of remembering all Control Points that are interested in receiving Events on a Service. The Event Subscription Server needs an address to send the events back to. This address is called the Event Sink URL, and is supplied to the Controlled Device or Bridge in the GENA SUBSCRIBE message. The lifetime of an event subscription, and the Event Sink URL, is determined by the timeout on the SUBSCRIBE message.

Further details of UPnP addressing are listed in the following table.

UPnP Addresses

| URL | Function |
| --- | --- |
| Description URL | Points to the Description Server and Document path on a Root Device. This URL is returned by the Description Server as part of the discovery process. |
| Presentation URL | Points to a Presentation (web) Server on a Controlled Device. Every device, root or nested, may have a Presentation URL. This URL can be entered into the address bar of a web browser to navigate to the root web page of a Device. This URL is returned in the Device Description. |
| Control URL | Points to the Control Server implementing a Service on a Controlled Device. There is one Control URL per instance of a Service. This URL is returned in the Device Description. |
| Event Subscription URL | Points to an Event Subscription Server on a Controlled Device. This URL is returned in the Device Description. |
| Event Sink URL | Points to an Event Sink (an HTTP Server) on a Control Point. This URL is specified by the Control Point in the GENA SUBSCRIBE message. |

Device Discovery and Identification

UPnP enables SSDP searches for a unique Root or non-Root Device by UDN, devices of a specified Device Type and devices containing a Service of a specified Service Type. UPnP also supports a search for all Root devices.

UPnP SSDP Level Searches and Results

| Search for | Returns |
| --- | --- |
| A unique Root Device (by UDN) | A single Description URL pointing to the Description Server and Document path on the Root Device. |
| A unique non-Root Device (by UDN) | A single Description URL pointing to the Description Server and Document path on the Root Device that contains the non-Root Device. |
| Type of Device | A set of Description URLs pointing to the Description Servers/Document paths of all Root Devices that match the Device Type, or contain a non-Root Device that matches the Device Type. |
| Type of Service | A set of Description URLs pointing to the Description Servers/Document paths of all Root Devices that contain a matching Service, or contain a non-Root Device that contains a matching Service. |

SSDP specifies Service Type (ST), Notification type (NT), and Unique Service Name (USN) header fields for queries and for announcements. UPnP uses the ST or NT header to carry one of the UPnP defined identifiers. A unique USN is required for each unique SSDP announcement.

Multiple instances of the same Service Type within a Controlled Device 106–107 or Bridge 120 are not independently announced.

UPnP search identifiers are used during the discovery process. The result of a successful discovery is one or more Description URLs. The format for search identifiers is:

```
upnp:searchtype: [ allformat | UDNformat | srvformat
| devformat ]
search type = [ UDN | SrvType | DevType | all ]
allformat = all
UDNformat = UDN:namespace:uniqueid
namespace = [ GUID | IEEEMAC | 1394]
srvformat = SrvType:servicetype:version
devformat = DevType:devicetype
```

SSDP specifies that SSDP announcements must be made for all SSDP searchable values. The SSDP announcements with "all" as the notification header value must carry the Root Device UDN as the USN header value. SSDP announcements for Device Types must carry the UDN of the Root Device concatenated with the Device Type URI as the USN header value. SSDP announcements for a Service Type will carry the UDN of the Root Device concatenated with the Service Type URI value as the USN header value. SSDP announcements of UDNs will repeat the UDN value as the USN header.

UPnP SSDP Announcements

| Announcement | UPnP Notification Type | SSDP USN |
| --- | --- | --- |
| | "all" | Root Device UDN |
| Unique Root Device | Root Device UDN | Root Device UDN |
| Unique non-Root Device | Non-Root Device UDN | Non-Root Device UDN |
| Device Type | Device Type Identifier | Root Device UDN + Device Type Identifier |
| Service Type | Service Type Identifier | Root Device UDN + Service Type Identifier |

UPnP Bridges 120 (FIG. 2) announce Bridged Devices 122–123 and associated Services using SSDP. The identifiers associated with the Bridged Devices are unique for the device, and they do not duplicate identifiers for Controlled Devices and Services directly available on the Bridge itself. This means that a Bridge that is also a Controlled Device must announce Bridged Devices and local Controlled Devices independently, with appropriate unique identifiers, Device Descriptions and associated URLs.

Description

The UPnP Device Description 226 (FIG. 3) provides the information necessary to identify, describe, connect and control a UPnP Controlled Device 106–107 or Bridge 120 from a Control Point 104–105.

The Device Description is an XML document. UPnP defines the use of HTTP and XML for the Device Description and wire protocols. UPnP adheres to the schema declaration rules of XML-Data and Y. Goland, "Flexible XML Processing Profile."

The top level XML elements are separated into three categories: per Device, per Service and shared.

Rehydrator

Figure 7:
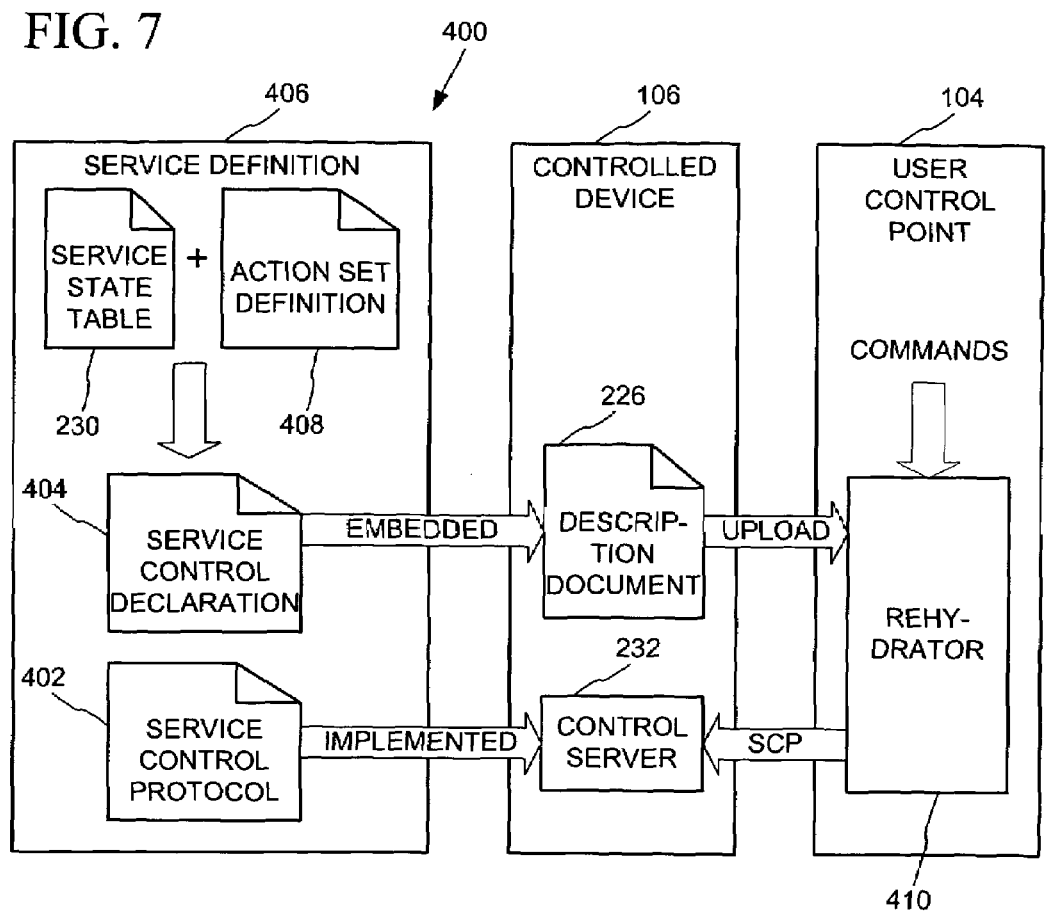
FIG. 7 is a block diagram of a programmatic interface-to-network messaging adapter or Rehydrator in the device control model of FIG. 3.

With reference now to FIG. 7, all (UPnP) Controlled Devices 106–107 (FIG. 1) or Bridges 120 (FIG. 2) expose one or more Services 210–217 (FIG. 3) that can be controlled remotely. Controlling such Services involves a message exchange between a Control Point 104 and the device 106. This message exchange happens according to a specific Service Control Protocol (SCP) 402, which specifies the content and sequence of the messages exchanged.

Control Points 104 are not required to have any prior knowledge of the SCPs 402 required to control the Services on the various devices. Therefore, a Controlled Device or Bridge must be able to describe to a Control Point the protocols required to control its Services, such that the Control Point will be able to implement these protocols dynamically. This requires a standard way of declaring Service Control Protocols in a concise and unambiguous fashion. UPnP introduces a technique for declaring Service Control Protocols using a series of XML documents.

As part of the Service Description 406, a Service State Table 230 and Action set 408 are defined. These things can be combined in a deterministic way defined by UPnP to produce a Service Control Protocol Definition (Service Description) 406, which includes a Service Control Declaration 404 and a Service Control Protocol 402. The Service Description 406 is a representation of the schema of a Service. It is possible to reconstruct the SST, Action set and SCP from the Service Description.

A Rehydrator 410 is a module in the Control Point that exposes a suitable API to applications and either invokes Actions on a Service or queries the state of that Service, or receives and responds to events. The primary job of the Rehydrator is to map between API calls and the Service Control Protocol sequence that invokes the Action.

The Service Description is directly embedded into the Device Description 226 of a Controlled Device. When the Device Description is uploaded into the Control Point 104, the Rehydrator 410 can extract the Service Description from it. At this point, the Rehydrator has enough information to issue Service specific SCPs 402.

General Operation of the Rehydrator

Figure 8:
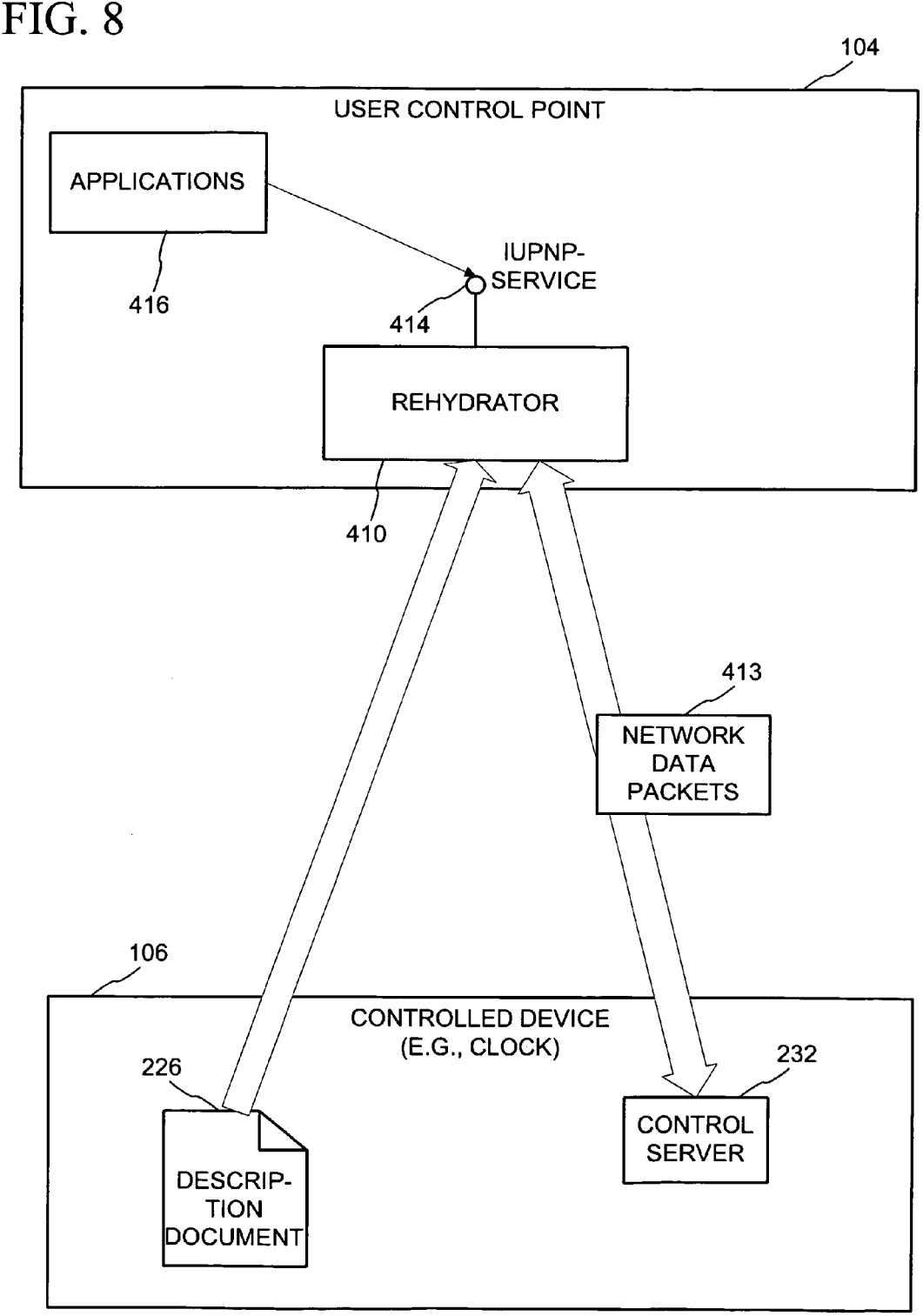
FIG. 8 is a general data flow diagram of the Rehydrator of FIG. 7 in the device control model of FIG. 3.

More generally with reference to FIG. 8, the Rehydrator 410 operates as a universal adapter to provide a programmatic interface to any service-specific protocol of a remote computing device. The Rehydrator 410 simply obtains a data description or declaration of the methods, properties and events of the remote service, as well as a definition of the protocol of network data messages through which the Rehydrator invokes the methods, queries or sets the properties, and receives event notifications. In UPnP, this data description takes the form of the Device Description 226. The Device Description 226 also includes a declaration of the methods, properties and events for the Service. This information is sufficient for the Rehydrator to exchange the appropriate network data packets to interact with the Controlled Device Service, including to invoke Actions, query and set properties, and receive and respond to events, without download of any executable code to the Control Point 104 device and with a zero installation or configuration experience.

Figure 9:
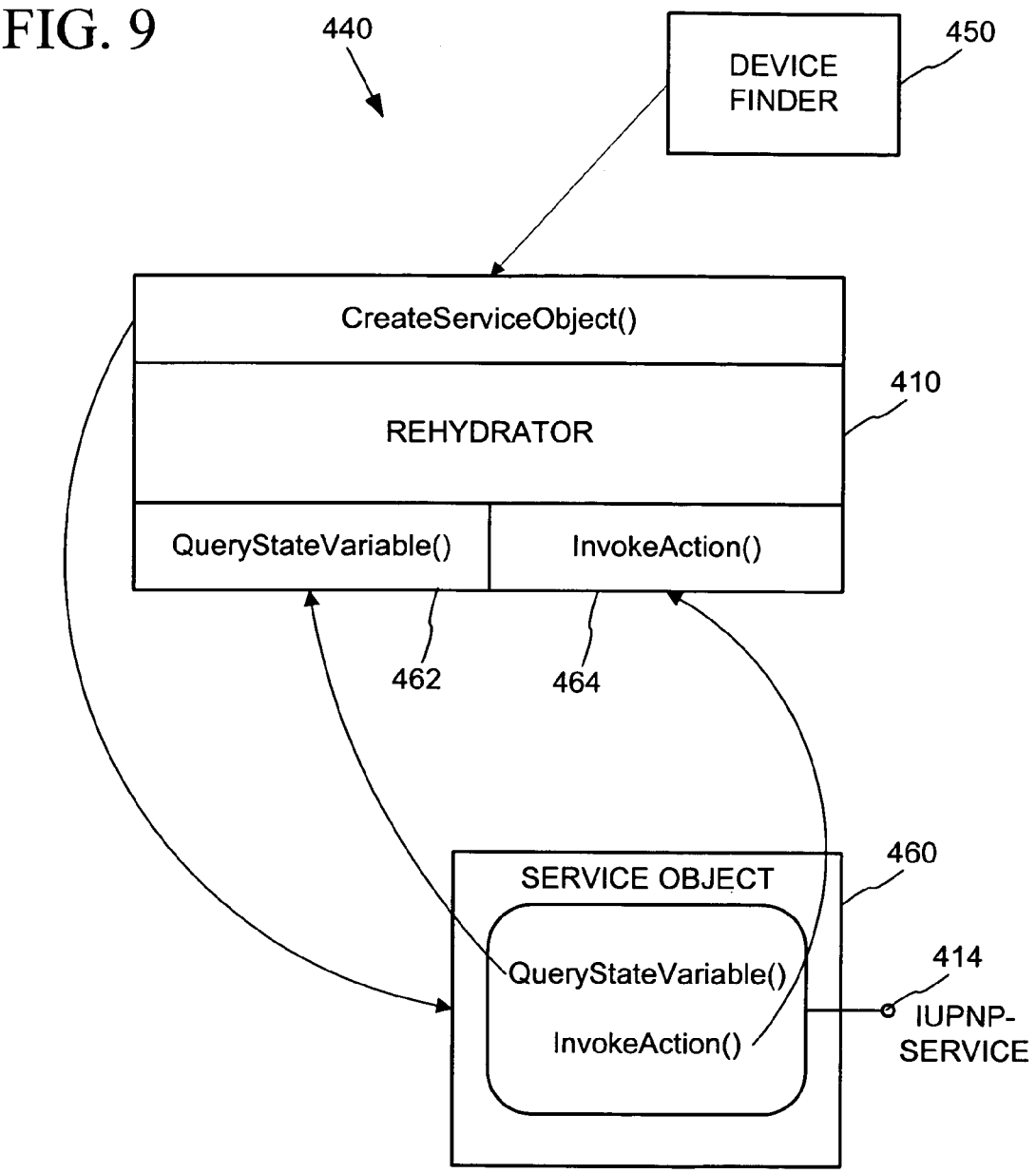
FIG. 9 is a block diagram of an implementation design of the Rehydrator of FIG. 7.

With reference to FIGS. 8 and 9, the Rehydrator 410 exposes a programmatic interface (IUPnPService interface 414 defined in the listing shown in FIG. 38) for programmatic access by the Browser User Interface (FIG. 10) or other application on the Control Point to Controlled Device Actions. In the illustrated Rehydrator 410, the IUPnPService interface is supported on a Service Object 460 provided by the Rehydrator. The IUPnPService interface is a COM object integration interface conforming to the Microsoft Common Object Model (COM), which exposes a set of method members that can be invoked through local or remote procedure calls from the Browser or other Control Point application. Alternatively, the IUPnPService interface can be implemented as an object integration interface conforming to another object-oriented programming model, such as CORBA, Java classes, and scripting engine name extensions; or as other type programmatic interface. The methods exposed to the Browser and Control Point applications on the IUPnPService interface 414 permit the Browser or other Control Point application to programmatically invoke the Actions of Controlled Device Services. The Rehydrator converts the programmatic invocation from the Browser or other Control Point application to the appropriate XML network messages to invoke the Actions of the Controlled Device Service.

In an alternative implementation, the Rehydrator produces service-specific programmatic interfaces corresponding to Controlled Device Services for use by applications at the Control Point. Such programmatic interface is an application programming interface that can be in the form of an object integration interface of an object-oriented programming model, such as Microsoft COM, CORBA, Java classes, and scripting engine name extensions. In the example of a Controlled Device having a clock Service with "get time" and "set time" Actions, the Rehydrator 410 exposes a COM object integration interface ("IClock" interface), with methods getTime( ) and setTime( ), for the Controlled Device having a "Clock" Service with GetTime and SetTime Actions. The Rehydrator 410 converts calls of an application program 416 to the IClock interface 414 into the network data messages specified in the Device Description to invoke the corresponding Actions of the Clock Service. The Rehydrator 410 likewise creates suitable further programmatic interfaces for other Services (e.g., Services 210–217 of FIG. 3) based on the Device Description of their respective Controlled Devices.

Accordingly, the Rehydrator operates as a universal proxy object with data-driven conversion of programmatic interfaces to network data messages. Further, the Rehydrator exposes a programmatic interface at the Control Point through which Controlled Device Actions can be invoked, based solely on an XML data description. This operation allows the Rehydrator to produce just-in-time transient interfaces to remote device Services without the complexity of code downloads and installation or configuration. Upon a later release of the interface by the application, the Rehydrator destroys the interface without need to de-install or clean up persistent configuration data in a registry or configuration file of the operating system or object execution run-time.

Rehydrator Implementation

Summary. With reference to FIG. 9, a preferred implementation 440 of the Rehydrator 410 is as an internal Microsoft Windows component that routes service control requests from the UPnP API to devices. Applications wishing to control a service on a UPnP device obtain a Service object through the UPnP API and use the methods of this object to query the state variables of the service and invoke its actions. Those methods use the private Rehydrator API to turn the service control requests into network messages that travel to the UPnP device. In this sense, the Rehydrator performs a mapping between API calls and network protocols.

Basic Functionality. The preferred implementation of the Rehydrator is able to translate a service control call to the UPnP API into the appropriate network messages defined by the Service Control Protocol.

Asynchronous Event Notification. The preferred implementation of the Rehydrator is able to notify UPnP API clients of any asynchronous events generated by the devices they are controlling. Event notification is done by means of the event interfaces defined below.

Error Reporting. For a variety of reasons, state variable queries and action invocations may fail. The preferred implementation of the Rehydrator is able to provide a way to communicate the success or failure status of such operations to the parties initiating them.

Rehydrator Implementation Design. As illustrated in FIG. 9, the preferred implementation of the Rehydrator is used in two ways. First, the Device Finder 450 uses it to create Service objects 460. Then, these Service objects use it to carry out service control operations (querying state variables and invoking actions).

Creating Service Objects. When the Device Finder 450 creates a Device object, it invokes the Rehydrator 410 to create Service objects 460 for each of the service instances on that device. Each service instance supports a particular Service Control Protocol and the Rehydrator needs a description of this protocol in order to create a properly hydrated Service object.

The Service Control Protocol is declared in the Service Description. This document is passed to the Rehydrator as an IXMLDOMDocument interface pointer in the Rehydrator CreateServiceObject( ) API call.

```
HRESULT
HrRehydratorCreateServiceObject (
    IN      LPCWSTR             pcwszSTI,
    IN      LPCWSTR             pcwszControlURL,
    IN      LPCWSTR             pcwszEventSubURL,
    IN      LPCWSTR             pcwszId,
    IN      IXMLDOMDocument     * pSCPD,
    OUT     IUPnPService        ** pNewServiceObject)
```

This API returns a pointer to an IUPnPService interface on a newly created Service object. In addition to the creating the Service object, the Rehydrator sets up its internal data structures so that it can properly handle requests to control the service. Specifically, it creates a list of the properties and actions exported by the service and stores these as private data within the service object. The control and event subscription URLs as well as the service identifier and service type identifier are also stored in the service object.

Querying Service Properties. Applications can query the values of service properties by invoking the IUPnPService::QueryStateVariable( ) method on a Service object. Internally, this method makes a call to the HrRehydratorQueryStateVariable( ) function.

```
HRESULT
HrRehydratorQueryStateVariable(
    IN      OUT SERVICE_STATE_TABLE_ROW * psstr,
    IN      LPCWSTR             pcwszSTI,
    IN      LPCWSTR             pcwszControlURL,
    OUT     LONG                * plTransportStatus)
```

The first parameter is a SERVICE_STATE_TABLE_ROW structure that encapsulates the state variable being queried. The second parameter is the service type identifier and the third is the control URL of the service. The fourth parameter returns the HTTP status of the operation.

This function will generate an HTTP request to the control server on the device. The body of this request will be an XML fragment containing a SOAP-encoded request for the variable's value. The following is an example of such a request:

```
POST path of control URL HTTP/1.1
HOST: host of control URL:port of control URL
CONTENT-LENGTH: bytes in body
```

-continued

```
CONTENT-TYPE: text/xml; charset="utf-8"
SOAPACTION: "urn:schemas-upnp-org:control-1-0#QueryStateVariable"
<s:Envelope
xmlns:s="http://schemas.xmlsoap.org/soap/envelope/"
s:encodingStyle="http://schemas.xmlsoap.org/soap/encoding/">
<s:Body>
<u:QueryStateVariable xmlns:u="urn:schemas-upnp-org:control-1-0">
<u:varName>variableName</u:varName>
</u:QueryStateVariable>
</s:Body>
</s:Envelope>
```

The control server will respond to this message with another XML fragment: the SOAP-encoded method response. The following is an example of such a response:

```
HTTP/1.1 200 OK
CONTENT-LENGTH: bytes in body
CONTENT-TYPE: text/xml; charset="utf-8"
DATE: when response was generated
EXT:
SERVER: OS/version UPnP/1.0 product/version
<s:Envelope
xmlns:s="http://schemas.xmlsoap.org/soap/envelope/"
s:encodingStyle="http://schemas.xmlsoap.org/soap/encoding/">
<s:Body>
<u:QueryStateVariableResponse xmlns:u="urn:schemas-upnp-org:control-1-0">
<return>variable value</return>
</u:QueryStateVariableResponse>
</s:Body>
</s:Envelope>
```

The rehydrator will extract the return value from this XML fragment, place it in the SERVICE_STATE_TABLE_ROW structure whose address was passed as the first parameter to the HrRehydratorQueryStateVariable( ) function and then return.

Invoking Service Actions. The process of invoking a service action is very similar to querying a state variable. An application calls IUPnPService::InvokeAction( ) on a Service object, passing it the name of an action to invoke, and an array of arguments to the action. Internally, IUPnPService::InvokeAction( ) calls RehydratorInvokeServiceAction( ), declared as shown below.

```
HRESULT
HrRehydratorInvokeServiceAction(
    IN      SERVICE_ACTION      * pAction,
    IN      SAFEARRAY           * psaInArgs,
    IN      LPCWSTR             pcwszSTI,
    IN      LPCWSTR             pcwszControlURL,
    IN      OUT SAFEARRAY       ** ppsaOutArgs,
    OUT     VARIANT             * pvReturnVal,
    OUT     LONG                * plTransportStatus)
```

The first parameter is a structure describing the action to be invoked, the second is an array of input arguments, the third is the service type identifier, and the fourth is the control URL of the service. The out parameters and return value are returned in the fifth and sixth parameters, respectively. The HTTP status of the operation is returned in the seventh parameter.

RehydratorInvokeServiceAction( ) will send an HTTP request to the control server identified by the second parameter. As before, the body of this message will be an XML fragment containing a SOAP-encoded method call. An example HTTP request to invoke an action is shown below.

```
POST path of control URL HTTP/1.1
HOST: host of control URL:port of control URL
CONTENT-LENGTH: bytes in body
CONTENT-TYPE: text/xml; charset="utf-8"
SOAPACTION: "urn:schemas-upnp-org:service:serviceType:v#action-
Name"
<s:Envelope
xmlns:s="http://schemas.xmlsoap.org/soap/envelope/"
s:encodingStyle="http://schemas.xmlsoap.org/soap/encoding/">
<s:Body>
<u:actionName xmlns:u="urn:schemas-upnp-org:service:serviceType:v">
<argumentName>in arg value</argumentName>
other in args and their values go here, if any
</u:actionName>
</s:Body>
</s:Envelope>
```

The encoding of the body of this message is again specified in the Service Control Protocol. The Rehydrator will wait for the HTTP response to this request, which would look something like the example below.

```
HTTP/1.1 200 OK
CONTENT-LENGTH: bytes in body
CONTENT-TYPE: text/xml; charset="utf-8"
DATE: when response was generated
EXT:
SERVER: OS/version UPnP/1.0 product/version
<s:Envelope
xmlns:s="http://schemas.xmlsoap.org/soap/envelope/"
s:encodingStyle="http://schemas.xmlsoap.org/soap/encoding/">
<s:Body>
<u:actionNameResponse xmlns:u="urn:schemas-upnp-
org:service:serviceType:v">
<argumentName>out arg value</argumentName>
other out args and their values go here, if any
</u:actionNameResponse>
</s:Body>
<s:Envelope>
```

After receiving a response such as this, the Rehydrator will extract the return value, place it in the out parameter it was passed, and then return.

FIGS. 31 through 43 are program listings defining various interfaces used in the preferred implementation of the Rehydrator, including an IUPnPDevice Interface, an IUPnPPropertyBag Interface, an IUPnPService Interface, an IUPnPDevices Interface, and an IUPnPServices Interface.

Control Point

Figure 10:
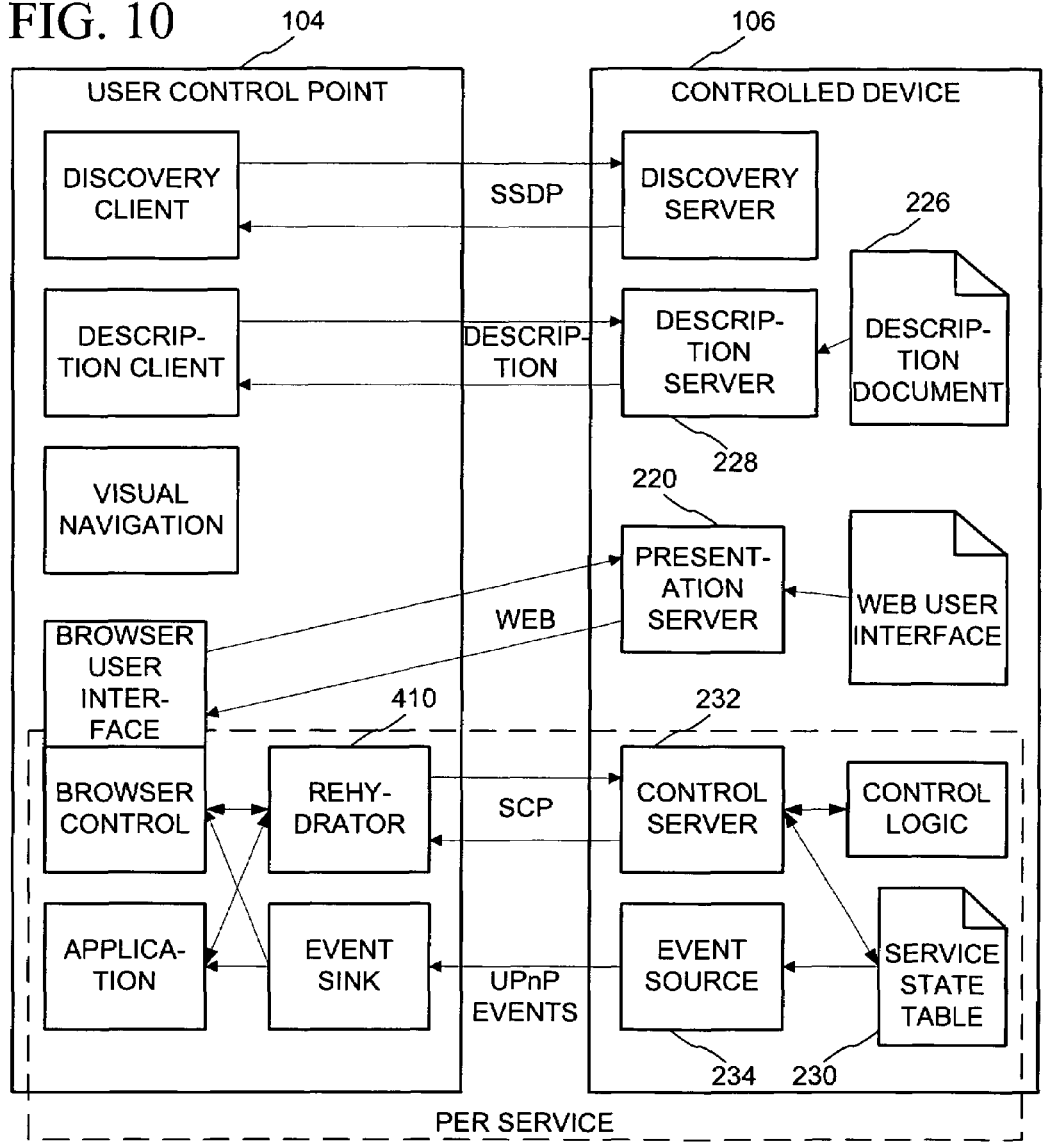
FIGS. 10 and 11 are block diagrams illustrating an internal software architecture of the Control Point and controlled device in the device control model of FIG. 3.
Figure 11:
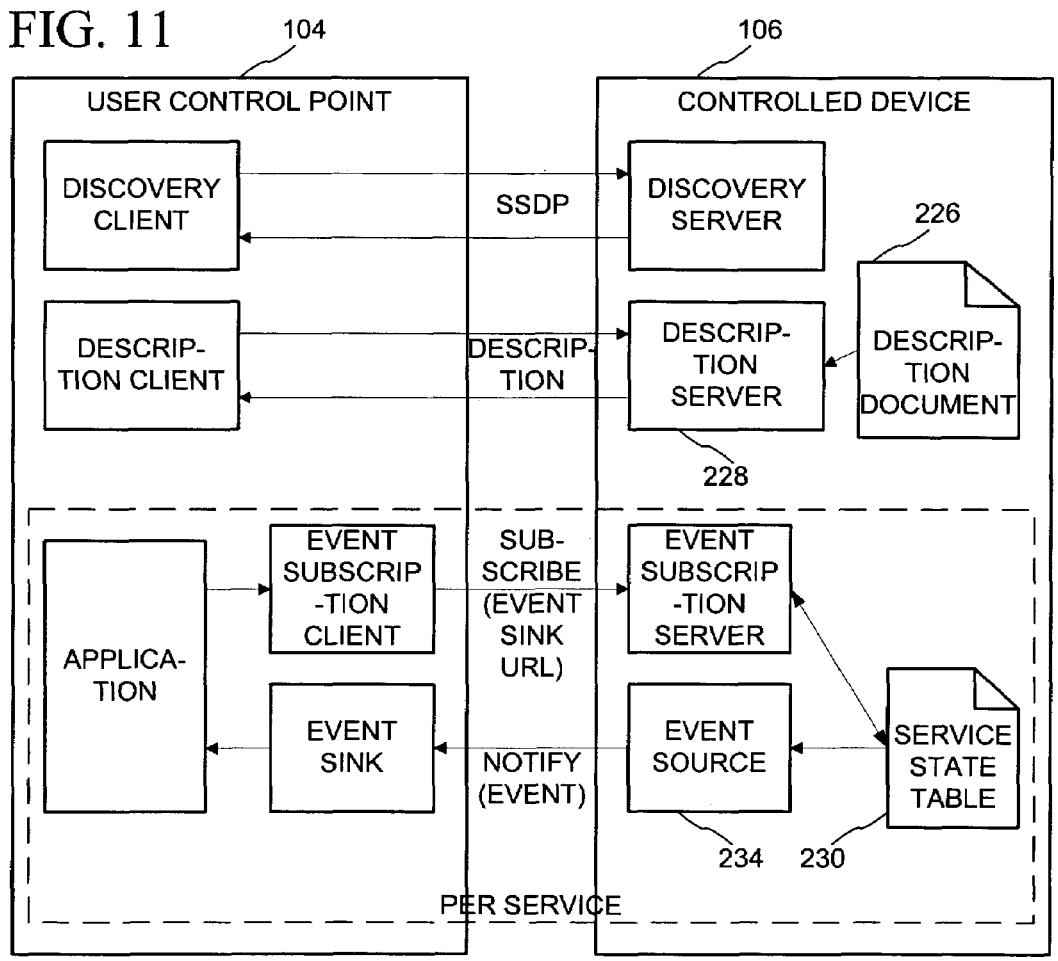
Figure 12:
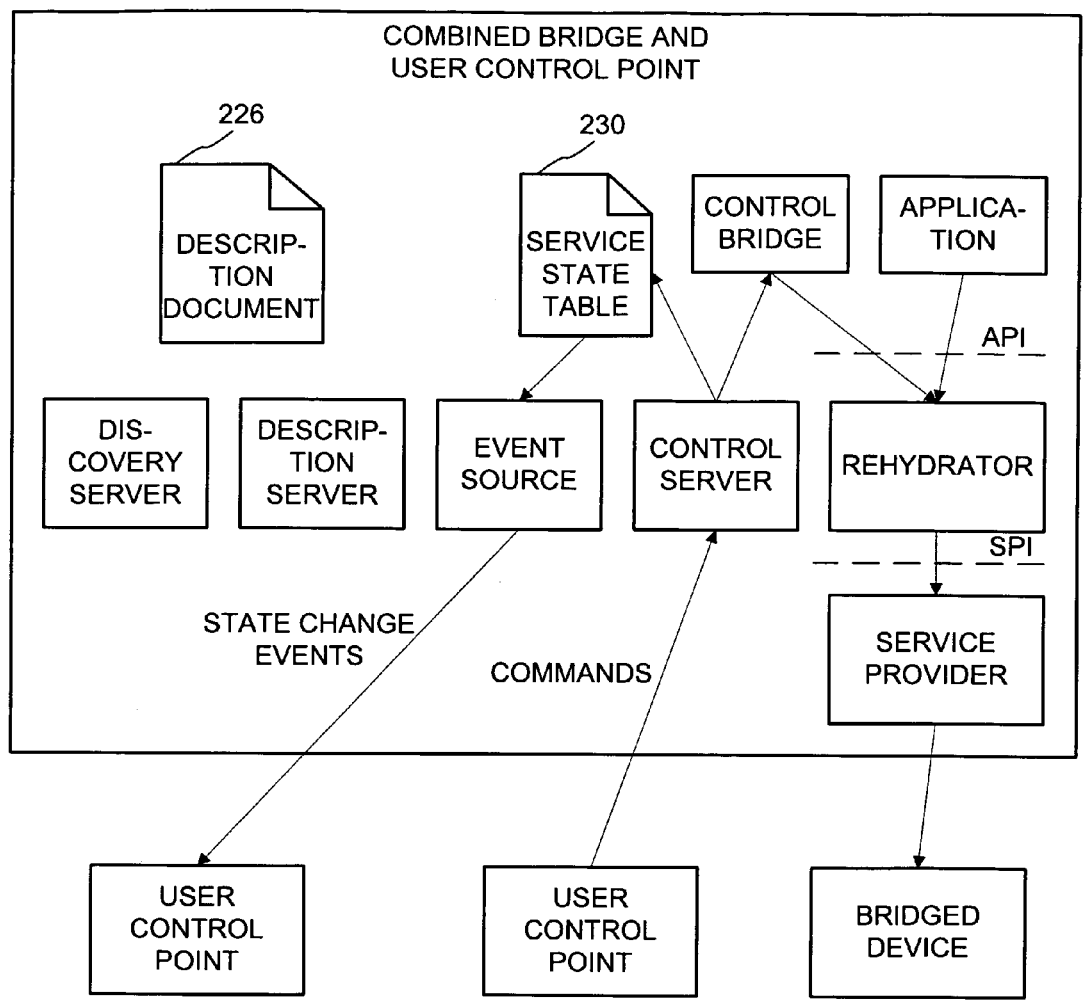
FIG. 12 is a block diagram illustrating an internal software architecture of a combined bridge and Control Point in the device control model of FIG. 3.

With reference now to FIGS. 10 and 11, the Control Points 104 include Visual Navigation, Browser, Discovery Client, Event Subscription Client, Event Sink and Rehydrator modules.

The Visual Navigation module provides the Control Point functionality that displays the icons of discovered Devices and enables the transfer of control to a browser or application to interact with the Controlled Device. In Windows, Visual Navigation could be implemented as a folder of icons.

The Discovery Client is a module that runs in a Control Point that initiates SSDP queries.

The Browser is the Presentation Client. A web browser extended with a Rehydrator.

The Rehydrator is the Control Client. A Control Point module that translates between native operating system APIs and SCPs and events. The Rehydrator uploads Service Descriptions from Controlled Devices and Bridges and generates appropriate SCPs in response to application API requests to invoke Actions.

The Event Subscription Client is a module that runs in a Control Point that sends GENA SUBSCRIBE messages to the Event Subscription Server.

The Event Sink module runs in a Control Point and accepts incoming GENA event NOTIFYs. This service consists of a TCP/HTTP server that passes the event information to interested applications running on the Control Point. The Event Sink is identified by an Event Sink URL. This URL, supplied by a Control Point, is used as an address to send event NOTIFYs to. This URL is valid as an address for the lifetime of the Hostname embedded in the URL. There is no explicit relationship between Event Sink URLs and Subscription Identifiers.

Device Description

Figure 13:
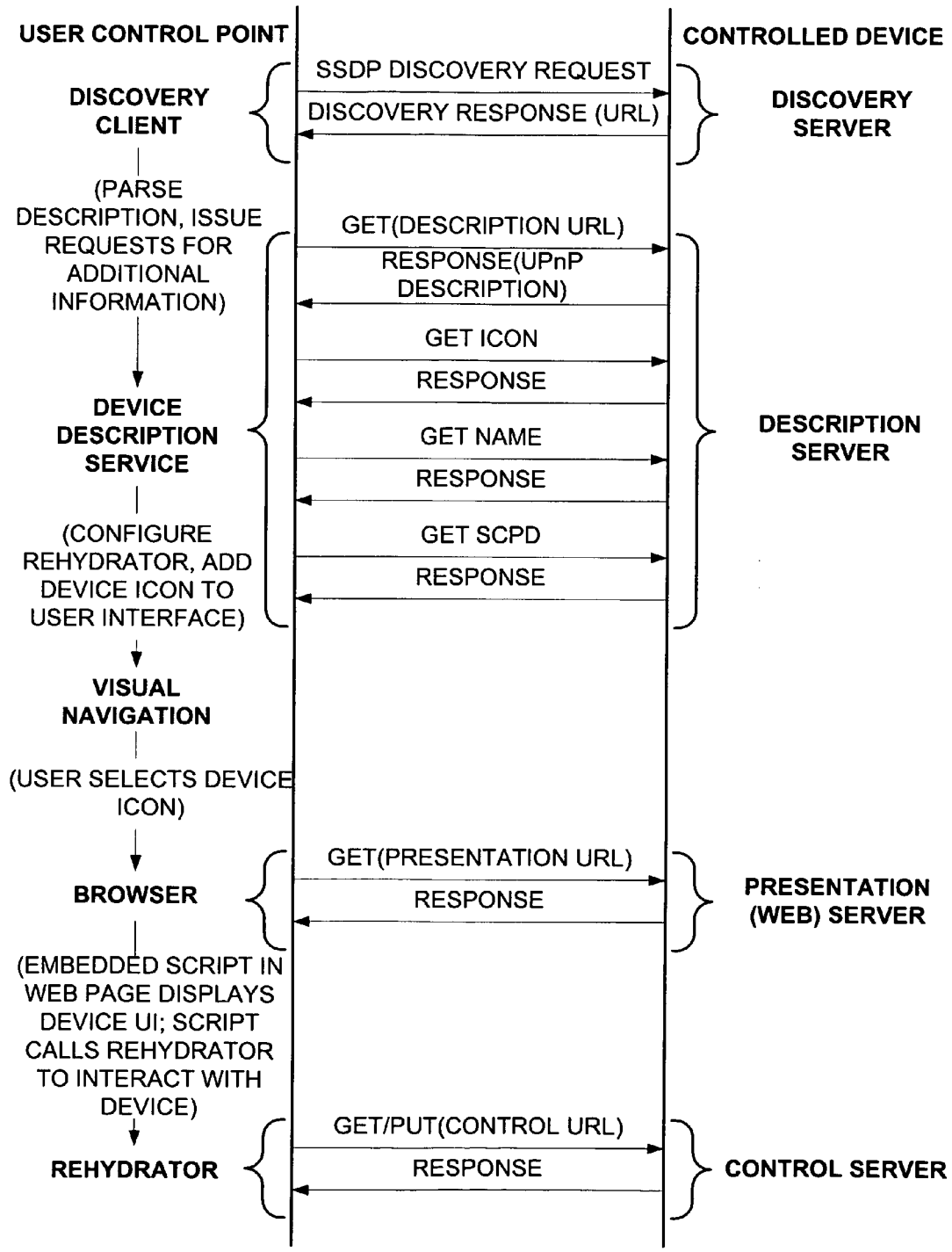
FIG. 13 is a data flow diagram illustrating a typical browsing protocol sequence in the device control model of FIG. 3.

With reference to FIG. 13, Control Points 104 can retrieve a Device Description 226 by issuing an HTTP GET on a Description URL. This URL is returned in the location header of either an SSDP announcement or an SSDP query response.

The HTTP GET must include an accept-language header that is used to request the preferred language of the response. If the requested language is not supported, a Device Description in the default language supported by the Controlled Device or Bridge may be returned.

An HTTP GET is used to retrieve sub elements of a Device Description that are expressed as URLs.

URL Handling

URLs embedded in Device Descriptions 226 take one of 3 forms: a fully qualified URL or a relative URL.

Fully qualified URLs take the form:

http://devicename/pathname

The devicename part of the URL is a Hostname or IP address and the pathname is a filesystem path or equivalent. A fully qualified URL is used "as is" to establish an HTTP connection to a device.

A relative URL does not contain the ":" character and is of the form:

pathname
/pathname

Relative URLS are a compact representation of the location of a resource relative to an absolute base URL. All relative URLs in a Device Description are appended to the value of the Device Description element <URLbase> to form fully qualified URLs.

Binary Data

Some elements of a Device Description are binary. XML does not directly support the embedding of binary data. In order to include binary data directly in a Device Description, one must convert the data to text using the Base 64 encoding scheme. This tends to increase the size of the data by 25% on the average. Much of this overhead can be eliminated if the binary data is passed by reference instead of by value. To reference binary data, a URL to the data is provided in a Device Description. The binary data can be retrieved by doing a HTTP GET with that URL.

As an example, consider the <image> element in the following Device Description:

```
<iconList>
  <icon>
    <size>16</size>
    <imageType>PNG</imageType>
```

```
              <color>1</color>
              <depth>8</depth>
              <image>
        "http://device.local/iconpath/icon.png"/>
              </icon>
            </iconList>
```

The icon would be retrieved with an HTTP GET of the following format:
GET iconpath/icon.png HTTP 1.1
Host: device.local
The HTTP response would look like:
HTTP/1.1 200 OK
Content-Type: image/png
Content-length: ###
<binary color icon data in the PNG format>
Device Description Layout The basic layout of the Device Description 226 is shown in FIG. 14. The elements of the Device Description are specified in the Appendix.

FIG. 15 shows an exemplary icon list in a Device Description 226.

Service Control Protocol and Service Description

As part of the Service Description 406 shown in FIG. 7, a Service State Table 230 and Action set 408 are defined. The Service Description 406 is a representation of the schema of a Service. It is possible to reconstruct the SST 230, Action set 408 and SCP 402 from the Service Description.

The declaration of such a protocol must specify the list of Variables that can be queried, the set of Actions that can be invoked, as well as the wire protocol (the content and sequence of network messages) required to carry out these operations. Service Description is specified in an XML documents. The Service Device Description 404, written in a language called Service Description Language, declares the list of state Variables and Actions associated with the Service Type to be controlled by the protocol.

Declaring the Service State Table and Action Set

A Service Description, written in UPnP Template Language 404 is used to specify the list of state Variables that a SCP can query and the set of Actions that it can invoke. UPnP Template Language is an XML schema, a set of rules for writing XML documents.

FIG. 16 shows an exemplary Service Description. This XML document consists of a root <Service Description> element containing two sub-elements, <serviceStateTable> and <actionList>. Within the <serviceStateTable> element is a <stateVariable> element for each state variable associated with the service. The Service in this example is a TV tuner with has only one state variable, currentChannel. The elements within the <stateVariable> element specify the name, data type and allowed values for the state variable. Had the Service more state variables, they would be represented by additional <stateVariable> elements within the <serviceStateTable> element.

The <actionList> element contains an <action> element for every action associated with the Service. The elements within an <action> element specify the name of the action and any arguments the action may take. In this case, the service supports two actions that do not take arguments, ChannelUp and ChannelDown, and another, SetChannel, that takes a new channel number as an argument. The <argument> element and the elements nested within it define the argument. The <relatedStateVariable> element within <argument> specifies the name of one of the state variables to which the argument is related. In the UPnP Device Model, all arguments to actions must correspond directly to some state variable.

FIGS. 17 and 18 show an XML schema for the Service Description Language.

Basic UPnP Eventing Architecture

Figure 19:
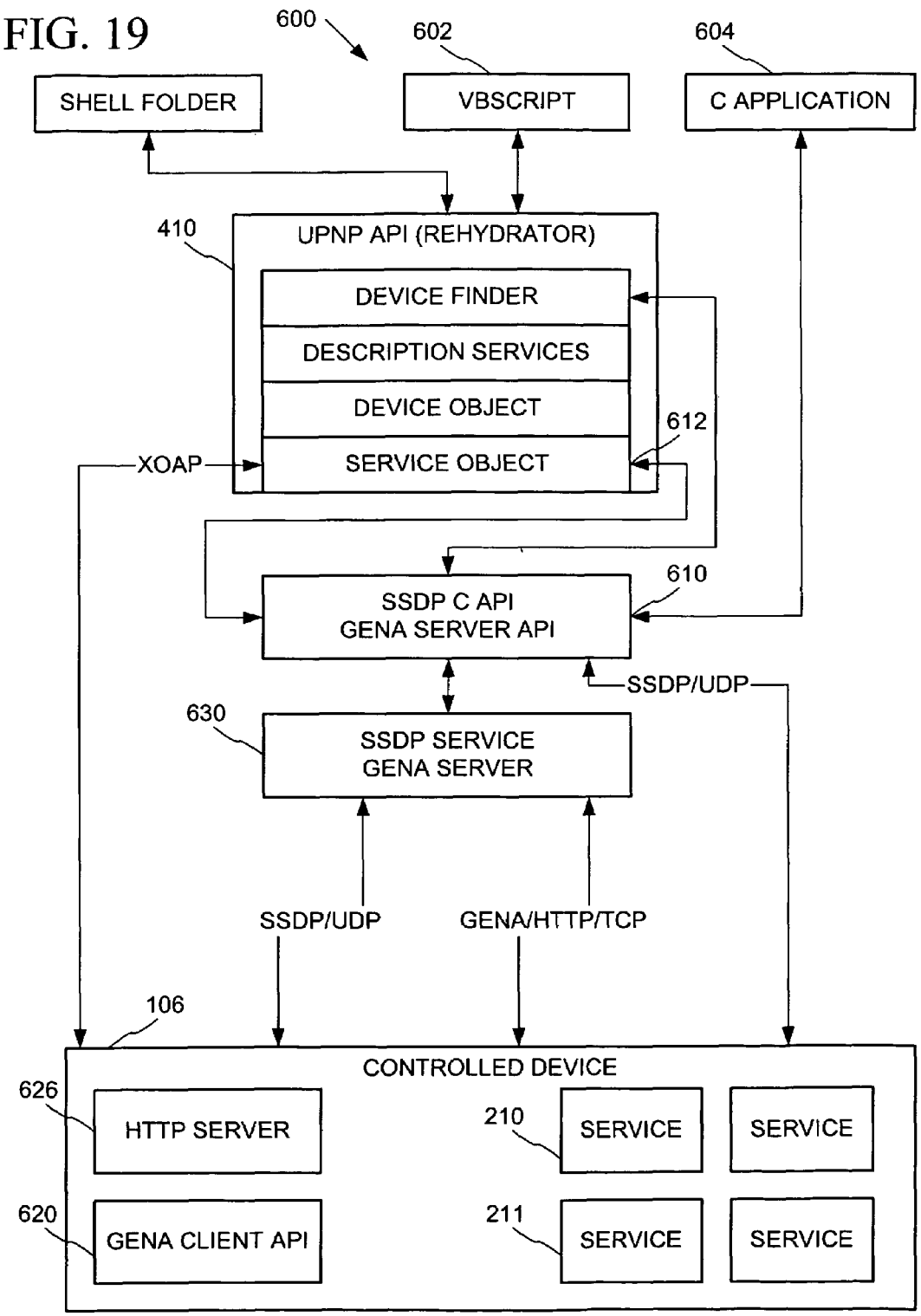
FIG. 19 is a block diagram of an eventing model used in the device control model of FIG. 3.
Figure 20:
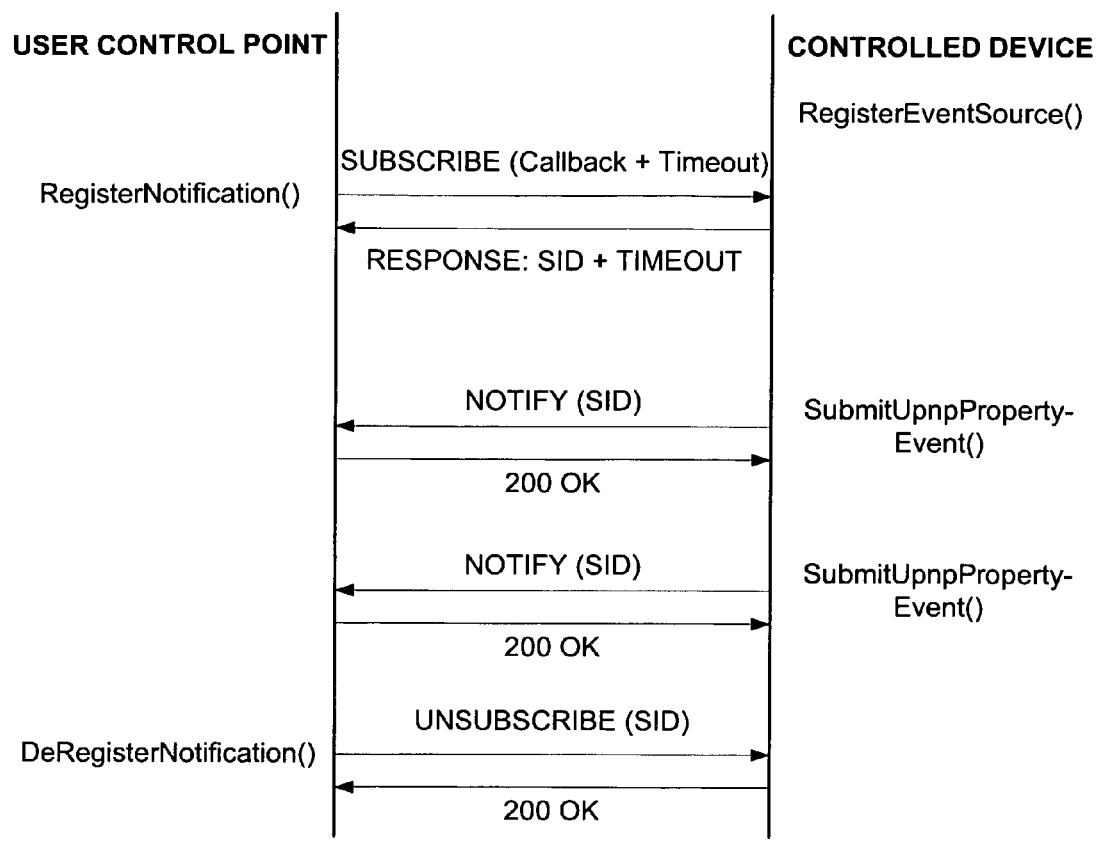
FIG. 20 is a data flow diagram illustrating subscription, notification and unsubscription in the eventing model of FIG. 19.

With reference to FIG. 19, the UPnP architecture 200 (FIG. 3) requires that clients of the UPnP API be enabled to receive notifications reliably from UPnP services 210–217 as their states change. Since state changes are relatively common, the eventing subsystem is efficiency and performance is a major consideration in this design. FIG. 19 and the following discussion describe the Basic UPnP Eventing Architecture 600, which encompasses both the controlled device 106 and Control Point 104 sides of the eventing service. It also includes the support APIs for both a low-level service interaction and a higher level COM-based wrapper of those APIs. The latter enables automation controllers like Visual Basic 602 to receive event notifications.

What is an Event?

Property change events are defined as any change in the value of a row of the Service State Table (SST) 230 (FIG. 3) for a service 210–217. This change will be reflected as a property change notification. For example, if a "VCR" device has a "VCR Transport" service, one row in that service's SST may be TapeState and the value could be TapePresent. If the tape is ejected, the new value would be TapeAbsent. This state change would be reflected as a notification sent to all subscribers.

What is a Notification?

A UPnP event notification is an XML message sent over HTTP/TCP to each and every subscriber to a particular UPnP service. The content of the XML is defined below. The important contents of this message are the unique identifier for the subscription, the property name and new value.

Notification Processing

In UPnP, the listener to Notifications is the SSDP service itself. SSDP already listens on another multicast address for "alive" and "byebye" messages sent by UPnP devices. The same listener will listen on a TCP port for notifications sent. All subscriptions sent from that Control Point contain the same callback URL and so all notifications will be directed to that URL. When a notification arrives the SSDP service will examine the NT header of the message and determine if it is an event notification. If so, the message is parsed further to determine if it should be forwarded on to subscribers (which must exist). GENA defines the format of the HTTP message, what headers can be used, and what they can be used for.

GENA

GENA is the protocol of communication that, in a preferred embodiment, UPnP devices use to send event notifications. Therefore, UPnP devices that wish to notify Control Points of state changes are recommended to use GENA. Notification subscribers will never be required to interact with a UPnP device directly and so they are not required to use GENA. The eventing API will encapsulate this complexity. Other appropriate event transport protocols may be used, such as publish/subscribe systems.

Receiving Notifications

Applications written in C (C Application 604) will be able to utilize the SSDP C API 610 to receive callbacks when notifications are processed by the SSDP service. This is analogous to SSDP clients registering for notifications that services have become available. When a Control Point registers for a notification, it passes as a parameter the URL of the service for which it is interested in receiving notifications. This URL is obtained from the Device Description for that service. (When a service is registered on a UPnP device, it uses this same URL to listen for subscription requests).

When a notification message is received by the SSDP service listener, the SID header is checked against the list of subscribers it maintains. If a subscriber is found, the callback function for that subscriber is invoked, with one of the parameters being the contents of the notification message. The notification client that implements the callback function can process this message in any appropriate way.

Notifications in the UPnP API

The UPnP API 410 is a consumer of the basic C interface provided by the SSDP C API 610 component. In order to integrate seamlessly, the registration of notifications is handled by the Service Object 612 inside the UPnP Object Model. Service objects will register for notifications when they are created. This ensures that the SST is maintained by the UPnP API and is kept up to date. They will implement the callback function required by the registration function. If this callback function is invoked, it will pass on that notification to Control Points. The Control Points can be written in C, C++, VB, or script code, so the mechanism for passing on notifications can be different.

Script Support

A feature of the illustrated eventing system is that it supports script languages such as VBScript 602. For VBScript, this is made possible by providing a property on the Service object that, when set, contains the IDispatch pointer for a VBScript function or subroutine that will be the event handler. When the Service object's notification callback is invoked, it checks to see if this IDispatch pointer was set, and if so, it calls IDispatch::Invoke on DISPID 0 of that interface to call the VBScript subroutine.

Eventing Subsystem Terminology

Control Point. Any piece of software that searches for devices and controls them.

Controlled Device. A hardware or software device that announces its availability thru SSDP and allows control by Control Points.

Subscriber—A Control Point who wishes to be notified of event changes.

Notifying Resource (or simply "Resource")—For the purposes of this document, this will always be a service contained within a UPnP Controlled Device 106.

Event Source—a service that provides events. UPnP services are event sources. All notifying resources are event sources and vice versa.

Event—message generated when a change in a resource's state occurs.

Property—a single entry in the service's state table whose DefaultValue can change. Properties and events always have a one to one correspondence.

Subscribing To Resources

Integrating with the UPnP API

The UPnP API 410 exposes several interfaces with which a consumer can find and enumerate devices, control services, and get properties on devices and services. To allow the integration of events into this model, we add a new property to the IUPnPService interface called EventHandler. When this property is set, it tells the Service object 612 that its client is interested in receiving notifications for that service. The SSDP API RegisterNotification( ) API is called when the Service object is created so that it can maintain a local copy of the SST for that service. The Service object knows the URL of the service and therefore it can provide this as a parameter to RegisterNotification( ). RegisterNotification( ) is also provided a callback function which is a static member of the Service object class. This function will be invoked for each and every notification sent by that particular UPnP service.

The Notification Callback

The Service object 612 includes a static member function called EventNotifyCallback( ) which is invoked for each notification sent by the UPnP service. The callback is passed the entire HTTP message contents in a structure which is a parameter to the function. The prototype looks like this:

```
static VOID
CUPnPService::EventNotifyCallback(SSDP_CALLBACK_TYPE
ssdpType,
SSDP_MESSAGE *pssdpMsg,
   LPVOID pcontext);
```

The ssdpType parameter should always be SSDP_EVENT. The pssdpMsg parameter contains the relevant information about the event. The key piece of information is the body of the XML message. The body contains information about what property changed, what its new value is and what type it is, among other information. The pContext parameter will always be the this pointer of the Service object. This allows the code to call a method to fire the event to the Control Point. The callback will parse the XML body using the XML DOM services. Property changes are iterated and the local SST is updated to reflect these changes. After this processing is done, an event notification may be fired for each property that was changed to the owner of the subscription if one exists. Depending on what environment the owner is written in (C++ or script, etc . . . ), a different mechanism for firing the event may be employed.

A special case for this process is the very first notification received after a subscription is established. This notification contains the entire set of properties and their values and is used to locally sync up the SST. Events will not be fired to clients of the UPnP API in this case.

Firing Notifications

When the EventNotifyCallback( ) function is called, the local copy of the SST for the service is updated. After this, an event needs to be fired if a subscriber exists. A subscriber exists if the put EventHandler( ) method was called, either from VBScript, C++ code, or another source. To abstract away this complexity, a new interface called IUPnPServiceCallback is needed.

This interface has a method called StateVariableChanged( ) which takes several parameters. When the IUPnPService::AddCallback( ) function is called, its argument is an IUnknown. This pointer is QueryInterface'd( ) for IDispatch first, and if it succeeds, then IDispatch::Invoke( ) is called with DISPID 0 to invoke the default method. This allows VBScript 602 to be called. If that fails, however, it is Queried for IUPnPServiceCallback, and if that succeeds, the StateVariableChanged( ) method is called with the same parameters as for Invoke( ). The handles C++ Control Points effectively.

Subscribing with C++

To subscribe to a UPnP service from C++, a Control Point instantiates a UPnP service object, and calls the IUPnPService::AddCallback( ) function. This function takes one parameter, an IUnkown interface pointer to an object that implements IUPnPServiceCallback.

Subscribing With VBScript

To subscribe to a UPnP service's events, all that needs to be done by a script 602 is to create a function or subroutine as a handler function and set the pointer of that function to the EventHandler property of the Service object. Now, anytime an event is fired, this VBScript function or subroutine will be called. In VBScript, this is written as the following:

```
Dim devicefinder
Set devicefinder =
CreateObject("UPnP.UPnPDeviceFinder.1")
Dim device
Set device = devicefinder.FindByUDN("uuid:929f28c3-
3ada-4c97-8238-f62e08124889")
Dim args(0)
Dim File(1)
Dim Vol(1)
set svc = device.services("upnp:id:pwrdim")
svc.AddCallback GetRef("eventHandler")
Sub eventHandler(callbackType, svcObj, varName,
value)
    If (callbackType = "VARIABLE_UPDATE") Then
      select case svcObj.Id
        case "upnp:id:pwrdim"
          select case varName
            Case "Power"     Power.innerText = value
            Case "Level"     Level.innerText = value
          end select
        end select
    End If
End Sub
```

In this example, the script finds the device given its UDN. When it finds the device, it queries that device for the "upnp:id"pwrdim" service. Once it finds that service, it adds an event callback to that service called "eventHandler". This name is arbitrary.

Sending and Receiving Notifications

GENA Server API

GENA servers 630 are generally going to be UPnP Control Points. A GENA server is anything that receives and processes NOTIFY messages to handle notifications from resources and sends SUBSCRIBE and UNSUBSCRIBE messages to receive notifications from resources. These APIs leverage the already existing SSDP APIs. The following are the changes to the APIs:

RegisterNotification( )

The RegisterNotification( ) allows a UPnP Control Point to request notification when an event occurs for a given UPnP service. The prototype is as follows:

```
HANDLE WINAPI RegisterNotification
(NOTIFY_TYPE nt, CHAR * szType,
CHAR *szEventUrl,
SERVICE_CALLBACK_FUNC fnCallback,
VOID *pContext)
```

Parameters: Nt[in] An enumeration that determines the type of notification requested. The values are: SSDP_ALIVE—a service has become available, and SSDP_PROPCHANGE—a property has changed on the service. SzResourceType[in] A null-terminated string specifying the resource type desired. For SSDP_ALIVE, this is the service type, for SSDP_PROPCHANGE this is unused. SzEventUrl [in] A null-terminated string specifying the URL that a subscription request should be sent to. FnCallback[in] A pointer to a function that will be called each time a notification is received. The function pointer is defined in the SSDP spec. PContext[in] This parameter is included as a parameter when invoking the client-supplied callback function.

Return Value: If the function succeeds, the return value is a handle used in a subsequent call to the DeregisterNotification( ) function. If the function fails, the return value is INVALID_HANDLE_VALUE error code. To get extended error information, call GetLastError.

```
ServiceCallbackFunc typedef enum_SSDP_CALLBACK_TYPE {
    SSDP_FOUND = 0,
    SSDP_ALIVE = 1,
    SSDP_BYEBYE = 2,
    SSDP_DONE = 3,
    SSDP_EVENT = 4,
    SSDP_DEAD = 5,
} SSDP_CALLBACK_TYPE, *PSSDP_CALLBACK_TYPE;
```

UPnP Control Point Architecture

When a UPnP Control Point wishes to subscribe to notifications for a particular UPnP service, it calls the RegisterNotification( ) API. It passes to this API a notification type that identifies the type of notification being requested, a URL to which a subscription should be sent, and a callback function and context for use when the notification is received.

RegisterNotification( ) will compose a SUBSCRIBE message, using the data passed in, and send that to the URL specified by the caller. The Callback header of the SUBSCRIBE message will be composed on the fly, as an arbitrary URL for notifications to be sent to for this subscription. This callback URL will likely be a constant since the server API will always know how to handle requests sent to this URL. It will then send the SUBSCRIBE message and await a response.

When the response is received, the Subscription-ID header contains a SID which is associated with the callback function specified by the caller.

Immediately after the response is received, the Control Point should expect an initial NOTIFY message that contains the complete set of properties maintained by the Controlled Device. This becomes the local cached SST on the Control Point side. From this point on, all modifications to the table are made via NOTIFY messages. This initial NOTIFY message will have sequence number 0 that indicates it is an initial property set and not an update. The Control Point can use this information in any way it sees fit. This ensures the Control Point's state table is always in sync with the one on the Controlled Device.

When a message is received by the HTTP server on the UPnP Control Point, it is passed to a function which determines the method name and Request-URI. If this is a NOTIFY message, the headers are parsed and packaged up into a structure. The callback function that was specified to RegisterNotification( ) is called with that structure as one of the parameters. Control Points who implement the callback function can find the headers and body of the NOTIFY message and do additional processing based on the notification type.

This all requires that the SSDP HTTP server listen on a TCP socket in addition to the UDP multicast port it already listens to. However, once a NOTIFY message is received, it is processed in the same way regardless of from which connection it originated.

Handling Failures

The following are subscription/notification failures that can occur and their solutions:

Leaked Subscriptions

To protect against subscriptions that exist on the controlled device, but no longer on the Control Point, we institute the timeout feature of GENA subscriptions. The scenario is this: A Control Point subscribes to a Controlled Device, then the Control Point reboots. Meanwhile, the Controlled Device is still trying to send notifications to that Control Point. If the Control Point never comes back, the subscription would be leaked because the Control Point never told the Controlled Device that it was going away. So to correct this, each subscription request includes an arbitrary timeout value which indicates to the Controlled Device that the Control Point will be re-subscribing every n seconds indicated in the timeout header of the subscription request. If the timeout expires on the Controlled Device, the subscription is removed. The Control Point is required to re-subscribe before the timeout period has elapsed. If it fails to do so, the subscription will be terminated by the Controlled Device.

Some time before the timeout expires on the Control Point, a re-subscribe message should be sent. The re-subscribe message is similar to the subscribe message, but it does not contain an NT or Callback header. If the Control Point is unable to re-subscribe within the timeout period, the subscription will be terminated by the Controlled Device. If the Control Point sends a re-subscribe after the Controlled Device has terminated the subscription, the Controlled Device will return "412 Precondition Failed".

Network Error Sending Event Notifications

If a controlled device receives an error sending an event notification to a subscriber, it will NOT cease to send notifications. It will continue to send notifications and receive errors until the subscription expires. The problem for the Control Point is that it will have missed a number of event notifications and so its state table will be out of sync. To correct this, each event notification message will contain a 32-bit sequence number that starts at 0 and increments for each message sent to a subscriber. If a subscriber receives a notification with a sequence number that is not exactly one more than the previous notification, it will know that it has lost events and will ignore all future notifications until it receives one with sequence number 0 again. Events with sequence number 0 indicate that the event is an "initial state" event.

Once it realizes that is has lost one or more events, the Control Point will send an UNSUBSCRIBE message, followed by a SUBSCRIBE message. This is not the same as a re-subscription because re-subscriptions do not cause the Controlled Device to start the sequence over at 0. In this case, the active unsubscribe/subscribe will cause the Controlled Device to restart the sequence at 0 and send the entire state table with the first notification message.

The SUBSCRIBE Message

When a UPnP Control Point wishes to subscribe to event notifications for a UPnP service 210–211, it will form a SUBSCRIBE message of the following format:
SUBSCRIBE service1 HTTP/1.1
Host: vcr.local:200
NT: upnp:event
Callback: <http://danielwe/upnp:923>
Timeout: Second-600

The response is as follows::
HTTP/1.1 200 O.K.
SID: uuid:kj9d4fae-7dec-11d0-a765-00a0c91e6bf6
Timeout: Second-600

This example of a GENA SUBSCRIBE request and response demonstrates a subscription to event notifications for "service1." The host is "vcr.local." All notifications for this service will be sent to the callback URL http://danielwe/upnp:923. In the response, the "Subscription-ID" header provides the subscriber with an identifier to use when it wants to unsubscribe to this resource. The "Timeout" header indicates that the subscriber will send a re-subscription request before 10 minutes have elapsed. If the device does not receive this request within that period of time, it will remove the subscription.

The Re-SUBSCRIBE Message

When a UPnP Control Point wishes to re-subscribe to event notifications for a UPnP service, it will form a SUBSCRIBE message of the following format:
SUBSCRIBE service1 HTTP/1.1
Host: vcr.local:200
SID: uuid:kj9d4fae-7dec-11d0-a765-00a0c91e6bf6
Timeout: Second-600

The response would be as follows::
HTTP/1.1 200 O.K.
SID: uuid:kj9d4fae-7dec-11d0-a765-00a0c91e6bf6
Timeout: Second-600

Note that the NT and Callback headers are absent, but the SID header exists. This tells the Controlled Device 106 which subscription is being renewed and restarts the timeout. When the Controlled Device receives this message, it will persist the subscriptions to disk (or other persistent data storage medium), updating the absolute timeout based on the current time and a new timeout sent by the Control Point (if it was different).

The NOTIFY Message

When a resource wishes to send an event notification, it will form a NOTIFY message of the following format:
NOTIFY upnp HTTP/1.1
Host: danielwe:923
NT: upnp:event
NTS: upnp:propchange
SID: uuid:kj9d4fae-7dec-11d0-a765-00a0c91e6bf6
Seq: 123
Content-Length: xxx
Content-Type: text/xml
<event XML schema>

The response is as follows::
HTTP/1.1 200 O.K.

This example of a GENA NOTIFY request and response demonstrates that a "upnp:propchange" event is being sent to http://danielwe/upnp:923. The USN header identifies "vcr.service1" as the event source. The XML contains the property name, value, and type. The "Seq" header indicates the sequence number of the notification. Sequence number 0 indicates the initial state update for the subscriber.

Property Change Event XML Schema

A UPnP property change event will be of the following form:

```
<e:propertyset xmlns:e="urn:schemas-upnp-org:event-
    1-0">
  <e:property>
    <foo>goodbye</foo>
  </e:property>
```

```
    <e:property>
        <bar>27</bar>
    </e:property>
</e:propertyset>
```

Here, a property named "foo" has a value of "goodbye" and a property named "bar" has a value of 27. The XML contains a list of multiple properties that have changed.

The UNSUBSCRIBE Message

When a UPnP Control Point wishes to unsubscribe to event notifications for a UPnP service, it will form an UNSUBSCRIBE message of the following format:
UNSUBSCRIBE service1 HTTP/1.1
Host: vcr.local:200
SID: uuid:kj9d4fae-7dec-11d0-a765-00a0c91e6bf6
The response would be as follows::
HTTP/1.1 200 O.k.

This example of a GENA UNSUBSCRIBE request and response demonstrates that the Control Point is no longer interested in receiving event notifications from http://vcr.local/service1:200.

Control Point State Synchronization Models

Controlled Device-Initiated NeedsSync Method

This method begins with the Controlled Device sending its initial state to the subscriber the first time an event is submitted by the service. Control Points will subscribe to the service first, then receive notifications for events as they occur. The first event will happen to be the initial state of the service. The Control Point state table will always be in sync with this method.

When the Controlled Device sends a notification to a subscriber and receives an error. In this case, it marks the subscriber as "NeedsSync" and the next time an event is submitted, all events are sent to the subscriber. The problem with this is that the API needs to keep track of which subscribers need syncing and which ones don't. The client of this API (the UPnP service) would need to send separate messages to each subscriber and know which ones needed all events and which ones just wanted the ones that changed.

Control Point-Initiated Sync

This method states that the Control Point should subscribe to event notifications, then call a function that obtained the state from the service. This means that any events that were received in the meantime would need to be matched against the incoming set of events and replaced if they were older. This method leads to synchronization issues where the Control Point may receive events that are newer but when it queries for the state, it gets an older view of the table. This requires using sequence numbers to determine which information is newer. If the view of the table received by the query is too old, it has to be discarded. Alternatively, the properties that were not received by event notification would not be overwritten, but all other properties would be. Using sequence numbers make this more complicated.

Controlled Device-Initiated Sync

This preferred method takes a simpler approach. Any time the Control Point subscribes to a service, the service will immediately afterwards, send the entire contents of the state table with the first notification. This precludes the Control Point from making a query for the state table. Subsequent events update the local state table on the Control Point. If the connection is lost, the Control Point will lose its subscription. If the Control Point realizes it has not received an event after a certain amount of time has elapsed, it will re-subscribe. At that point, the Controlled Device will re-send the entire state table again, and the Control Point is ensured to be up to date.

Exemplary Computer Hardware

Figure 21:
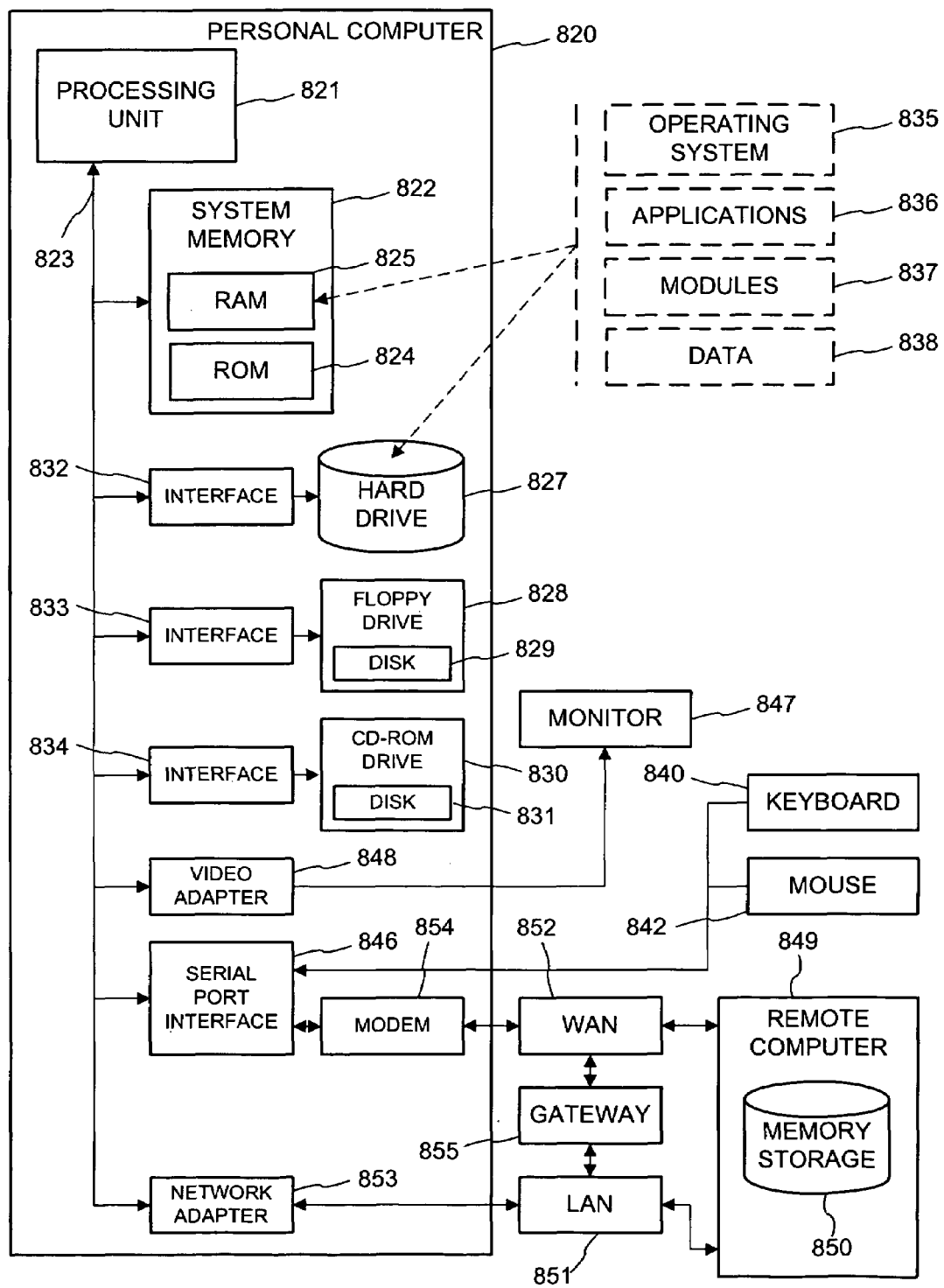
FIG. 21 is a block diagram of a computer system that may be used in the device control model of FIG. 3.

FIG. 21 and the following discussion are intended to provide a brief, general description of a suitable computer which may be used in the above described UPnP device control model. This conventional computer 820 (such as personal computers, laptops, palmtops or handheld-PCs, set-tops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a Controlled Device, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838.

A user may enter commands and information into the computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated in FIG. 21. The logical connections depicted in FIG. 21 include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Exemplary Embedded Computing Device

Figure 22:
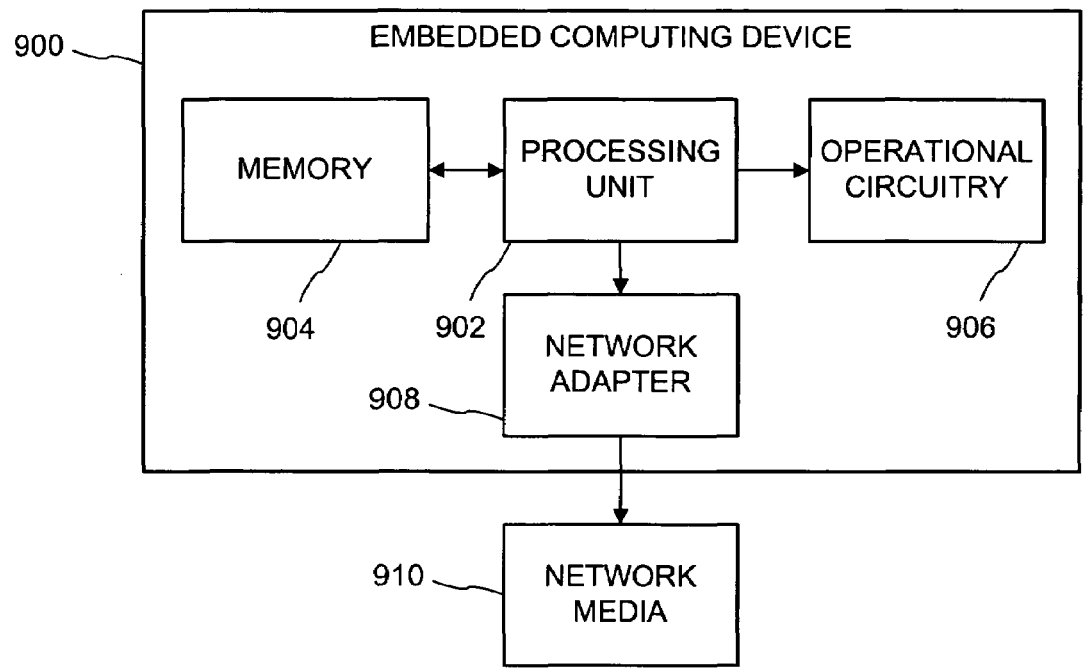
FIG. 22 is a block diagram of a device having embedded computing and networking capability per universal-plug-and-play (UPNP) standards that may be used in combination with the computer system of FIG. 21 in the device control model of FIG. 3.
Figure 23:
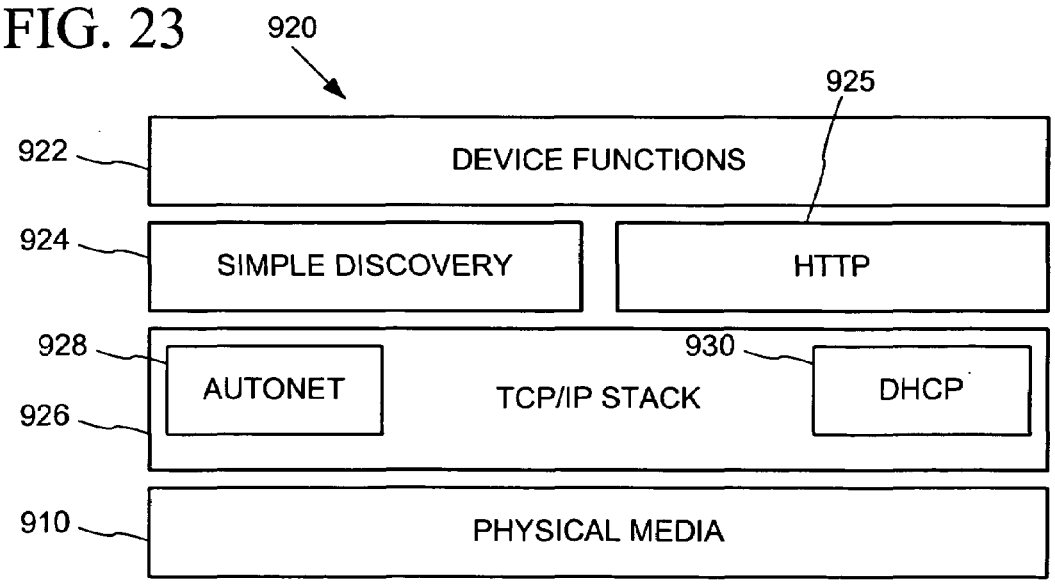
FIG. 23 is a block diagram of a software architecture per UPNP standards in the embedded computing device of FIG. 22

FIGS. 22 and 23 are intended to provide a brief, general description of a suitable embedded computing device 900 which may be used in the illustrated implementation of the invention. The embedded computing device 900 can be any variety of device incorporating electronics to control operational functions (operational circuitry 906), and in which computing and networking capabilities are embedded. For example, devices in which computing and networking functions can be embedded include communications devices (e.g., telephones, cell phones, audio and video conferencing systems, 2-way radios, etc.), office equipment (printers, fax machines, copiers, dictation, etc.), audio-video equipment (audio and video recorders and players, including televisions, radio receivers, compact disk (CD), digital video disk (DVD), camcorders, etc.), entertainment devices (set-top boxes, game consoles, etc.), environment control equipment (thermostats, heating/ventilation/air-conditioning equipment, light switches, etc.), security systems, home appliances (coffee makers, dishwashers, clothes washer/dryer), automobiles, public facilities equipment (signs, traffic signals, etc.), manufacturing equipment, and many others.

With reference to FIG. 22, the device 900 includes a processing unit 902, and a memory 904 to provide embedded computing capability. The processing unit 902 has hardware interfaces to the operational circuitry 906 that operates devices functions. The processing unit 902 can be a microprocessor or micro-controller, such as are available from Intel, Motorola, IBM, and others. The memory 904 preferably incorporates RAM and ROM to hold software and data for basic operating code as well as for user applications.

The device 900 also includes a network adapter 908 for connecting with a network media 910 that is interconnected with the computer network in which the authoritative names registry (described below) is implemented in accordance with the invention. The network adapter 908 can be a network interface card (or chip set integrated on a single board with the processing unit 902) appropriate to the particular network media 910. The network media can be any of various wired or wireless network media, including Ethernet, IEEE 1394 (a.k.a. firewire), radio frequency (including satellite, cell, pager, commercial signal sideband, etc.), power line carrier (PLC), phone line, and television cable, among others.

With reference now to FIG. 23, the embedded computing device 100 (FIG. 22) has a software architecture 120 that conforms to the above described UPnP device control model. UPnP provides a mechanism for the embedded computing device to operate in the Internet, as well as networks that have no administrator and no connection to the Internet, and hence no access to configuration services like the Dynamic Host Configuration Protocol (DHCP). DHCP is a mechanism for providing devices with configuration information needed to access the Internet. The mechanism functions through the use of a multicast request for configuration information that is generally responded to with an IP address and DNS server location. Additional information can only be returned in the response.

In non-configured (ad-hoc) networks, UPnP uses the AutoIP protocol. AutoIP is an enhancement to DHCP that allows devices to claim IP addresses in the absence of a DHCP server or similar IP configuration authority. IP addresses are claimed from a reserved range that is not allowed to be transmitted on the open Internet; thus they are only good for the local network. The embedded computing device 100 claims an address by randomly generating an address in the reserved range and then making an ARP request to see if anyone else has already claimed that address. AutoIP systems will continually check for the presence of a DHCP server so that if one should ever come online, all the AutoIP devices will attempt to switch their IP addresses to one provided by the DHCP server. This allows a network to operate in isolation, be connected to the Internet with DHCP support and then to be returned to isolation. This type of scenario will be common in homes that use dial-up access.

The UPnP protocol also uses Multicast DNS for addressing the embedded computing device 900. The Internet Domain Name System (DNS) is a mapping system that translates human readable domain names, like microsoft-.com, into their equivalent IP address. Most corporate intranets implement an internal version of the same technology to provide the same services. In small networks, such as at home or in small business, DNS servers may not exist.

Multicast DNS allows DNS requests to be multicast. This allows a machine to see requests for its own name and respond to them. Like AutoIP, Multicast DNS is only used when a DNS server is not available. (For more information, see B. Woodcock, Zocolo, and B. Manning, "Multicast Discovery of DNS Services," IETF Internet Draft, "draft-manning-multicast-dns-01.txt.")

UPnP implements a peer discovery mechanism that uses the Simple Service Discovery Protocol (SSDP) for discovery of devices on IP networks. SSDP is based on profiles. A single identifier specifies a profile that defines a control protocol between the client and service (e.g., operational functions provided by the embedded computing device). By identifying itself with the profile, the service advertises compliance with the associated control protocol.

Using a single identifier makes it possible to implement an extremely simple discovery system. Clients send out a User Datagram Protocol (UDP) multicast packet containing the identifier of the desired service on some standard channel. Services listen on the standard channel, read the request, see whether they provide the service, and respond if so.

UPnP also provides a Directories mechanism to allow discovery to scale—to the entire Internet if needed. When present, a directory will read all incoming service requests and respond to them itself. This requires that all services (e.g., the embedded computing device 900) register with the directory so that the directory is able to properly answer on their behalf. The directory is also responsible for communicating with other directories in order to determine whether the service is available within the local network, the WAN and potentially the Internet.

To simplify the discovery protocol, directories are treated as proxies. A proxy is a service that accepts requests and takes responsibility for finding the proper response. When a client comes online, it will perform discovery for the proxy. If the proxy is present, then the client will send all future discovery requests to the proxy. If the proxy isn't present, then the client will send all discovery requests to the reserved discovery multicast channel. Regardless of the presence of a proxy, the client's request format and procedures will always be the same. The only difference will be the address to which the client sends its requests. For services, the difference between a proxied and unproxied network is their need to answer discovery requests. On a proxied network, services need do nothing once they have registered with the proxy. On an unproxied network, they answer discovery requests directly.

SSDP uses the UDP- and Transmission Control Protocol (TCP)-based Hypertext Transport Protocol (HTTP) to provide for service discovery. SSDP uses a Uniform Resource Identifier (URI) to represent the service and the OPTIONS method to provide for discovery. SSDP also will provide support for proxies. These proxies, which are really just fronts for directories, redirect discovery requests to themselves. It is the proxy's job to collect announce requests in order to determine what services are available as well as to communicate with other proxies in order to provide for scalable service discovery.

The discovery process returns only the basic information needed to connect to the embedded computing device. Once a service has discovered its peers, the service often needs to find out more information in order to work best with them. The description process returns a schema providing descriptive data about the service.

A schema is a structured data definition that defines a set of structured values that provide descriptive information about a service. UPNP uses the Extensible Markup Language (XML) for schema, because XML's self-describing structured data format provides the level of expressiveness and extensibility needed by a universal schema and data format.

Accordingly, UPNP supports automatic network introduction, meaning that devices and their related services have the ability to be self-describing and allow automatic configuration. When a device is plugged into the computer network, the device automatically configures itself and acquires a TCP/IP address. The device then announces its presence to other devices already on the network using a simple discovery protocol based on the Internet HTTP protocol and is immediately ready to share its services with any device that requests them.

With UPNP, device developers are not required to develop specific device drivers to operate under UPNP. The task of preparing a device for operation in this network environment thus is fairly simple. Moreover, in configured networks, dynamic detection allows an operating system to immediately begin using added devices or stop using removed devices without rebooting.

UPNP Devices support automatic discovery, identification, and configuration to achieve interoperability in the home environment, but must also operate correctly in a managed corporate network. Devices can be networked instead of being attached directly to a PC, and devices are all autonomous citizens on the network, able to talk with each other and exchange information. UPNP provides a unified way of performing directory services with automatic configuration. Capability for simple discovery mechanism used in the home environment provides the ability for any device to become a node on the global Internet. Additionally, directory services can be leveraged if they are available in the corporate environment.

UPNP provides a common set of interfaces for accessing devices and services, enabling the operational unification of diverse media types. Communications protocols for Universal Plug and Play are based on industry standards, especially key Internet standards such as TCP/IP, HTML, XML, HTTP, DNS, LDAP, and others. Individual implementations for particular networks and buses are built on established protocols.

As shown in FIG. 23, the software architecture 920 of the embedded computing device 900 (FIG. 22) includes the following software code modules that implement UPNP: device functions 922, simple discovery 924, Hypertext Transport Protocol (HTTP) 925, Transmission Control Protocol/Internet Protocol (TCP/IP) stack 926, Autonet 928, Dynamic Host Configuration Protocol (DHCP) 930, and physical media 910 (also shown in FIG. 22). The device functions 922 is a software code module to implement the device's functionality. For example, where the embedded computing device is a VCR, the device functions code can include code to implement start, stop, pause, record and other functions that the VCR can perform.

The simple discovery 924 is a software code module (about 4 Kbytes) that implements a simple discovery procedure (described below) for automatic network introduction under the UPNP protocol.

The simple discovery procedure additionally provides an Extensible Markup Language (XML) format device description, which is downloaded to clients that access the device to allow activation of device functionality from the client. XML is a textual, tag-based markup language. It was originally designed to be the "webby" simplification of SGML (Standard Generalized Markup Language), and is therefore intended to be used to create "vocabularies" of tags that can be used to apply semantic markup to documents, such as who the author was, what constitutes a paragraph (semantically, not from a display point of view), when the author last had breakfast, and so on. (For more information, see A. Layman, E. Jung, E. Maler, H. Thompson, J. Paoli, J. Tigue, N. H. Mikula, S. De Rose, *XML-Data*, W3C Note 5 Jan. 1998.). In the context of UPNP, XML is used to provide the description of services and capabilities of the embedded computing device. The embedded computing device makes its features visible to clients by providing its XML device description, which the client can use to activate device functions 922. For example, if the device is a camera, the client's browser can direct the camera to zoom in/out or adjust contrast using the mechanism of XML.

The XML device description can provide links (via a uniform resource locator or URL address) to an accompanying XSL format style sheet. The XSL style sheets are used to present the data in different ways, i.e., the style sheets are applied to present different views of the same data. For example, if the device contains a file system, one style sheet can show the file selections; another shows the file sizes in some sort of diagram; yet another style sheet could make thumbnails of these image files.

The HTTP 925 is a software code modules (about 20 Kbytes) that implements the standard HTTP protocol, which is an open standard mechanism for client/server message-based communication. HTTP provides for proxying, content negotiation and security. (For more information, see R. Fielding, J. Gettys, J. Mogul, H. Frystyk, T. Berners-Lee, *Hypertext Transfer Protocol—HTTP/1.1*, IETF RFC 2068 (January 1997).) The TCP/IP stack 926 implements the standard TCP/IP networking protocols for communication on the computer network. The Internet Protocol (IP) is the foundation protocol of the Internet. It defines how a single message is sent from a source through zero or more routers to its final destination. It covers issues such as message length, message fragmentation, addressing, and routing concerns. The Transmission Control Protocol (TCP) is an IP-based protocol that provides support for the reliable, ordered delivery of messages over IP. Additionally, User Datagram Protocol (UDP) and Internet Group Management Protocol (IGMP) multicast send/listen capability are included in the implementation.

The Autonet 928 is a software code module also used for automatic network introduction via AutoIP in the UPNP protocol. Autonet uses a predefined set of IP addresses and, when a device is connected to the network, it pings an address in this address space. If it gets no replies, the device assumes that the address is available and assigns it to itself. To make this functionality even more useful it is combined with Multicast DNS, in which the device itself holds its own name. Thus it is not even necessary to determine what IP address the device assigned to itself, because its name can always be used instead. An IP Multicast is a mechanism for sending a single message to multiple recipients. IP multicasting is especially useful for discovery operations where one does not know exactly who has the information one seeks. In such cases, one can send a request to a reserved IP multicast address. Any services that can provide the requested information will also subscribe to the multicast request and thus be able to hear the information request and properly respond. Multicast DNS is a proposal to the IETF on rules for making normal DNS requests using multicast UDP. (For more information, see B. Woodcock, B. Manning, "Multicast Discovery of DNS Services", IETF Internet Draft, "draft-manning-multicast-dns-01.txt.")

The DHCP 930 is a software code module that implements the Dynamic Host Configuration Protocol (DHCP), which is a mechanism for providing devices with configuration information needed to access the Internet. The mechanism functions through the use of a multicast request for configuration information that is generally responded to with an IP address and DNS server location. Additional information can only be returned in the response.

Figure 24:
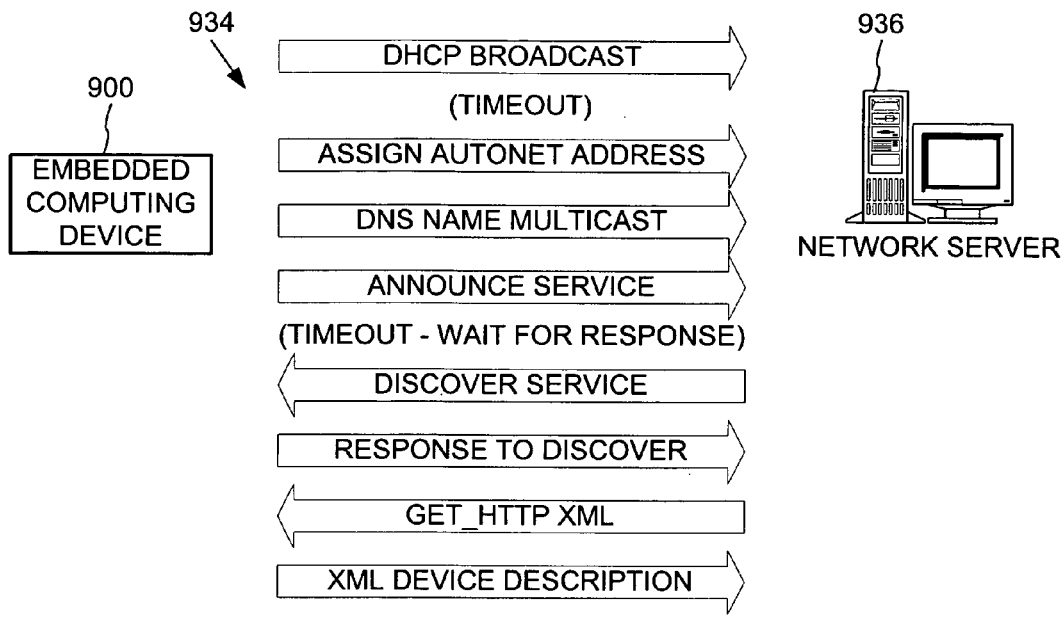
FIG. 24 is a data flow diagram of a process for automatic network introduction of the embedded computing device of FIG. 22 into an ad hoc computer network environment per the UPNP protocol.
Figure 25:
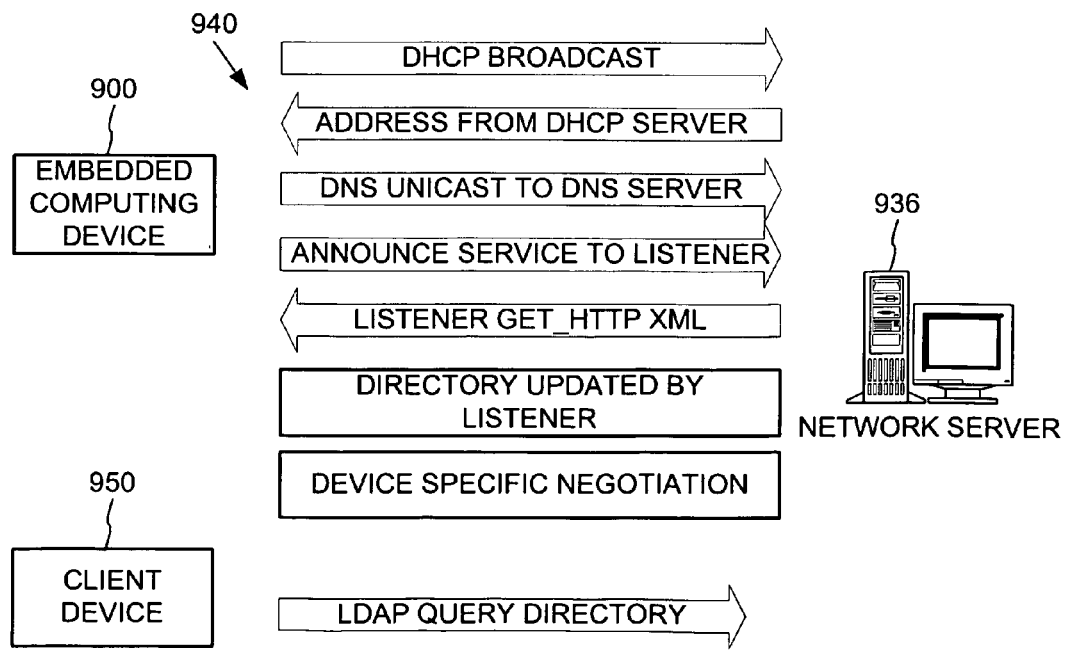
FIG. 25 is a data flow diagram of a process for automatic network introduction of the embedded computing device of FIG. 22 into a configured computer network environment per the UPNP protocol.

FIGS. 24 and 25 show processes 934, 940 per the UPNP protocol for automatic network introduction of the embedded computing device 900 (FIG. 22) into an ad hoc (where the device does not have a configured IP address) and a configured computer network environment, respectively. The automatic network introduction process establishes an appropriate configuration (e.g., with an IP address) of the embedded computing device upon connection to a server computer on a computer network, so as to enable access to the device from a client. The processes 934, 940 involve five phases: announce, discovery, response to discovery, autonet, and device description.

At the announce phase, the embedded computing device 900 sends out a small multicast packet so that other devices can find it on the network. The multicast message packet essentially says, "I am here, I am, (say), a camera, and you can reach me at this IP address or URL."

At the discovery phase, the embedded computing device 900 listens for a discovery packet coming from a simple discovery client, i.e., the device announces itself, then listens for discovery. The discovery packet also is sent out by multicast.

At response to discovery, the embedded computing device 900 listens to the multicast address and then parses the information from a Simple Discovery request to decide if the request is for its kind of device. If so, the device 100 then sends back a response packet containing the following information: the IP address or URL where it can be reached; identification of its own device type; and the discovery packet ID so the requesting client knows which request is being answered.

At the Autonet phase, the Autonet module 928 of the embedded computing device 900 uses a predefined set of IP addresses and, when the device is connected to the network, it pings an address in this address space. If no reply is received, the device 900 assumes that the address is available and assigns it to itself. Alternatively, the device 900 may combine Autonet with Multicast DNS, and itself hold its own name. In which case, it is not necessary to determine what IP address the device assigned to itself, because its name can always be used instead.

Both the Announce and Discovery packets also contain a link or a URL to an XML file that is used by the embedded computing device at the device description phase to describe itself (i.e., its functionality). This XML data contains all the facts about the device. XML can also have URLs that point to appropriate style sheets (XSL files) that are used for optimal presentation. The XSL style sheets are used to present the data in different ways, i.e., the style sheets are applied to present different views of the same data. For example, if the device contains a file system, one style sheet can show the file selections; another shows the file sizes in some sort of diagram; yet another style sheet could make thumbnails of these image files.

Exemplary Client

Figure 26:
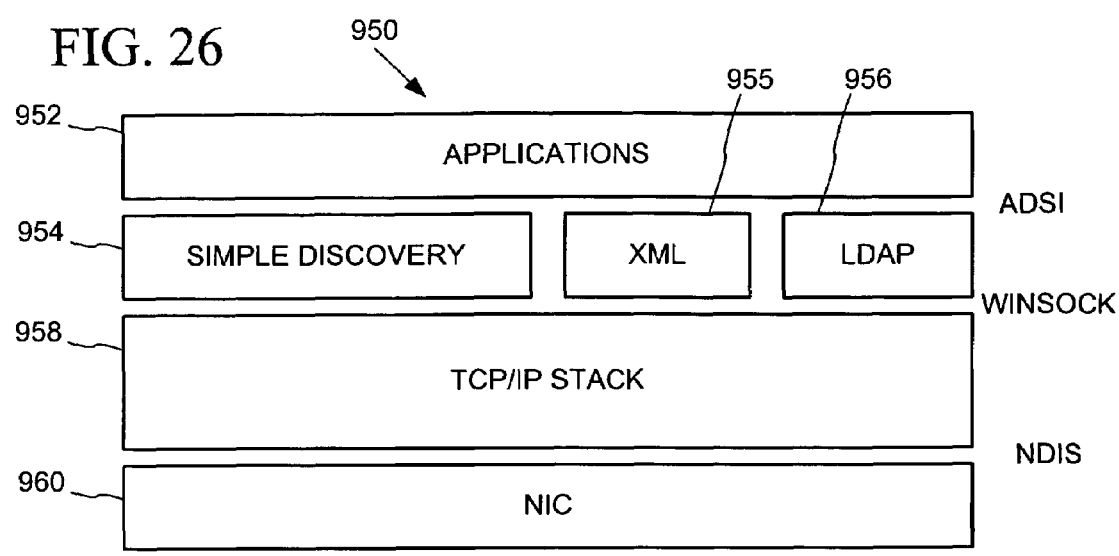
FIG. 26 is a block diagram of a software architecture of a client device per UPNP standards having embedded computing and networking capability that may be used in the device control model of FIG. 3.

With reference now to FIG. 26, a client that accesses and uses the embedded computing device 900 over the computer network has an exemplary client software architecture 950, which includes software code modules for applications 952, simple discovery 954, XML 955, LDAP 956, TCP/IP stack 958 and a network interface card (NIC) 960 that provides a physical connection to the computer network. The applications 952 is a software code module that provides a user interface features for locating desired devices (e.g., embedded computing device 900) and services on the computer network, and also user interface features to interact with the located device or service. The applications 952 can include an Internet browser, such as the Microsoft Internet Explorer, that can present the XML device description in accordance with an associated XSL style sheet for interaction with the embedded computing device and activation of its operational functionality.

The simple discovery 954 is a module that implements the above-described simple discovery per the UPNP protocol. The XML 955 is a module that processes the XML device description and XSL style sheets for presentation in the application's user interface. The LDAP 956 implements the standard LDAP directory protocol for name look-up. The TCP/IP stack 958 implements the TCP/IP protocol for communications over the computer network.

Illustrative Pervasive Computing Environment

FIG. 27 illustrates a pervasive computing environment 1000, such as may be installed in a home, office or public place, which includes a large number of embedded computing devices, such as the illustrated device 900 (FIG. 22). The pervasive computing environment 1000 includes personal computers 1002, 1004 (e.g., of the type shown in FIG. 21) connected via a local area network (LAN) 1006. The PC 1002 is connected via a universal serial bus 1016 to a telephone modem 1010, XDSL interface 1011 or a cable modem 1012, which in turn provide a connection with the computer network, e.g., the Internet.

Various embedded computing devices also connect to the computer network via various network connections to the PCs 1002, 1004. These include an audio device 1014 (e.g., speakers, radio tuner, microphone), and printer 1015 which connect to the PC 1004 through a USB 1017. Also, a digital camera 1020, a handheld PC(H/PC) 1021 and another personal computing device 1022 connect via an infrared port (IRDA) 1024, which also attaches to the PC 1004 through the USB 1017. Also, lighting switches 1030 and like home appliances are connected via an A/C power line-based networking 1032 to the PC 1002. Further, a chain of IEEE 1394 cables 1048 connect a digital TV 1040, DVD player 1041, digital video camcorder (DV/DVC) 1042, an audio device 1043 (e.g., CD player/recorder, radio receiver, amplifier, and like audio system component), and a game console 1044. Devices, such as a portable telephone 1050 and remote control 1051, have a radio frequency network connection with the PC 1004.

With their various inter-networked connections, the embedded computing devices are "visible" and accessible from a client device 950 (FIG. 27) also connected to the computer network.

APPENDIX

Universal Plug and Play Device Architecture

Table of contents

Introduction

1. Discovery

2. Description

3. Control

4. Eventing

5. Presentation

Glossary

Introduction

What is Universal Plug and Play?

Universal Plug and Play (UPnP) is an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. Universal Plug and Play is a distributed, open networking architecture that leverages TCP/IP and the Web technologies to enable seamless proximity networking in addition to control and data transfer among networked devices in the home, office, and public spaces.

UPnP is more than just a simple extension of the plug and play peripheral model. It is designed to support zero-configuration, "invisible" networking and automatic discovery for a breadth of device categories from a wide range of vendors. This means a device can dynamically join a network, obtain an IP address, convey its capabilities, and learn about the presence and capabilities of other devices. DHCP and DNS servers are optional and are used only if available on the network. Finally, a device can leave a network smoothly and automatically without leaving any unwanted state behind.

UPnP leverages Internet components, including IP, TCP, UDP, HTTP, and XML. Like the Internet, contracts are based on wire protocols that are declarative, expressed in XML, and communicated via HTTP. IP internetworking is a strong choice for UPnP because of its proven ability to span different physical media, to enable real world multiple-vendor interoperation, and to achieve synergy with the Internet and many home and office intranets. UPnP has been explicitly designed to accommodate these environments. Further, via bridging, UPnP accommodates media running non-IP protocols when cost, technology, or legacy prevents the media or devices attached to it from running IP.

What is "universal" about UPnP? No device drivers; common protocols are used instead. UPnP networking is media independent. UPnP devices can be implemented using any programming language, and on any operating system. UPnP does not specify or constrain the design of an API for applications running on control points; OS vendors may create APIs that suit their customer's needs. UPnP enables vendor control over device UI and interaction using the browser as well as conventional application programmatic control.

UPnP Forum

The UPnP Forum is an industry initiative designed to enable easy and robust connectivity among stand-alone devices and PCs from many different vendors. The UPnP Forum seeks to develop standards for describing device protocols and XML-based device schemas for the purpose of enabling device-to-device interoperability in a scalable networked environment. The UPnP Forum oversees a logo program for compliant devices.

The UPnP Forum has set up working committees in specific areas of domain expertise. These working committees are charged with creating proposed device standards, building sample implementations, and building appropriate test suites. This document indicates specific technical decisions that are the purview of UPnP Forum working committees. UPnP vendors can build compliant devices with confidence of interoperability and benefits of shared intellectual property and the logo program. Separate from the logo program, vendors may also build devices that adhere to the UPnP Device Architecture defined herein without a formal standards procedure. If vendors build non-standard devices, they determine technical decisions that would otherwise be determined by a UPnP Forum working committee.

In this Document

The Universal Plug and Play (UPnP) Device Architecture contained herein defines the protocols for communication between controllers, or control points, and devices. For discovery, description, control, eventing, and presentation, UPnP uses the following protocol stack.

At the highest layer, messages logically contain only UPnP vendor-specific information about their devices. Moving down the stack, vendor content is supplemented by information defined by UPnP Forum working committees. Messages from the layers above are hosted in UPnP-specific protocols, defined in this document. In turn, the above messages are formatted using the Simple Service Discovery Protocol (SSDP), General Event Notification Architecture (GENA), and Simple Object Access Protocol (SOAP). The above messages are delivered via HTTP, either a multicast or unicast variety running over UDP, or the standard HTTP running over TCP. Ultimately, all messages above are delivered over IP. The remaining sections of this document describe the content and format for each of these protocol layers in detail. For reference, colors in [square brackets] above indicate which protocol defines specific message components throughout this document.

The foundation for UPnP networking is IP addressing. Each device has a Dynamic Host Configuration Protocol (DHCP) client and search for a DHCP server when the device is first connected to the network. If a DHCP server is available, i.e., the network is managed, the device uses the IP addressed assigned to it. If no DHCP server is available, i.e., the network is unmanaged, the device uses Auto IP to get an address. In brief, Auto IP defines how a device intelligently chooses an IP address from a set of reserved addresses and is able to move easily between managed and unmanaged networks. If during the DHCP transaction, the device obtains a domain name, e.g., through a DNS server or via DNS forwarding, the device uses that name in subsequent network operations; otherwise, the device uses its IP address.

Given an IP address, the first step in UPnP networking is discovery. When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information. The UPnP discovery protocol is based on the Simple Service Discovery Protocol (SSDP). The section on Discovery below explains how devices advertise, how control points search, and details of the format of discovery messages. The second step in UPnP networking is description. After a control point has discovered a device, the control point still knows very little about the device. For the control point to learn more about the device and its capabilities, or to interact with the device, the control point retrieves the device's description from the URL provided by the device in the discovery message. Devices may contain other, logical devices, as well as functional units, or services. The UPnP description for a device is expressed in XML and includes vendor-specific, manufacturer information like the model name and number, serial number, manufacturer name, URLs to vendor-specific Web sites, etc. The description also includes a list of any embedded devices or services, as well as URLs for control, eventing, and presentation. For each service, the description includes a list of the commands, or actions, the service responds to, and parameters, or arguments, for each action; the description for a service also includes a list of variables; these variables model the state of the service at run time, and are described in terms of their data type, range, and event characteristics. The section on Description below explains how devices are described and how those descriptions are retrieved by control points.

The third step in UPnP networking is control. After a control point has retrieved a description of the device, the control point can send actions to a device's service. To do this, a control point sends a suitable control message to the URL for control URL for the service (provided in the device description). Control messages are also expressed in XML using the Simple Object Access Protocol (SOAP). Like function calls, in response to the control message, the service returns any action-specific values. The effects of the action, if any, are modeled by changes in the variables that describe the run-time state of the service. The section on Control below explains the description of actions, state variables, and the format of control messages.

The fourth step in UPnP networking is eventing. A UPnP description for a service includes a list of actions the service responds to and a list of variables that model the state of the service at run time. The service publishes updates when these variables change, and a control point may subscribe to receive this information. The service publishes updates by sending event messages. Event messages contain the names of one of more state variables and the current value of those variables. These messages are also expressed in XML and formatted using the General Event Notification Architecture (GENA). A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all evented variables that have changed, and event messages are sent no matter why the state variable changed (either in response to a requested action or because the state the service is modeling changed). The section on Eventing below explains subscription and the format of event messages.

The fifth step in UPnP networking is presentation. If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device. The section on Presentation below explains the protocol for retrieving a presentation page.

0. Addressing

Addressing is Step 0 of UPnP networking. Through addressing, devices get a network address. Addressing enables discovery (Step 1) where control points find interesting device(s), description (Step 2) where where control points learn about device capabilities, control (Step 3) where a control point sends commands to device(s), eventing (Step 4) where control points listen to state changes in device(s), and presentation (Step 5) where control points display a user interface for device(s).

The foundation for UPnP networking is IP addressing. Each device has a Dynamic Host Configuration Protocol (DHCP) client and search for a DHCP server when the device is first connected to the network. If a DHCP server is available, i.e., the network is managed, the device uses the IP addressed assigned to it. If no DHCP server is available, i.e., the network is unmanaged; the device uses automatic IP addressing (Auto-IP) to obtain an address. Auto-IP defines how a device: (a) determines if DHCP is unavailable, and (b) intelligently chooses an IP address from a set of link-local IP addresses. This method of address assignment enables a device to easily move between managed and unmanaged networks. The operations described in this section are further clarified in the reference documents listed below. Where conflicts between this document and the reference documents exist, the reference document always takes precedence.

0.1 Addressing: Determining Whether to Use Auto-IP

A device that supports AUTO-IP and is configured for dynamic address assignment begins by requesting an IP address via DHCP by sending out a DHCPDISCOVER message. The amount of time this DHCP Client listens for DHCPOFFERS is implementation dependent. If a DHCPOFFER is received during this time, the device continues the process of dynamic address assignment. If no valid DHCPOFFERS are received, the device may then auto-configure an IP address.

0.2 Addressing: Choosing an Address

To auto-configure an IP address using Auto-IP, the device uses an implementation dependent algorithm for choosing an address in the 169.254/16 range. The first and last 256 addresses in this range are reserved and is not used.

The selected address then is tested to determine if the address is already in use. If the address is in use by another device, another address is chosen and tested, up to an implementation dependent number of retries. The address selection is randomized to avoid collision when multiple devices are attempting to allocate addresses.

0.3 Addressing: Testing the Address

To test the chosen address, the device uses an Address Resolution Protocol (ARP) probe. An ARP probe is an ARP request with the device hardware address used as the sender's hardware address and the sender's IP address set to 0s. The device will then listen for responses to the ARP probe, or other ARP probes for the same IP address. If either of these ARP packets is seen, the device considers the address in use and try a new address.

0.4 Addressing: Periodic Checking for Dynamic Address Availability

A device that has auto-configured an IP address periodically checks for the existence of a DHCP server. This is accomplished by sending DHCPDISCOVER messages. How often this check is made is implementation dependent, but checking every 5 minutes would maintain a balance between network bandwidth required and connectivity maintenance. If a DHCP offer is received, the device proceeds with dynamic address allocation. Once a DHCP assigned address is in place, the device may release the auto-configured address, but may also choose to maintain this address for a period of time to maintain connectivity.

To switch over from one IP address to a new one, the device cancels any outstanding advertisements and reissue new ones. The section on Discovery explains advertisements and their cancellations.

0.5 Addressing: Device Naming and DNS Interaction.

Once a device has a valid IP address for the network, it can be located and referenced on that network through that address. There may be situations where the end user needs to locate and identify a device. In these situations, a friendly name for the device is much easier for a human to use than an IP address.

Moreover, names are much more static than IP addresses. Clients referring a device by name don't require any modification when IP address of a device changes. Mapping of the device's DNS name to its IP address could be entered into DNS database manually or dynamically according to RFC 2136. While computers and devices supporting dynamic DNS updates can register their DNS records directly in DNS, it is also possible to configure a DHCP server to register DNS records on behalf of these DHCP clients.

0.6 Addressing: Name to IP Address Resolution

A computer that needs to contact a device identified by a DNS name needs to discover its IP address. The computer submits a DNS query according to RFC1034 and 1035 to the pre-configured DNS server(s) and receives a response from a DNS server containing the IP address of the target device. A computer can be statically pre-configured with the list of DNS servers. Alternatively a computer could be configured with the list of DNS server through DHCP, or after the address assignment through a DHCPINFORM message.

1. Discovery

Discovery is Step 1 in UPnP networking. Discovery comes after addressing (Step 0) where devices get a network address. Through discovery, control points find interesting device(s). Discovery enables description (Step 2) where control points learn about device capabilities, control (Step 3) where a control point sends commands to device(s), eventing (Step 4) where control points listen to state changes in device(s), and presentation (Step 5) where control points display a user interface for device(s).

Discovery is the first step in UPnP networking. When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information.

When a new device is added to the network, it multicasts a number of discovery messages advertising its embedded devices and services. Any interested control point can listen to the standard multicast address for notifications that new capabilities are available. Similarly, when a new control point is added to the network, it multicasts a discovery message searching for interesting devices, services, or both. All devices listen to the standard multicast address for these messages and responds if any of their embedded devices or services match the search criteria in the discovery message.

To reiterate, a control point may learn of a device of interest because that device sent discovery messages advertising itself or because the device responded to a discovery message searching for devices. In either case, if a control point is interested in a device and wants to learn more about it, the control point uses the information in the discovery message to send a description query message. The section on Description explains description messages in detail.

When a device is removed from the network, it multicasts a number of discovery messages revoking it's earlier announcements, effectively declaring that it's embedded devices and services will not be available.

To limit network congestion, the time-to-live (TTL) of each IP packet for each multicast message defaults to 4 and is configurable.

Discovery plays an important role in the interoperability of devices and control points using different versions of UPnP networking. The UPnP Device Architecture (defined herein) is versioned with both a major and a minor version, usually written as major.minor, where both major and minor are integers. Advances in minor versions is a compatible superset of earlier minor versions of the same major version. Advances in major version are not required to be supersets of earlier versions and are not guaranteed to be backward compatible. Version information is communicated in discovery and description messages. In the former, each discovery message includes the version of UPnP networking that the device supports. As a backup, the latter also includes the same information. This section explains the format of version information in discovery messages and specific requirements on discovery messages to maintain compatibility with advances in minor versions.

The standard multicast address, as well as the mechanisms for advertising, searching, and revoking, are defined by the Simple Service Discovery Protocol (SSDP). The remainder of this section explains SSDP in detail, enumerating how devices advertise and revoke their advertisements as well as how control points search and devices respond.

1.1 Discovery: Advertisement

When a device is added to the network, the UPnP discovery protocol allows that device to advertise its services to control points. It does this by multicasting discovery messages to a standard address and port. Control points listen to this port to detect when new capabilities are available on the network. To advertise the full extent of its capabilities, a device multicasts a number of discovery messages corresponding to each of its embedded devices and services. Each message contains information specific to the embedded device (or service) as well as information about its enclosing device. Messages include duration until the advertisements expire; if the device remains available, the advertisements are re-sent with (with new duration). If the device becomes unavailable, the device explicitly cancels its advertisements, but if the device is unable to do this, the advertisements will expire on their own.

1.1.1 Discovery: Advertisement Protocols and Standards

To send (and receive) advertisements, devices (and control points) use the following subset of the overall UPnP protocol stack. (The overall UPnP protocol stack is listed at the beginning of this document.)

At the highest layer, discovery messages contain vendor-specific information, e.g., URL for the device description and device identifier. Moving down the stack, vendor content is supplemented by information from a UPnP Forum working committee, e.g., device type. Messages from the layers above are hosted in UPnP-specific protocols, defined in this document. In turn, the above messages are delivered via a multicast variant of HTTP that has been extended using General Event Notification Architecture (GENA) methods and headers and Simple Service Discovery Protocol (SSDP) headers. The HTTP messages are delivered via UDP over IP. For reference, colors in [square brackets] above indicate which protocol defines specific headers and values in discovery messages listed below.

1.1.2 Discovery: Advertisement: Device Available—NOTIFY with ssdp:alive

When a device is added to the network, it multicasts discovery messages to advertise its root device, to advertise any embedded devices, and to advertise its services. Each discovery message contains four major components:

1. a potential search target (e.g., device type) sent in an NT header,
2. a composite identifier for the advertisement sent in a USN header,
3. a URL for more information about the device (or enclosing device in the case of a service) sent in a LOCATION header, and
4. a duration for which the advertisement is valid sent in a CACHE-CONTROL header.

To advertise its capabilities, a device multicasts a number of discovery messages. Specifically, a root device multicasts:

| NT | USN |
|---|---|
| Three discovery messages for the root device. | |
| 1 device UUID | device UUID |
| 2 device type | device UUID and :: and device type |
| 3 upnp:rootdevice | device UUID and :: and upnp:rootdevice |
| Two discovery messages for each embedded device. | |
| 1 device UUID | device UUID |
| 2 device type | device UUID and :: and device type |
| Once for each service. | |
| 1 service type | device UUID and :: and service type |

If a root device has d embedded devices and s embedded services but only k distinct service types, this works out to 3+2d+k requests. This advertises the full extend of the device's capabilities to interested control points. These messages are sent out as a series with roughly comparable expiration times; order is unimportant, but refreshing or canceling individual messages is prohibited.

Choosing an appropriate duration for advertisements is a balance between minimizing network traffic and maximizing freshness of device status. Relatively short durations close to the minimum of 1800 seconds will ensure that control points have current device status at the expense of additional network traffic; longer durations, say on the order of a day, compromise freshness of device status but can significantly reduce network traffic. Generally, device vendors choose a value that corresponds to expected device usage: short durations for devices that are expected to be part of the network for short periods of time, and significantly longer durations for devices expected to be long-term members of the network.

Due to the unreliable nature of UDP, devices send each of the above discovery messages more than once. As a fallback, to guard against the possibility that a control point might not receive an advertisement for a device or service, the device re-sends its advertisements periodically (cf. CACHE-CONTROL below). Note that UDP packets are also bounded in length (perhaps as small as 512 Bytes in some implementations) and that there is no guarantee that the above 3+2d+k messages will arrive in a particular order.

When a device is added to the network, it sends a multicast request with method NOTIFY and ssdp:alive in the NTS header in the following format. Values in italics are placeholders for actual values.

```
NOTIFY * HTTP/1.1
HOST: 239.255.255.250:1900
CACHE-CONTROL: max-age = seconds until advertisement expires
LOCATION: URL for UPnP description for root device
NT: search target
NTS: ssdp:alive
SERVER: OS/version, UPnP/1.0, product/version
USN: advertisement UUID
```

(No body for request with method NOTIFY, but note that the message has a blank line following the last HTTP header.) The TTL for the IP packet defaults to 4 and is configurable.

Listed below are details for the request line and headers appearing in the listing above. All header values are case sensitive except where noted.

Request line

NOTIFY
  Method defined by GENA for sending notifications and events.

*
  Request applies generally and not to a specific resource.

HTTP/1.1
  HTTP version.

Headers

HOST
  Multicast channel and port reserved for SSDP by Internet Assigned Numbers Authority (IANA). Is 239.255.255.250:1900.

CACHE-CONTROL
  max-age directive specifies number of seconds the advertisement is valid. After this duration, control points assume the device (or service) is no longer available. Specified by UPnP vendor. Integer.

LOCATION
  Contains a URL to the UPnP description of the root device. In some unmanaged networks, host of this URL may contain an IP address (versus a domain name). Specified by UPnP vendor. Single URL.

NT
  Notification Type. Is one of the following. Single URI.

upnp:rootdevice
  Sent once for root device.

uuid:schemas-upnp-org:device:device-type:device-UUID
  Specified by UPnP vendor. Sent once for each device, root or embedded.

urn:schemas-upnp-org:device:device-type
  Defined by UPnP Forum working committee. Sent once for each device, root or embedded.

urn:schemas-upnp-org:service:service-type
  Defined by UPnP Forum working committee. Sent once for each service.

NTS
  Notification Sub Type. Is ssdp:alive. Single URI.

SERVER
  Concatenation of OS name, OS version, UPnP/1.0, product name, and product version. Specified by UPnP vendor. String.

USN
  header defined by SSDP. Unique Service Name. Is one of the following. (cf. table above.) The prefix (before the double colon) matches the value of the UDN element in the device description. (The section on Description explains the UDN element.) Single URI.

uuid:device-UUID::upnp:rootdevice
  Sent once for root device.

uuid:device-UUID
  Specified by UPnP vendor. Sent once for every device, root or embedded.

uuid:device-UUID::urn:schemas-upnp-org:device:device-Type:v
  Sent once for every device, root or embedded.

uuid:device-UUID::urn:schemas-upnp-org:service:service-Type:v
  Sent once for every service.

(No response for a request with method NOTIFY.)

1.1.3 Discovery: Advertisement: Device Unavailable—NOTIFY with ssdp:byebye

When a device and its services are going to be removed from the network, the device multicasts a ssdp:byebye message corresponding to each of the ssdp:alive messages it multicasted that have not already expired. If the device is removed abruptly from the network, it might not be possible to multicast a message. As a fallback, discovery messages include an expiration value in a CACHE-CONTROL header (as explained above); if not re-advertised, the discovery message eventually expires on its own and is removed from any control point cache.

(Note: when a control point is about to be removed from the network, no discovery-related action is required.)

When a device is about to be removed from the network, it explicitly revokes its discovery messages by sending one multicast request for each ssdp:alive message it sent. Each multicast request has method NOTIFY and ssdp:byebye in the NTS header in the following format. Values in italics are placeholders for actual values.

```
<SPAN class=gena>NOTIFY</SPAN> * HTTP/1.1
HOST: <SPAN class=ssdp>239.255.255.250</SPAN>:<SPAN class=ssdp>1900</SPAN>
<SPAN class=gena>NT</SPAN>: <SPAN class=vendor>search target</SPAN>
<SPAN class=gena>NTS</SPAN>: <SPAN class=ssdp>ssdp:byebye</SPAN>
<SPAN class=ssdp>USN</SPAN>: <SPAN class=vendor>advertisement UUID</SPAN>
```

(No body for request with method NOTIFY, but note that the message has a blank line following the last HTTP header.) The TTL for the IP packet defaults to 4 and is configurable.

Listed below are details for the request line and headers appearing in the listing above. All header values are case sensitive except where noted.

Request Line

NOTIFY

Method defined by GENA for sending notifications and events.

*

Request applies generally and not to a specific resource.

HTTP/1.1

HTTP version.

Headers

HOST

Multicast channel and port reserved for SSDP. Is 239.255.255.250:1900.

NT

Notification Type. Single URI.

NTS

Notification Sub Type. Is ssdp:byebye. Single URI.

USN

Unique Service Name. Single URI.

(No response for a request with method NOTIFY.)

Due to the unreliable nature of UDP, devices send each of the above messages more than once. As a fallback, if a control point fails to receive notification that a device or services is unavailable, the original discovery message will eventually expire yielding the same effect.

1.2 Discovery: Search

When a control point is added to the network, the UPnP discovery protocol allows that control point to search for devices of interest on the network. It does this by multicasting a search message with a pattern, or target, equal to a type or identifier for a device or service. Responses from devices contain discovery messages essentially identical to those advertised by newly connected devices; the former are unicast while the latter are multicast.

1.2.1 Discovery: Search Protocols and Standards

To search for devices (and be discovered by control points), control points (and devices) use the following subset of the overall UPnP protocol stack. (The overall UPnP protocol stack is listed at the beginning of this document.)

At the highest layer, search messages contain vendor-specific information, e.g., the control point, device, and service identifiers. Moving down the stack, vendor content is supplemented by information from a UPnP Forum working committee, e.g., device or service types. Messages from the layers above are hosted in UPnP-specific protocols, defined in this document. In turn, search requests are delivered via a multicast variant of HTTP that has been extended using Simple Service Discovery Protocol (SSDP) methods headers. Search responses are delivered via a unicast variant of HTTP that has also been extended with SSDP. (GENA is not involved when control points search for devices.) Both kinds of HTTP messages are delivered via UDP over IP. For reference, colors in [square brackets] above indicate which protocol defines specific headers and values in discovery messages listed below.

1.2.2 Discovery: Search: Request with M-SEARCH

When a control point is added to the network, it sends a multicast request with method M-SEARCH in the following format. Values in italics are placeholders for actual values.

```
M-SEARCH*HTTP/1.1
HOST: 239.255.255.250:1900
MAN: "ssdp:discover"
MX: seconds to delay response
S: uuid:controlpoint UUID
ST: search target
```

(No body for request with method M-SEARCH.)

Listed below are details for the request line and headers appearing in the listing above. All header values are case sensitive except where noted.

Request Line

M-SEARCH

Method defined by SSDP for search requests.

*

Request applies generally and not to a specific resource.

HTTP/1.1

HTTP version.

Headers

HOST

Multicast channel and port reserved for SSDP. Is 239.255.255.250:1900.

MAN

Is "ssdp:discover".

MX

Maximum wait. Device responses are delayed a random duration between 0 and this many seconds to balance load for the control point when it processes responses. Specified by UPnP vendor. Integer.

S

Source identifier. Universally-unique identifier for the control point. Specified by UPnP vendor. Single URI.

ST

Search Target. Is one of the following. (cf. NT header in advertisement.) Single URI.

ssdp:all

Search for all devices and services.

upnp:rootdevice
Search for root devices only.

uuid:schemas-upnp-org:device:device-type:device-UUID
Specified by UPnP vendor. Search for a particular device.

urn:schemas-upnp-org:device:device-type
Defined by UPnP Forum working committee. Search for any device of this type.

urn:schemas-upnp-org:service:service-type
Defined by UPnP Forum working committee. Search for any service of this type.

1.2.3 Discovery: Search: Response

To be found, a device sends a response in the following format. (Compare to multicast request with method NOTIFY and ssdp:alive in the NTS header above.) Values in italics are placeholders for actual values.
HTTP/1.1 200 OK
CACHE-CONTROL: max-age=seconds until advertisement expires
DATE: when response was generated
EXT:
LOCATION: URL for UPnP description for root device
S: uuid:controlpoint UUID
SERVER: OS/version, UPnP/1.0, product/version
ST: search target
USN: uuid:schemas-upnp-org:device:device-type:UUID (No body for a response to a request with method M-SEARCH.)

Listed below are details for the headers appearing in the listing above. All header values are case sensitive except where noted.

Headers

CACHE-CONTROL
max-age directive specifies number of seconds the advertisement is valid. After this duration, control points assume the device (or service) is no longer available. Specified by UPnP vendor. Integer.

DATE
When response was generated. RFC 1123 date.

EXT
Confirms that the MAN header was understood. (Header only; no value.)

LOCATION
Contains a URL to the UPnP description of the root device. Specified by UPnP vendor. Single URL.

S
Source identifier. Is the universally-unique identifier sent in the request. Specified by UPnP vendor. Single URI.

SERVER
Concatenation of OS name, OS version, UPnP/1.0, product name, and product version. Specified by UPnP vendor. String.

ST
Search Target. Single UR1. If ST header in request was, ssdp:all
Respond 3+2d+s times for a root device with d embedded devices and s embedded services.

upnp:rootdevice
Respond once for root device.

uuid:schemas-upnp-org:device:device-type:device-UUID
Respond once for each device, root or embedded.

urn:schemas-upnp-org:device:device-type
Respond once for each device, root or embedded.

urn:schemas-upnp-org:service:service-type
Respond once for each service.

USN
Unique Service Name. Single URI.

(No UPnP-specific errors are defined for search messages.) Errors may be returned by layers in the protocol stack below UPnP. Consult documentation on those protocols for details.

2. Description

Description is Step 2 in UPnP networking. Description comes after discovery (Step 1) where control points find interesting device(s). And description enables control (Step 3) where a control points send commands to device(s), eventing (Step 4) where control points listen to state changes in device(s), and presentation (Step 5) where control points display a user interface for device(s).

After a control point has discovered a device, the control point still knows very little about the device—only the information that was in the discovery message, i.e., the device's (or service's) UPnP type, the device's universally-unique identifier, and a URL to the device's UPnP description. For the control point to learn more about the device and its capabilities, or to interact with the device, the control point retrieves the device's description from the URL provided by the device in the discovery message.

The UPnP description for a device includes vendor-specific, manufacturer information like the model name and number, serial number, manufacturer name, URLs to vendor-specific Web sites, etc. (details below). The description also includes a list of any embedded devices or services, as well as URLs for control, eventing, and presentation. This section explains embedded devices; the section on Control explains how services are described, and the sections on Control, Eventing, and Presentation explain how URLs for control, eventing, and presentation are used, respectively.

Note that a single physical device may include multiple logical devices. Multiple logical devices can be modeled as a single root device with embedded devices (and services) or as multiple root devices (perhaps with no embedded devices). In either case, there is one UPnP description for each root device, with embedded device descriptions as needed.

The UPnP description for a device is written by a UPnP vendor. The description is in XML syntax and is usually based on a standard UPnP Device Template. A UPnP Device Template is produced by a UPnP Forum working committee; they derive the template from the UPnP Template Language, which was derived from standard constructions in XML. This section explains the format for a UPnP device description, UPnP Device Templates, and the part of the UPnP Template Language that covers devices. (The section on Control explains the part of the UPnP Template Language that covers services.)

Retrieving the UPnP description for a device is simple: the control point issues an HTTP GET request on the URL in the discovery message, and the device returns the description document. The protocol stack, method, headers, and body for the response and request are explained in detail below.

UPnP vendors can differentiate their devices by extending services, including additional UPnP services, or embedding additional UPnP devices. When a control point retrieves a particular device's description, these added features are exposed to the control point for control, eventing, and presentation. (Other means for UPnP vendor differentiation are explained in the control section.)

The remainder of this section first explains how devices are described, explaining details of vendor-specific information, embedded devices, and URLs for control, eventing, and presentation. Then it explains UPnP Device Templates and the UPnP Template Language as it pertains to describing devices. Finally, it explains in detail how a control point retrieves a description from a device.

2.1 Description: Device Description

The UPnP description for a device contains several pieces of vendor-specific information, definitions of embedded devices and services, and URLs for control, eventing, and presentation of the device.

To illustrate these, below is a listing with placeholders (in italics) for actual elements and values. Some of these placeholders would be specified by a UPnP Forum working committee (colored red) or by a UPnP vendor (purple). (Elements defined by the UPnP Device Architecture are colored green for later reference.) Immediately following the listing is a detailed explanation of the elements, attributes, and values.

<?xml version="1.0"?>
<root xmlns="urn:schemas-upnp-org:device:1:0">
<specVersion>
<major>1</major>
<minor>0</minor>
</specVersion>
<URLBase>base URL for all relative URLs</URLBase>
<device>
<deviceType>urn:schemas-upnp-org:device:device-type</deviceType>
<friendlyName>short user-friendly title</friendlyName>
<modelDescription>long user-friendly title</modelDescription>
<modelName>model name</modelName>
<modelNumber>model number</modelNumber>
<modelURL>URL to model site</modelURL>
<manufacturer>manufacturer name</manufacturer>
<manufacturerURL>URL to manufacturer site</manufacturerURL>
<serialNumber>manufacturer's serial number</serialNumber>
<UDN>uuid:schemas-upnp-org:device:device-type:UUID</UDN>
<UPC>Universal Product Code</UPC>
<iconList>
<icon>
<mimetype>image/format</mimetype>
<width>horizontal pixels</width>
<height>vertical pixels</height>
<depth>color depth</depth>
<url>URL to icon</url>
</icon>
XML to declare other icons, if any, go here
</iconList>
<servicelist>
<service>
<serviceType>urn:schemas-upnp-org:service:service-type:service-version</serviceType>
<serviceId>service ID</serviceId>
<SCPDURL>URL to service description</SCPDURL>
<controlURL>URL for control</controlURL>
<eventSubURL>URL for eventing</eventSubURL>
</service>
Declarations for other services defined by a UPnP Forum working committee (if any) go here
Declarations for other services added by UPnP vendor (if any) go here
</serviceList>
<deviceList>
Description of embedded devices defined by a UPnP Forum working committee (if any) go here
Description of embedded devices added by UPnP vendor (if any) go here
</deviceList>
<presentationURL>URL for presentation</presentationURL>
</device>
</root>

Listed below are details for each of the elements, attributes, and values appearing in the listing above. All elements and attributes are case sensitive; HTTP specifies case sensitivity for URLs; other values are not case sensitive except where noted. The order of elements is insignificant.

xml
　Case sensitive.

root
　Has urn:schemas-upnp-org:device:1:0 as the value for the xmlns attribute; this references the UPnP Template Language (described below). Case sensitive. Contains all other elements describing the root device, i.e., contains the following sub elements:

specVersion
　Contains the following sub elements:

major
　Major version of the UPnP Device Architecture. Is 1.

minor
　Minor version of the UPnP Device Architecture. Is 0.

URLBase
　Defines the base URL. Used to construct fully-qualified URLs. All relative URLs that appear elsewhere in the description are appended to this base URL. If URLBase is empty or not given, the base URL is the value of the LOCATION header in the discovery message. Specified by UPnP vendor. Single URL.

device
　Contains the following sub elements:

deviceType
　UPnP device type.
　For standard devices defined by a UPnP Forum working committee, begins with urn:schemas-upnp-org:device: followed by a device type suffix (as shown in the listing above).
　For non-standard devices specified by UPnP vendors, begins with urn:, followed by a domain name owned by the vendor, followed by :device:, followed by a device type suffix, i.e., urn:domain-name:device:device-type. Single URI.

friendlyName
Short description for end user. Is localized (cf. ACCEPT-LANGUAGE header). String. Is <64 characters.

manufacturer
Manufacturer's name. Specified by UPnP vendor. String. Is <64 characters.

manufacturerURL
Web site for Manufacturer. May be relative to base URL. Specified by UPnP vendor. Single URL.

modelDescription
Long description for end user. Is localized (cf. ACCEPT-LANGUAGE header). Specified by UPnP vendor. String. Is <128 characters.

modelName
Model name. Specified by UPnP vendor. String. Is <32 characters.

modelNumber
Model number. Specified by UPnP vendor. String. Is <32 characters.

modelURL
Web site for model. May be relative to base URL. Specified by UPnP vendor. Single URL.

presentationURL
URL to presentation hosted by device (cf. section on Presentation). May be relative to base URL. Specified by UPnP vendor. Single URL.

serialNumber
Serial number. Specified by UPnP vendor. String. Is <64 characters.

UDN
Universal Device Name. Universally-unique identifier for the device, whether root or embedded.
For standard devices defined by a UPnP Forum working committee, begins with uuid:schemas-upnp-org:device: followed by the device type, colon; UPnP vendor specifies UUID suffix (as shown in the listing above).
For non-standard devices specified by UPnP vendors, begins with uuid:, followed by a domain name owned by the vendor, followed by :device:, followed by the device type, colon, followed by a UUID suffix, i.e., uuid:domain-name:device:device-type:UUID.
Single URI.

UPC
Universal Product Code. 12-digit, all-numeric code that identifies the consumer package. Managed by the Uniform Code Council. Single UPC.

iconList
Contains the following sub elements:

icon
Icon to depict device in a control point UI. Recommend one icon in each of the following sizes (width×height×depth): 16×16×1, 16×16×8, 32×32×1, 32×32×8, 48×48×1, 48×48×8. Contains the following sub elements:

mimetype
Icon's MIME type (cf. RFC 2387). Single MIME image type.

width
Horizontal dimension of icon in pixels. Integer.

height
Vertical dimension of icon in pixels. Integer.

depth
Number of color bits per pixel. Integer.

url
Pointer to icon image. (XML does not support embedding of binary data. See note below.) Retrieved via HTTP. May be relative to base URL. Specified by UPnP vendor. Single URL.

serviceList
Contains the following sub elements:

service
Repeated once for each service defined by a UPnP Forum working committee. If UPnP vendor differentiates device by adding additional, standard UPnP services, repeated once for additional service. Contains the following sub elements:

controlURL
URL for control (cf. section on Control). May be relative to base URL. Specified by UPnP vendor. Single URL.

eventSubURL
URL for eventing (cf. section on Eventing). May be relative to base URL. Specified by UPnP vendor. Single URL.

SCPDURL
URL for service description (nee Service Control Protocol Definition URL). (cf. section on Control.) May be relative to base URL. Specified by UPnP vendor. Single URL.

serviceId
Service identifier. Is unique within this device description. <format TBD>. Defined by a UPnP Forum working committee. Single URI.

serviceType
UPnP service type.
For standard service types defined by a UPnP Forum working committee, begins with urn:schemas-upnp-org:service: followed by a service type suffix (as shown in the listing above).
For non-standard service types specified by UPnP vendors, begins with urn:, followed by a domain name owned by the vendor, followed by :service:, followed by a service type suffix, i.e., urn:domain-name:service:service-type:service-version.
Single URI.

deviceList
Contains the following sub elements:

device
Repeat once for each embedded device defined by a UPnP Forum working committee. If UPnP vendor differentiates device by embedding additional UPnP devices, repeat once for each embedded device. Contains sub elements as defined above for root sub element device.

For future extensibility, when processing XML like the listing above, devices and control points ignore any unknown elements and any sub elements or content as specified by the Flexible XML Processing Profile (FXPP).

XML does not support directly embedding binary data, e.g., icons in UPnP descriptions. Binary data may be converted into text (and thereby embedded into XML) using an XML data type of either bin.base64 (a MIME-style base 64 encoding for binary data) or bin.hex (hexadecimal digits represent octets). Alternatively, the data can be passed indirectly, as it were, by embedding a URL in the XML and transferring the data in response to a separate HTTP request; the icon(s) in UPnP descriptions are transferred in this latter manner.

2.2 Description: UPnP Device Template

The listing above also illustrates the relationship between a UPnP device description and a UPnP Device Template. As explained above, the UPnP description for a device is written by a UPnP vendor, in XML, following a UPnP Device Template. A UPnP Device Template is produced by a UPnP Forum working committee as a means to standardize devices.

By appropriate specification of placeholders, the listing above can be either a UPnP Device Template or a UPnP device description. Recall that some placeholders would be defined by a UPnP Forum working committee (colored red), i.e., the UPnP device type identifier, UPnP services, and UPnP embedded devices (if any). If these were defined, the listing would be a UPnP Device Template, codifying the standard for this type of device. UPnP Device Templates are one of the key deliverables from UPnP Forum working committees.

Taking this another step further, the remaining placeholders in the listing above would be specified by a UPnP vendor (colored purple), i.e., vendor-specific information. If these placeholders were specified (as well as the others), the listing would be a UPnP device description, suitable to be delivered to a control point to enable control, eventing, and presentation.

Put another way, the UPnP Device Template defines the overall type of device, and each UPnP device description instantiates that template with vendor-specific information. The first is created by a UPnP Forum working committee; the latter, by a UPnP vendor.

2.3 Description: UPnP Template Language for Devices

The paragraphs above explain UPnP device descriptions and illustrate how one would be instantiated from a UPnP Device Template. As explained, UPnP Device Templates are produced by UPnP Forum working committees, and these templates are derived from the UPnP Template Language. This template language defines well-formed templates for devices and services. Below is a listing and explanation of this language as it pertains to devices. The section on Control explains the UPnP Template Language as it pertains to services.

The UPnP Template Language is written in XML syntax and is derived from XML Schema (Part 1: Structures, Part 2: Datatypes). XML Schema provides a set of XML constructions that express language concepts like required vs. optional elements, element nesting, and data types for values (as well as other properties not of interest here). The UPnP Template Language uses these XML Schema constructions to define elements like specVersion, URLBase, deviceType, et al listed in detail above. Because the UPnP Template Language is constructed using another, precise language, it is unambiguous. And because the UPnP Template Language, UPnP Device Templates, and UPnP device descriptions are all machine-readable, automated tools can automatically check to ensure the latter two have all required elements, are correctly nested, and have values of the correct data types. Below is the UPnP Template Language for devices as defined by the UPnP Device Architecture herein. The elements it defines are used in UPnP Device Templates; they are colored green here, and they are colored green in the listing above. Below is where these elements are defined; above is where they are used.

Immediately following this is a brief explanation of the XML Schema elements, attributes, and values used. The reference to XML Schema at the end of the section has further details.

UPnP Template Language for Devices
```
<?xml version="1.0" ?>
<Schema name="urn:schemas-upnp-org:device:1:0"
 xmlns:dt="urn:schemas-microsoft-com:xml-data"
 xmlns:dt="urn:schemas-microsoft-com:datatypes">
 <ElementType name="root" content="eltOnly">
  <element type="specVersion"/>
  <element type="URLBase" minOccurs="0"/>
  <element type="device"/>
 </ElementType>
 <ElementType name="specVersion">
  <element type="major"/>
  <element type="minor"/>
 </ElementType>
 <ElementType name="major" dt:type="int"/>
 <ElementType name="minor" dt:type="int"/>
 <ElementType name="URLBase" dt:type="uri"/>
 <ElementType name="device" content="eltOnly">
  <element type="UDN"/>
  <element type="friendlyName"/>
  <element type="deviceType"/>
  <element type="presentationURL" minOccurs="0"/>
  <element type="manufacturer"/>
  <element type="manufacturerURL" minOccurs="0" P>
  <element type="modelName"/>
  <element type="modelNumber" minOccurs="0"/>
  <element type="modelDescription" minOccurs="0"/>
  <element type="modelURL" minOccurs="0"/>
  <element type="UPC" minOccurs="0"/>
  <element type="serialNumber" minOccurs="0"/>
  <element type="iconList"/>
  <element type="serviceList"/>
  <element type="deviceList" minOccurs="0"/>
 </ElementType>
 <ElementType name="UDN" dt:type="uri"/>
 <ElementType name="friendlyName" dt:type="string"/>
 <ElementType name="deviceType" dt:type="uri"/>
 <ElementType name="presentationURL" dt:type="uri"/>
 <ElementType name="manufacturer" dt:type="string"/>
 <ElementType name="manufacturerURL" dt:type="uri"/>
 <ElementType name="modelName" dt:type="string"/>
 <ElementType name="modelNumber" dt:type="string"/>
 <ElementType name="modelDescription" dt:type="string"/>
 <ElementType name="modelURL" dt:type="uri"/>
 <ElementType name="UPC" dt:type="string">
 <ElementType name="serialNumber" dt:type="string"/>
```

```
<ElementType name="iconList" content="eltOnly">
  <element type="icon" maxOccurs="*"/>
</ElementType>
<ElementType name="icon" content="eltOnly">
  <element type="mimetype"/>
  <element type="width"/>
  <element type="height"/>
  <element type="depth"/>
  <element type="url"/>
</ElementType>
<ElementType name="mimetype" dt:type="string"/>
<ElementType name="width" dt:type="int"/>
<ElementType name="height" dt:type="int"/>
<ElementType name="depth" dt:type="int"/>
<ElementType name="url" dt:type="uri"/>
<ElementType name="deviceList" content="eltOnly">
  <element type="device" maxOccurs="*"/>
</ElementType>
<ElementType name="serviceList" content="eltOnly">
  <element type="service" maxOccurs="*"/>
</ElementType>
<ElementType name="service" content="eltOnly">
  <element type="serviceType"/>
  <element type="serviceId"/>
  <element type="controlURL"/>
  <element type="eventSubURL"/>
  <element type="SCPDURL"/>
</ElementType>
<ElementType name="serviceType" dt:type="uri"/>
<ElementType name="serviceId" dt:type="uri"/>
<ElementType name="controlURL" dt:type="uri"/>
<ElementType name="eventSubURL" dt:type="uri"/>
<ElementType name="SCPDURL" dt:type="uri"/>
</Schema>
```

ElementType
　Defines an element in the new, derived language. name attribute defines element name. dt:type attribute defines the data type for the value of element in the new, derived language.

element
　References an element for the purposes of declaring nesting. minOccurs attribute defines minimum number of times the element occurs; default is minOccurs=1; optional elements have minOccurs=0. maxOccurs attribute defines maximum number of times the element occurs; default is maxOccurs=1; elements that can appear one or more times have maxOccurs=*.

2.4 Description: Retrieving a Description

As explained above, after a control point has discovered a device, it still knows very little about the device. To learn more about the device and its capabilities, the control point retrieves the UPnP description for the device using the URL provided by the device in the discovery message. This is a simple HTTP-based process and uses the following subset of the overall UPnP protocol stack. (The overall UPnP protocol stack is listed at the beginning of this document.)

At the highest layer, description messages contain vendor-specific information, e.g., device type, service type, and services. Moving down the stack, vendor content is supplemented by information from a UPnP Forum working committee, e.g., model name, model number, and specific URLs. Messages from the layers above are hosted in UPnP-specific protocols, defined in this document. In turn, the above messages are delivered via HTTP over TCP over IP. For reference, colors in [square brackets] above indicate which protocol defines specific header and body elements in the description messages listed below.

Using this protocol stack, retrieving the UPnP description for a device is simple: the control point issues an HTTP GET request to the URL in the discovery message, and the device returns its description in the body of an HTTP response. The headers and body for the response and request are explained in detail below.

First, a control point sends a request with method GET in the following format. Values in italics are placeholders for actual values.

GET path to device description HTTP/1.1
　HOST: host for device description:port for device description
　ACCEPT-LANGUAGE: language preferred by control point (No message body for request to retrieve a description.)

Listed below are details for the request line and headers appearing in the listing above. All header values are case sensitive except where noted.

Request Line

GET
　Method defined by HTTP.

Path to Device Description
　Path component of device description URL (LOCATION header in discovery message). Single, relative URL.

HTTP/1.1
　HTTP Version.

Headers

HOST
　Domain name or IP address and optional port components of device description URL (LOCATION header in discovery message). If the port is empty or not given, port 80 is assumed.

ACCEPT-LANGUAGE
　Preferred language(s) for device description. If no description is available in this language, device may return a description in a default language. RFC 1766 language tag(s).

After a control point sends a request, the device takes the second step: a device sends a response in the following format. Values in italics are placeholders for actual values.

HTTP/1.1 200 OK
　CONTENT-LENGTH: bytes in body
　CONTENT-TYPE: text/xml
　DATE: when responded
　SERVER: OS/version, UPnP/1.0, product/version The body of this response is a UPnP device description as explained in detail above. Listed below are details for the headers appearing in the listing above. All header values are case sensitive except where noted.

Headers

CONTENT-LENGTH
　Length of body in bytes. Integer.

CONTENT-TYPE
　Is text/xml.

DATE

When response was generated. RFC 1123 date.

SERVER

Concatenation of OS name, slash, OS version, UPnP/1.0, product name, slash, and product version. String.

3. Control

Control is Step 3 in UPnP networking. Control comes after discovery (Step 1) where control points find interesting device(s), and after description (Step 2) where control points learn about device capabilities. Control is intimately linked with eventing (Step 4) where control points listen to state changes in device(s). Through control, control points send actions to devices and poll for values. Control and eventing are complementary to presentation (Step 5) where control points display a user interface provided by device(s).

After a control point has (1) discovered a device and (2) retrieved a description of the device, the control point has the bare essentials for device control. To learn more about the service, a control point retrieves a detailed UPnP description for each service.

A UPnP description for a service includes a list of the commands, or actions, the service responds to, and parameters, or arguments, for each action. A service description also includes a list of variables. These variables model the state of the service at run time, and are described in terms of their data type, range, and event characteristics. This section explains the description of actions, arguments, state variables, and properties of those variables. The section on Eventing explains event characteristics.

Like the UPnP description for a device, the UPnP description for a service is written by a UPnP vendor. The description is in XML syntax and is based on a standard UPnP Service Template. A UPnP Service Template is produced by a UPnP Forum working committee; they derive the template from the UPnP Template Language, augmenting it with human language where necessary. As explained above, the UPnP Template Language is derived from standard constructions in XML. This section explains the format for a UPnP service description, UPnP Service Templates, typical augmentations in human language, and the part of the UPnP Template Language that covers services. (The section on Description explains the part of the UPnP Template Language that covers devices.)

To control a device, a control point requests a device's service to perform an action. To do this, a control point sends a suitable control message to the control URL for the service (provided in the device description). In response, the service provides a simple acknowledgement; unlike function calls, no service-specific value is returned. The effects of the action, if any, are modeled by changes in the variables that describe the run-time state of the service. When these state variables change, events are published to all interested control points. This section explains the protocol stack for, and format of, control messages. The section on Eventing explains event publication.

To prevent a race condition between events headed for control points and requested actions headed for a service, control messages may include a key. With each new event message a service generates, the service increments the key, and includes that key in the event message. When a control point sends a control message, it may choose to include a key. If a control message includes a key, the service checks to see if the key is current, i.e., if no events have been sent since this key was issued. If the key is current (or if there was no key in the control message), then the service acknowledges the action request. If the key is not current, the service fails the action request. This section briefly explains the event key. The section on Eventing explains in detail event messages and event publication.

To determine the current value of a state variable, a control point may poll the service. Similar to requesting an action, a control point sends a suitable query message to the control URL for the service. In response, the service provides the value of the variable. This section also explains the format of these query messages. The section on eventing explains automatic notification of variable values.

The remainder of this section first explains how services are described, explaining details of actions, arguments, state variables, and properties of those variables. Second, it explains UPnP Service Templates, typical ways to augment service descriptions with human language, and the UPnP Template Language as it pertains to services. Third, it explains how a control point retrieves a service description. Finally, this section explains in detail how control and query messages are formatted and sent to devices.

3.1 Control: Service Description

The UPnP description for a service defines actions and their arguments, and state variables and their data type, range, and event characteristics.

Each action may have zero or more arguments. Each argument corresponds to a state variable. This direct-manipulation programming model reinforces simplicity.

To illustrate these points, below is a listing with placeholders (in italics) for actual elements and values. For a standard UPnP service, some of these placeholders would be defined by a UPnP Forum working committee (colored red) or specified by a UPnP vendor (purple). For a vendor-unique service, all of these placeholders would be specified by a UPnP vendor. (Elements defined by the UPnP Device Architecture are colored green for later reference.) Immediately following the listing is a detailed explanation of the elements, attributes, and values.

```
<?xml version=" 1.0"?>
<scpd xmlns="urn:schemas-upnp-org:service:1:0">
<actionList>
<action>
<name>action name</name>
<argumentList>
<argument>
<name>formal parameter name</name>
<relatedStateVariable>state variable name</relatedStateVariable>
</argument>
Declarations for other arguments defined by UPnP Forum
    working committee (if any)
go here
</argumentList>
</action>
Declarations for other actions defined by UPnP Forum
    working committee (if any) go here
Declarations for other actions added by UPnP vendor (if
    any) go here
</actionList>
<serviceStateTable>
<stateVariable>
<name>variable name</name>
<dataType>variable data type</dataType>
```

```
<defaultValue>default value</defaultValue>
<allowedValueRange>
<minimum>minimum value</minimum>
<maximum>maximum value</maximum>
<step>increment value</step>
</allowedValueRange>
</stateVariable>
Declarations for other state variables defined by UPnP
    Forum working committee (if any) go here
Declarations for other state variables added by UPnP
    vendor (if any) go here
</serviceStateTable>
</scpd>
```

Listed below are details for each of the elements, attributes, and values appearing in the listing above. All elements and attributes are case sensitive; values are not case sensitive except where noted. Except where noted, the order of elements is insignificant.

xml
  Case sensitive.

scpd
  Has urn:schemas-upnp-org:service:1:0 as the value for the xmlns attribute; this references the UPnP Template Language (explained below). Case sensitive. Contains all other elements describing the service, i.e., contains the following sub elements:

actionList
  Contains the following sub elements:

action
  Contains the following sub elements:

name
  Name of action. String. Is <32 characters.

argumentList
  Repeat once for each parameter. Contains the following sub elements:

argument
  Contains the following sub elements:

name
  Name of formal parameter. Is name of a state variable that models an effect the action causes. String. Is <32 characters.

relatedStateVariable
  Is the name of a state variable.

serviceStateTable
  Contains the following sub elements:

stateVariable
  If UPnP vendor differentiates service by adding additional state variables, required for each additional variable. sendEvents attribute defines whether event messages will be generated when the value of this state variable changes; non-evented state variables have sendEvents=no; default is sendEvents=yes. Contains the following sub elements:

name
  Name of state variable. Defined by a UPnP Forum working committee for standard state variables; specified by UPnP vendor for extensions. String. Is <32 characters.

dataType
  Defined by a UPnP Forum working committee for standard state variables; specified by UPnP vendor for extensions. Is one of the following values:

i4
  Fixed point, integer number. May have a leading sign. May have leading zeros. (No currency symbol.) (No grouping of digits to the left of the decimal, e.g., no commas.) Is between −2147483648 and 2147483647, i.e., 4 byte, long integer. (Same as i4 data type defined by XML Schema, Part 2: Datatypes.)

r8
  Floating point number. Mantissa (left of the decimal) and/or exponent may have a leading sign. Mantissa and/or exponent may have leading zeros. Decimal character in mantissa is a period, i.e., whole digits in mantissa separated from fractional digits by period. Mantissa separated from exponent by E. (No currency symbol.) (No grouping of digits in the mantissa, e.g., no commas.) Is between −1.79769313486232E308 and −4.94065645841247E-324 for negative values, and between 4.94065645841247E-324 and 1.79769313486232E308 for positive values, i.e., IEEE 64-bit (8-byte) double. (Same as r8 data type defined by XML Schema, Part 2: Datatypes).

string
  Unicode string. (Same as string data type defined by XML.)

dateTime
  Date and Time in ISO 8601 format (Same as dateTime data type defined by XML Schema, Part 2: Datatypes.)

boolean
  0, false, or no for false; 1, true, or yes for true. (Same as boolean data type defined by XML Schema, Part 2: Datatypes.)

bin.hex or bin.bin64
  Hexadecimal representation of binary data. (Same as bin.base64 and bin.hex data types defined by XML Schema, Part 2: Datatypes.)

defaultValue
  Expected, initial value. Defined by a UPnP Forum working committee or delegated to UPnP vendor. Matches data type. Satisfies allowedValueList or allowedValueRange constraints.

allowedValueList
  Enumerates legal string values. Prohibited for data types other than string. At most one of allowedValueRange and allowedValueList may be specified. Sub elements are ordered (e.g., see NEXT_STRING_BOUNDED). Contains the following sub elements:

allowedValue
  A legal value for a string variable. Defined by a UPnP Forum working committee for standard state variables; specified by UPnP vendor for extensions. String. Is <32 characters.

allowedValueRange
  Defines bounds for legal numeric values; defines resolution for numeric values. Prohibited for data types other than i4 and r8. At most one of allowedValueRange and allowedValueList may be specified. At least one of the following sub elements is included. Contains the following sub elements:

minimum
  Inclusive lower bound. Defined by a UPnP Forum working committee or delegated to UPnP vendor. Single i4 or r8.

maximum
  Inclusive upper bound. Defined by a UPnP Forum working committee or delegated to UPnP vendor. Single i4 or r8.

step
  Size of an increment operation, i.e., value of s in the operation v=v+s. Defined by a UPnP Forum working committee or delegated to UPnP vendor. Single i4 or r8.

For future extensibility, when processing XML like the listing above, devices and control points ignores any unknown elements and any sub elements or content as specified by the Flexible XML Processing Profile (FXPP).

Note that it is logically possible for a service to have no actions but have state variables and eventing; such a service would be an autonomous information source. Conversely, it is also logically possible for a service to have no state variables (and no eventing) but have actions; such a service might be stateless and cause short-term environmental effects.

Services standardized by UPnP Forum working committees are versioned. Every later version of a service is a superset of the previous version, i.e., it includes all actions and state variables exactly as they are defined by earlier versions of the service. The UPnP service type remains the same across all versions of a service whereas the service version is larger for later versions.

3.2 Control: UPnP Service Template

The listing above also illustrates the relationship between a UPnP service description and a UPnP Service Template. As explained above, the UPnP description for a service is written by a UPnP vendor, in XML, following a UPnP Service Template. A UPnP Service Template is produced by a UPnP Forum working committee as a means to standardize devices. By appropriate specification of placeholders, the listing above can be either a UPnP Service Template or a UPnP service description. Recall that some placeholders would be defined by a UPnP Forum working committee (colored red), i.e., actions and their parameters, and states and their data type, range, and event characteristics. If these were specified, the listing above would be a UPnP Service Template, codifying the standard for this type of service. Along with UPnP Device Templates (cf. section on Description), UPnP Service Templates are one of the key deliverables from UPnP Forum working committees.

Taking this another step further, the remaining placeholders in the listing above would be specified by a UPnP vendor (colored purple), i.e., additional, vendor-specified actions and state variables. If these placeholders were specified (as well as the others), the listing would be a UPnP service description, suitable for effective control of the service within a device. Put another way, the UPnP Service Template defines the overall type of service, and each UPnP service description instantiates that template with vendor-specific additions. The first is created by a UPnP Forum working committee; the latter, by a UPnP vendor.

3.3 Control: UPnP Template Language for Services

The paragraphs above explain UPnP service descriptions and illustrate how one would be instantiated from a UPnP Service Template. Like UPnP Device Templates, UPnP Service Templates are produced by UPnP Forum working committees, and these templates are derived from the UPnP Template Language. This template language defines well-formed templates for devices and services. The section on Description explains the UPnP Template Language as it pertains to devices. As explained in the section on Description, the UPnP Template Language is written in XML syntax and is derived from XML Schema (Part 1: Structures, Part 2: Datatypes). Below is a listing of this language as it pertains to services. The elements it defines are used in UPnP Service Templates; they are colored green here, and they are colored green in the listing above. Below is where these elements are defined; above is where they are used.

Immediately following this is a brief explanation of the XML Schema elements, attributes, and values used. The reference to XML Schema at the end of the section has further details.

UPnP Template Language for Services
```
<?xml version="1.0"?>
<Schema name="urn:schemas-upnp-org:service:
    1:0"xmlns="urn:schemas-microsoft-com:xml-
    data"xmlns:dt="urn:schemas-microsoft-com:
    datatypes">
<ElementType name="name" content="textOnly"
    dt:type="string"/>
<ElementType name="defaultValue" content="textOnly"
    dt:type="string"/>
<ElementType name="minimum" content="textOnly"
    dt:type="number"/>
<ElementType name="maximum" content="textOnly"
    dt:type="number"/>
<ElementType name="step" content="textOnly"
    dt:type="number"/>
<ElementType name="allowedValueRange"
    content="eltOnly" model="closed">
<element type=" minimum"/>
<element type="maximum"/>
<element type="step" minOccurs="0"/>
</ElementType>
<ElementType name="allowedValue"
    content="textOnly"/>
<ElementType name="allowedValueList"
    content="eltOnly" model="closed">
<element type="allowedValue" minOccurs="1" maxOccurs="*"/>
</ElementType>
<ElementType name="dataType" content="textOnly"
    dt:type="string"/>
<ElementType name="stateVariable" content="eltOnly"
    model="closed">
<element type="name"/>
<element type="dataType"/>
<element type="defaultValue" minOccurs="0" maxOccurs="1"/>
<group minOccurs="0" maxOccurs="1" order="one">
<element type="allowedValueList"/>
<element type="allowedValueRange"/>
</group>
<AttributeType name="sendEvents"/>
<attribute default="yes" type="sendEvents"
    required="no"/>
</ElementType>
<ElementType name="serviceStateTable"
    content="eltOnly" model="closed">
```

```
<element type="stateVariable" minOccurs="1" maxOc-
    curs="*"/>
</ElementType>
<ElementType    name="relatedStateVariable"
    content="textOnly" dt:type="string"/>
<ElementType  name="argument"  content="eltOnly"
    model="closed">
<element type="name"/>
<element type="relatedStateVariable"/>
</ElementType>
<ElementType name="argumentList" content="eltOnly"
    model="closed">
<element  type="argument"  minOccurs="1"  maxOc-
    curs="*"/>
</ElementType>
<ElementType    name="action"    content="eltOnly"
    model="closed">
<element type="name"/>
<element type="argumentList" minOccurs="0" maxOc-
    curs="*"/>
</ElementType>
<ElementType  name="actionList"  content="eltOnly"
    model="closed">
<element   type="action"   minOccurs="0"   maxOc-
    curs="*"/>
</ElementType>
<ElementType    name="scpd"    content="eltOnly"
    model="closed">
<element type="serviceStateTable"/>
<element type="actionList"/>
</ElementType>
</Schema>
``` attribute
  References an attribute in the new, derived language for the purposes of declaring in which elements it may appear. Like any XML element, the AttributeType element may have attributes of its own. Using the required attribute within this element indicates whether the attribute is present; optional attributes have required=no.

AttributeType
  Defines an attribute in the new, derived language. Like any XML element, the AttributeType element may have attributes of its own. Using the name attribute within this element defines the name of the attribute as it will be used in the derived language.

element
  References an element for the purposes of declaring nesting. minOccurs attribute defines minimum number of times the element occurs; default is minOccurs=1; optional elements have minOccurs=0. maxOccurs attribute defines maximum number of times the element occurs; default is maxOccurs=1; elements that can appear one or more times have maxOccurs=*.

ElementType
  Defines an element in the new, derived language. name attribute defines element name. dt:type attribute defines the data type for the value of element in the new, derived language. model attribute indicates whether elements in the new, derived language can contain elements not explicitly specified here; when only previously specific elements may be used, model=closed. content attribute indicates what content may contain; elements that contain only other elements have content=eltOnly; elements that contain only strings have content=textOnly.

group
  Organizes content into a group to specify a sequence. minOccurs attribute defines minimum number of times the group occurs. maxOccurs attribute defines maximum number of times the group occurs. order attribute constrains the sequence of elements; when at most one element is allowed, order=one.

3.4 Control: Augmenting the UPnP Template Language

As is the case with describing devices, some properties of services are difficult to capture in the XML Schema formalism. For services in particular, it is useful to describe the effect actions have on state variables. This procedural information is awkward to describe in a declarative language like XML, so below is a recommended vocabulary for UPnP Forum working committees to use when defining service actions or for UPnP vendors to use when they wish to document the effects of extra actions.

ASSIGN (v, a)
  Variable v becomes the value of argument a, i.e., v=a. v and a is the same data type. <why both this and SET?>

DECREMENT (v)
  Equivalent to INCREMENT (v) with allowedValueRange step treated as −step.

DECREMENT_BOUNDED (v)
  Equivalent to INCREMENT_BOUNDED (v) with allowedValueRange step treated as −step.

DECREMENT_WRAP (v)
  Equivalent to INCREMENT_WRAP (v) with allowedValueRange step treated as −step.

INCREMENT (v)
  Variable v becomes the value of v plus allowedValueRange step, i.e., v=v+step. Equivalent to DECREMENT (v) with allowedValueRange step treated as −step. v is either i4 or r8 and has an allowedValueRange definition.

INCREMENT_BOUNDED (v)
  Variable v becomes the value of v plus allowedValueRange step, i.e., v=v+step.
  If step is greater than 0 and if v plus step would be greater than allowedValueRange maximum, then v becomes maximum.
  If step is less than 0 and if v plus step would be less than allowedValueRange minimum, then v becomes minimum.
  Equivalent to DECREMENT_BOUNDED (v) with allowedValueRange step treated as—step. v is either i4 or r8 and has an allowedValueRange definition.

INCREMENT_WRAP (v, c)
  Variable v becomes the value of v plus allowedValueRange step, i.e., v=v+step.
  If step is greater than 0, and if v plus step would be greater than allowedValueRange maximum, then v becomes minimum plus step minus 1, i.e., v=minimum+step−1; if step is 1, this simplifies to v=minimum.
  If step is less than 0 and if v plus step would be less than allowedValueRange minimum, then v becomes maximum plus step plus 1, i.e., v=maximum+step+1; if step is −1, this simplifies to v=maximum.

Equivalent to DECREMENT_WRAP (v) with allowed-
ValueRange step treated as −step. v is either i4 or r8 and
has an allowedValueRange definition.

NEXT_STRING_BOUNDED (v)
Variable v becomes the next allowedValue after the current value of v. If v was already the last allowedValue, then v does not change. v is a string data type and has an allowedValueList definition.

NEXT_STRING_WRAP (v)
Variable v becomes the next allowedValue after the current value of v. If v was already the last allowedValue, then v becomes the first allowedValue. v is a string data type and has an allowedValueList definition.

PREV_STRING_BOUNDED (v)
Variable v becomes the previous allowedValue before the current value of v. If v was already the first allowedValue, then v does not change. v is a string data type and has an allowedValueList definition.

PREV_STRING_WRAP (v)
Variable v becomes the previous allowedValue before the current value of v. If v was already the first allowedValue, then v becomes the last allowedValue. v is a string data type and has an allowedValueList definition.

SET (v, c)
Variable v becomes the value of constant c, i.e., v=c. v and c is the same data type.

TOGGLE (v)
Variable v becomes the boolean negation of the value of v, i.e., v=NOT v. v is boolean.

3.5 Control: Retrieving a Service Description

As explained above, after a control point has discovered a device and has retrieved a device description, it may need to learn more about the services provided by the device. Nearly identical to the process for retrieving a device description, a control point may retrieve a service description using a description URL in the description (vs. discovery) message. (For details on retrieving a service description, please consult the corresponding discussion on retrieving a device description in the section on Description.)

3.6 Control: Sending an Action

To send actions and receive confirmation, control points (and devices) use the following subset of the overall UPnP protocol stack. (The overall UPnP protocol stack is listed at the beginning of this document.)

At the highest layer, control and query messages contain vendor-specific information, e.g., URL for control and argument values. Moving down the stack, vendor content is supplemented by information from a UPnP Forum working committee, e.g., service types, action names, argument names. Messages from the layers above are hosted in UPnP-specific protocols, defined in this document. In turn, the above messages are formatted using a Simple Object Access Protocol (SOAP) header and body elements, and the messages are delivered via HTTP over TCP over IP. For reference, colors in [square brackets] above indicate which protocol defines specific header elements in the subscription messages listed below.

3.6.1 Control: Messages: Request

The Simple Object Access Protocol (SOAP) defines the use of XML and HTTP for remote procedure calls. UPnP uses SOAP to deliver control messages to devices and return acknowledgement or failure codes back to control points.

SOAP defines additional HTTP headers, and to ensure that these are not confused with other HTTP extensions, SOAP follows the HTTP Extension Framework and specifies a SOAP-unique URI in the MAN header and prefixes the HTTP method with M-. In this case, the method is M-POST. Using M-POST requires the HTTP server to find and understand the SOAP-unique URI and SOAP-specific headers.

To provide firewalls and proxies greater administrative flexibility, SOAP specifies that requests first be attempted without the MAN header or M-prefix. If the request is rejected with a response of "405 Method Not Allowed", then a second request is sent using the MAN header and M-prefix. If that request is rejected with a response of "501 Not Implemented" or "510 Not Extended", the request fails. (Other HTTP responses is processed according to the HTTP specification.)

Below is a listing of a control message sent using the POST method (without the MAN header) followed by an explanation of the headers and body. This is immediately followed by a listing of a control message sent using the M-POST method and MAN header.

As explained above, a control message may include an key to indicate whether the control point has received the most recent message. To include a key, the body of a control message includes two SOAP headers, one for the event subscription UUID, and one for the key itself. Both are illustrated in the listings below. The section on Eventing explains the contents of the two headers in detail.

To send a requested action to a device, a control point sends a request with method POST in the following format. Values in italics are placeholders for actual values.

POST path of control URL HTTP/1.1
HOST: host of control URL:port of control URL
CONTENT-LENGTH: bytes in body
CONTENT-TYPE: text/xml
SOAPMETHODNAME: urn:schemas-upnp-org:service:
    serviceType:serviceVersion#actionName
<SOAP:Envelope xmlns:SOAP="urn:schemas-xmlsoap-
    org:soap.v1">
<SOAP:Header>
<s:SID xmlns:s="urn:schemas-upnp-org:control:1:
    0">subscriber UUID</s:SID>
<s:SequenceNumber>last event number</s:Sequence-
    Number>
</SOAP:Header>
<SOAP:Body>
<m:actionName xmlns:m="urn:schemas-upnp-org:ser-
    vice:serviceType:serviceVersion">
<argumentName>argument value</argumentName>
</m:actionName>
</SOAP:Body>
</SOAP:Envelope>

Listed below are details for the request line, headers, and body elements appearing in the listing above. All header values and element names are case sensitive; values are not case sensitive except where noted. Except where noted, the order of elements is insignificant.

Request Line

POST
Method defined by HTTP.

Path Control URL
Path component of URL for control for this service (controlURL sub element of service element of device description). Single, relative URL.

HTTP/1.1
HTTP version.

Headers

HOST
Domain name or IP address and optional port components of URL for control for this service (controlURL sub element of service element of device description). If the port is empty or not given, port 80 is assumed.

ACCEPT-LANGUAGE
(No ACCEPT-LANGUAGE header is used in control messages.)

CONTENT-LENGTH
Length of body in bytes. Integer.

CONTENT-TYPE
Is text/xlm.

MAN
(No MAN header in request with method POST.)

SOAPMETHODNAME
Starts with urn:schemas-upnp-org:service:, followed by UPnP standard service type, colon, service version, hash mark, and name of action to be invoked. If used in a request with method M-POST, header name is qualified with name space defined in MAN header. Single URI.

Body

SOAP:Envelope
xmlns namespace attribute is "urn:schemas-xmlsoap-org:soap.v1". All SOAP-defined elements is qualified with this namespace. Contains the following sub elements:

SOAP:Header
Is qualified with SOAP namespace. Contains the following sub elements:

SID
Subscription Identifier. Unique identifier for this event subscription. (cf. section on Eventing.) xmlns namespace attribute is urn:schemas-upnp-org:control:1:0. Single URI.

SequenceNumber
Most recent event key received by control point from service. (cf. section on Eventing.)
Is qualified with SID namespace. Single integer.

SOAP:Body
Is qualified with SOAP namespace. Contains the following sub element:

actionName
Name of element is name of action control point is requesting service to perform. xmlns namespace attribute starts with urn:schemas-upnp-org:service:, followed by UPnP standard service type, colon, and service version. Contains the following, ordered sub element(s):

argumentName
Repeat once for each argument. Value to be passed to action. (Element name not qualified by a namespace; element nesting context is sufficient.) Single data type as defined by UPnP Service Template.

If a request with POST is rejected with a response of "405 Method Not Allowed", then a control point sends a second request with method M-POST and MAN in the following format. Values in italics are placeholders for actual values.
M-POST path of control URL HTTP/1.1
HOST: host of control URL:port of control URL
CONTENT-LENGTH: bytes in body
CONTENT-TYPE: text/xml
MAN: "urn:schemas-xmlsoap-org:soap.v1"; ns=01
01-SOAPMETHODNAME: urn:schemas-upnp-org:service:serviceType:serviceVersion#actionName (Message body for request with method M-POST is the same as body for request with method POST. See above.)

Request Line

M-POST
Method defined by HTTP Extension Framework.

Path of Control URL
Path component of URL for control for this service (controlURL sub element of service element of device description). Single, relative URL.

HTTP/1.1
HTTP version.

Headers

HOST
Domain name or IP address and optional port components of URL for control for this service (controlURL sub element of service element of device description). If the port is empty or not given, port 80 is assumed.

ACCEPT-LANGUAGE
(No ACCEPT-LANGUAGE header is used in control messages.)

CONTENT-LENGTH
Length of body in bytes. Integer.

CONTENT-TYPE
Is text/xlm.

MAN
Is "urn:schemas-xmlsoap-org:soap.v1".ns directive defines namespace (e.g., 01) for other SOAP headers (e.g., SOAPMETHODNAME).

SOAPMETHODNAME
Starts with urn:schemas-upnp-org:service:, followed by UPnP standard service type, colon, service version, hash mark, and name of action to be invoked. If used in a request with method M-POST, header name is qualified with name space defined in MAN header. Single URI.

3.6.2 Control: Messages: Response

If a service accepts an action request from a control point, the service sends a response in the following format. Values in italics are placeholders for actual values.
HTTP/1.1 200 OK
CONTENT-LENGTH: bytes in body
CONTENT-TYPE: text/xml
DATE: when response was generated

EXT:

SERVER: OS/version, UPnP/1.0, product/version
```
<SOAP:Envelope xmlns:SOAP="urn:schemas-xmlsoap-
   org:soap.v1">
<SOAP:Body>
<m:actionNameResponse xmlns:m="urn:schemas-upnp-
   org:service:sType:sVers">
<return>return code</return>
<m:actionNameResponse>
</SOAP:Body>
</SOAP:Envelope>
```

Listed below are details for each of the headers and body elements appearing in the listing above. All header values and element names are case sensitive; values are not case sensitive except where noted. Except where noted, the order of elements is insignificant.

Headers

ACCEPT-LANGUAGE
   (No ACCEPT-LANGUAGE header is used in control messages.)

CONTENT-LENGTH
   Length of body in bytes. Integer.

CONTENT-TYPE
   Is text/xlm.

DATE
   When response was generated. RFC 1123 date.

EXT
   Confirms that the MAN header was understood. (Header only; no value.)

SERVER
   Concatenation of OS name, forward slash, OS version, comma, UPnP/1.0, comma, product name, forward slash, and product version. String.

Body

SOAP:Envelope
   xmlns namespace attribute is "urn:schemas-xmlsoap-org: soap.v1". All SOAP-defined elements is qualified with this namespace. Contains the following sub elements:

SOAP:Header
   (No SOAP:Header element in response to control message.)

SOAP:Body
   Is qualified with SOAP namespace. Contains the following sub element:

actionNameResponse
   Name of element is action name prepended to Response. xmlns namespace attribute starts with urn:schemas-upnp-org:service:, followed by UPnP standard service type, colon, and service version. Contains the following sub element:

return
   (Element name not qualified by a namespace; element nesting context is sufficient.) Has one of the following values:

0
   Service accepts action request and will attempt to perform it. Legal only from services without eventing.

1
   Event key is valid. Service accepts action request and will attempt to perform it. Legal only from services with eventing.

If the service does not accept an action request from a control point, the service sends a response in the following format. Values in italics are placeholders for actual values.
```
HTTP/1.1 200 OK
CONTENT-LENGTH: bytes in body
CONTENT-TYPE: text/xml
DATE: when response was generated
EXT:
SERVER: OS/version, UPnP/1.0, product/version
<SOAP:Envelope xmlns:SOAP="urn: schemas-xmlsoap-
   org:soap.v1">
<SOAP:Body>
<SOAP:fault>
<faultcode>code for request error</faultcode>
<faultstring>string describing request error</faultstring>
<runcode>did request get to device?</runcode>
</SOAP:fault>
</SOAP:Body>
</SOAP:Envelope>
```

(Headers for a response when a service does not accept an action request are the same as headers for a response when a service does. See above.)

Body

SOAP:Envelope
   xmlns namespace attribute is "urn:schemas-xmlsoap-org: soap.v1". All SOAP-defined elements is qualified with this namespace. Contains the following sub elements:

SOAP:Header
   (No Header element in response to control message.)

SOAP:Body
   Is qualified with SOAP namespace. Contains the following sub element:

SOAP:fault
   Why the service did not accept the action request. Contains the following sub elements:

faultcode
   Code identifying why service did not accept the action request. Has one of the following values:

301
   Invalid action name, i.e., no action by that name at this service.

302
   Invalid arguments. Could be any of the following: not enough arguments, too many arguments, no argument by that name, one or more arguments are of the wrong data type.

303
   Out of synchronization. Action request accompanied by invalid event key.

401
   Action request failed. May be returned if current state of service prevents performing action. (No guarantee that service will return a fault in such situations.)

faultstring
    Short description for end user. Defined by a UPnP Forum working committee or delegated to UPnP vendor. String. Recommend<256 characters.
runcode
    Whether or not the request reached the service. Could be relevant if another system is operating as a proxy, bridge, or gateway for device and it's services. Is one of the following values:
0
    Maybe
1
    No
2
    Yes 3.7 Control: Query for Variable In addition to sending requested actions to a service, control points may also poll the service for the value of a state variable by sending a query message. A query message may query only one state variable; multiple query messages is sent to query multiple state variables.

3.7.1 Control: Messages: Query

To query for the value of a state variable, a control point sends a request in the following format. Values in italics are placeholders for actual values.
    POST path of control URL HTTP/1.1
    HOST: host of control URL:port of control URL
    CONTENT-LENGTH: bytes in body
    CONTENT-TYPE: text/xml
    SOAPMETHODNAME: urn:schemas-upnp-org:control:1:0#QueryStateVariable
    <SOAP:Envelope xmlns:SOAP="urn:schemas-xmlsoap-org:soap.v1">
    <SOAP:Body>
    <m:QueryStateVariable xmlns:m="urn:schemas-upnp-org:control:1:0">
    <m:varName>variableName</m:varName>
    </m:QueryStateVariable>
    </SOAP:Body>
    </SOAP:Envelope>

Listed below are details for the request line, headers, and body elements appearing in the listing above. All header values and element names are case sensitive; values are not case sensitive except where noted. Except where noted, the order of elements is insignificant.

Request Line

POST
    Method defined by HTTP.

Path of Control URL
    Path component of URL for control for this service (controlURL sub element of service element of device description). Single, relative URL.

HTTP/1.1
    HTTP version.

Headers

HOST
    Domain name or IP address and optional port components of URL for control for this service (controlURL sub element of service element of device description). If the port is empty or not given, port 80 is assumed.

ACCEPT-LANGUAGE
    (No ACCEPT-LANGUAGE header is used in control messages.)

CONTENT-LENGTH
    Length of body in bytes. Integer.

CONTENT-TYPE
    Is text/xlm.

MAN
    (No MAN header in request with method POST.)

SOAPMETHODNAME
    Is urn:schemas-upnp-org:control:1:0#QueryStateVariable. If used in a request with method M-POST, header name is qualified with name space defined in MAN header. Single URI.

Body
    SOAP:Envelope
        xmlns namespace attribute is "urn:schemas-xmlsoap-org:soap.v1". All SOAP-defined elements is qualified with this namespace. Contains the following sub elements:
    SOAP:Header
        (No SOAP:Header is used to query the value of a variable.)
    SOAP:Body
        Is qualified with SOAP namespace. Contains the following sub element:
    QueryStateVariable
        Action name. xmlns namespace attribute is urn:schemas-upnp-org:control:1:0. Contains the following, ordered sub element(s):
    varName
        Variable name. Is qualified by QueryStateVariable namespace. Values is name of state variable to be queried. String.

If a request with POST is rejected with a response of "405 Method Not Allowed", then a control point sends a second request with method M-POST and MAN as explained above.

3.7.2 Control: Messages: Response

To answer a query for the value of a state variable, the service sends a response in the following format. Values in italics are placeholders for actual vaules.
    HTTP/1.1 200 OK
    CONTENT-LENGTH: bytes in body
    CONTENT-TYPE: text/xml
    DATE: when response was generated
    EXT:
    SERVER: OS/version, UPnP/1.0, product/version
    <SOAP:Envelope xmlns:SOAP="urn:schemas-xmlsoap-org:soap.v1">
    <SOAP:Body>
    <m:QueryStateVariableResponse xmlns:m="urn:schemas-upnp-org:control:1:0">
    <return>variable value</return>
    </m:QueryStateVariableResponse>
    </SOAP:Body>
    </SOAP:Envelope>

Listed below are details for each of the headers and body elements appearing in the listing above. All header values and element names are case sensitive; values are not case sensitive except where noted. Except where noted, the order of elements is insignificant.

Headers

ACCEPT-LANGUAGE
(No ACCEPT-LANGUAGE header is used in control messages.)

CONTENT-LENGTH
Length of body in bytes. Integer.

CONTENT-TYPE
Is text/xlm.

DATE
When response was generated. RFC 1123 date.

EXT
Confirms that the MAN header was understood. (Header only; no value.)

SERVER
Concatenation of OS name, forward slash, OS version, comma, UPnP/1.0, comma, product name, forward slash, and product version. String.

Body

SOAP:Envelope
xmlns namespace attribute is "urn:schemas-xmlsoap-org:soap.v1". All SOAP-defined elements is qualified with this namespace. Contains the following sub elements:

SOAP:Header
(No SOAP:Header is used to query the value of a variable.)

SOAP:Body
Is qualified with SOAP namespace. Contains the following sub element:

QueryStateVariableResponse
xmlns namespace attribute is urn:schemas-upnp-org:control:1:0. Contains the following sub element:

return
(Element name not qualified by a namespace; element nesting context is sufficient.) Value is current value of the state variable specified in varName element in request.

If the service cannot provide a value for the request, then the service sends a response in the following format. Values in italics are placeholders for actual values.
  HTTP/1.1 200 OK
  CONTENT-LENGTH: bytes in body
  CONTENT-TYPE: text/xml
  DATE: when response was generated
  EXT:
  SERVER: OS/version, UPnP/1.0, product/version
  <SOAP:Envelope xmlns:SOAP="urn:schemas-xmlsoap-org:soap.v1">
  <SOAP:Body>
  <SOAP:fault>
  <faultcode>code for request error</faultcode>
  <faultstring>string describing request error</faultstring>
  <runcode>did request get to device?</runcode>
  </SOAP:fault>
  </SOAP:Body>
  </SOAP:Envelope>

(Headers for a response when a service cannot provide a value are the same as headers for a response when a service does. See above.)

Body

SOAP:Envelope
xmlns namespace attribute is "urn:schemas-xmlsoap-org:soap.v1". All SOAP-defined elements is qualified with this namespace. Contains the following sub elements:

SOAP:Header
(No Header element in response to control message.)

SOAP:Body
Is qualified with SOAP namespace. Contains the following sub element:

SOAP:fault
Why the service did not accept the action request. Contains the following sub elements:

faultcode
Code identifying why service did not accept the action request. Has one of the following values:

304
Invalid variable name, i.e., no state variable by that name at this service.

faultstring
Short description for end user. Defined by a UPnP Forum working committee or delegated to UPnP vendor. String. Recommend<256 characters.

runcode
Whether or not the request reached the service. Could be relevant if another system is operating as a proxy, bridge, or gateway for device and it's services. Is one of the following values:

| | |
|---|---|
| 0 | Maybe |
| 1 | No |
| 2 | Yes |

4. Eventing

Eventing is Step 4 in UPnP networking. Eventing comes after discovery (Step 1) where control points find interesting device(s), and after description (Step 2) where control points learn about device capabilities. Eventing is intimately linked with control (Step 3) where control points send actions to devices. Through even tin g, control points listen to state changes in device(s). Control and eventing are complementary to presentation (Step 5) where control points display a user interface provided by device(s).

After a control point has (1) discovered a device and (2) retrieved a description of the device, the control point has the bare essentials for eventing. As is the case with control, to learn more about the device's services, the control point retrieves a detailed UPnP description for each service of interest.

As the section on Control explains, a UPnP description for a service includes a list of actions the service responds to and a list of variables that model the state of the service at run time. If one or more of these state variables are evented, then the service publishes updates when these variables change, and a control point may subscribe to receive this information. To subscribe to eventing, a control point sends a subscription message. If the subscription is accepted, the service responds with a duration for the subscription. To keep the subscription active, a control point renews its subscription before the subscription expires. When a control point no longer needs eventing from a particular service, the control point cancels its subscription. This section explains subscription, renewal, and cancellation messages in detail below.

The service publishes changes to state variables by sending event messages. Event messages contain the names of one of more state variables and the current value of those variables, expressed in XML. A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all evented variables (not just some), and event messages are sent no matter why the state variable changed (either in response to a requested action or because the state the service is modeling changed). This section explains the format of event messages in detail below.

Some state variables may change value too rapidly for eventing to be useful. One alternative is to filter, or moderate, the number of event messages sent due to changes in a variable's value. Some state variables may contain values too large for eventing to be useful; for this, or other reasons, a service may designate one or more state variables as non evented and never send event messages to a subscriber. To determine the current value for such non-evented variables, control points poll the service explicitly. This section explains how variable eventing is described within a service description. The section on Control explains how to poll a service for a variable value.

To prevent a race condition between events headed for control points and requested actions headed for a service, control messages may include a key. With each new event message a service generates, the service increments the key, and includes that key in the event message. When a control point sends a control message, it may choose to include a key. If a control message includes a key, the service checks to see if the key is current, i.e., if no events have been sent since this key was issued. If the key is current (or if there was no key in the control message), then the service acknowledges the action request. If the key is not current, the service fails the action request. This section explains details of event keys and the synchronization between control and event messages.

To send and receive subscription and event messages, control points and services use the following subset of the overall UPnP protocol stack. (The overall UPnP protocol stack is listed at the beginning of this document.)

At the highest layer, subscription and event messages contain vendor-specific information like URLs for subscription and duration of subscriptions or specific variable values. Moving down the stack, vendor content is supplemented by information from a UPnP Forum working committee, like service identifiers or variable names. Messages from the layers above are hosted in UPnP-specific protocols, defined in this document. In turn, the above messages are formatted using General Event Notification Architecture (GENA) headers, and the messages are delivered via HTTP over TCP over IP. For reference, colors in [square brackets] above indicate which protocol defines specific header elements in the subscription messages listed below.

The remainder of this section first explains subscription, including details of subscription messages, renewal messages, and cancellation messages. Second, it explains in detail how event messages are formatted and sent to control points, the initial event message, and how event keys synchronize control and eventing. Finally, it explains the UPnP Template Language as it pertains to eventing.

4.1 Eventing: Subscription

A service has eventing if and only if one or more of the state variables are evented. If a service has eventing, it publishes event messages to interested control points, or subscribers. The service maintains a list of subscribers, keeping for each subscriber the following information.

unique subscription identifier
Is unique over the lifetime of the subscription, however long or short that may be. Generated by service in response to subscription message. Recommend universally-unique identifiers to ensure uniqueness. Single URI.

delivery URL for event messages
Provided by control point in subscription message. Single URL.

event key
Key is 0 for initial event message. Key is sequentially numbered for each subsequent event message; control points can verify that no event messages have been lost if the control point has received sequentially numbered event keys. Single integer.

subscription duration
Amount of time, or duration until subscription expires. Single integer or keyword infinite.

The service may wish to persist subscriptions across power failures. While control points can recover from complete network failure, if the problem is brief and localized to the device, reusing stored subscriptions may speed recovery.

The list of subscribers is updated via subscription, renewal, and cancellation messages explained below and event messages explained later in this section.

To subscribe to eventing for a service, a control point sends a subscription message containing a URL for the publisher, a service identifier for the publisher, and a delivery URL for event messages. The subscription message may also include a requested duration for the subscription. The URL and service identifier for the publisher come from a description message. As the section on Description explains, a description message contains a device description. A device description contains (among other things), for each service, an eventing URL (in the eventSubURL element) and a service identifier (in the serviceId element); these correspond to the URL and service identifier for the publisher, respectively. The subscription message is a request to receive all event messages. No mechanism is provided to subscribe to event messages on a variable-by-variable basis. A subscriber is sent all event messages from the service. This is one factor to be considered when designing a service.

If the subscription is accepted, the service responds with unique identifier for this subscription and a duration for this subscription. A duration is chosen that matches assumptions about how frequently devices are removed from the network; if devices are removed every few minutes, then the duration is similarly short, allowing a service to rapidly deprecate any expired subscribers; if devices are semi-permanent, then the duration is very long, minimizing the processing and traffic associated with renewing subscriptions. As soon as possible after the subscription is accepted, the service also sends the first, or initial event message to the subscriber. This message includes the names and current values for all evented variables. (The data type and range for each variable is described in a service description. The section on Control explains this in more detail.)

To keep the subscription active, a control point renews its subscription before the subscription expires by sending a renewal message. The renewal message is send to the same URL as the subscription message, but the renewal message does not include a delivery URL for event messages; instead the renewal message includes the subscription identifier. The response for a renewal message is the same as one for a subscription message.

If a subscription expires, the subscription identifier becomes invalid, and the service stops sending event messages to the control point and can clean up its list of subscribers. If the control point tries to send any message other than a subscription message, the service will reject the message because the subscription identifier is invalid. To send control messages to the service, the control point sends a subscription message and get a new subscription identifier.

When a control point no longer needs eventing from a particular service, the control point cancels its subscription. Canceling a subscription generally reduces service, control point, and network load. If a control point is removed abruptly from the network, it might be impossible to send a cancellation message. As a fallback, the subscription will eventually expire on its own unless renewed.

Below is an explanation of the specific format of requests, responses, and errors for subscription, renewal, and cancellation messages.

4.1.1 Eventing: Subscribing: SUBSCRIBE with NT and CALLBACK

For each service in a device, a description message contains an eventing URL (eventSubURL sub element of service element in the device description) and the UPnP service identifier (serviceId sub element in service element in device description). To subscribe to eventing for a particular service, a subscription message is sent to that service's eventing URL. The message contains that service's identifier as well as a delivery URL for event messages. A subscription message may also include a requested subscription duration. To subscribe to eventing for a service, a control point sends a request with method SUBSCRIBE and NT and CALLBACK headers in the following format. Values in italics are placeholders for actual values.

SUBSCRIBE publisher path HTTP/1.1
HOST: publisher host:publisher port
CALLBACK: <delivery URL>
NT: upnp:event
TIMEOUT: Second-requested subscription duration (No body for request with method SUBSCRIBE.)

Listed below are details for the request line and headers appearing in the listing above. All header values are case sensitive except where noted.

Request line
SUBSCRIBE
  Method defined by GENA.
publisher path
  Path component of eventing URL (eventSubURL sub element in service element in device description). Single, relative URL.
HTTP/1.1
  HTTP version.
Headers
HOST
  Domain name or IP address and optional port components of eventing URL (eventSubURL sub element in service element in device description). If the port is missing or empty, port 80 is assumed.
CALLBACK
  Location to send event messages to. Defined by UPnP vendor. If there is more than 1 URL, when the service sends events, it will try these URLs in order until one succeeds. One or more URLs separated by angle brackets.
NT
  Notification Type. Is upnp:event.
SID
  (No SID header is used to subscribe.)
TIMEOUT Requested duration until subscription expires, either number of seconds or infinite.
Recommendation by a UPnP Forum working committee. Defined by UPnP vendor.
Keyword Second—followed by an integer (no space) or keyword infinite.

To accept the subscription, the service assigns a unique identifier for the subscription, assigns a duration for the subscription, and sends an initial event message (explained in detail later in this section). To accept a subscription request, a service sends a response in the following format. Values in italics are placeholders for actual values.

HTTP/1.1 200 OK
DATE: when response was generated
SERVER: OS/version, UPnP/1.0, product/version
SID: uuid:subscription UUID
TIMEOUT: Second-actual subscription duration (No body for response to a request with method SUBSCRIBE.)

Listed below are details for headers appearing in the listing above. All header values are case sensitive except where noted.

Headers
DATE
  When response was generatd. RFC 1123 date.
SERVER
  Concatenation of OS name, forward slash, OS version, comma, UPnP/1.0, comma, product name, forward slash, and product version. String.
SID
  Subscription identifier. Is universally-unique. Begins with uuid:.
  Defined by UPnP vendor. Single URI.
TIMEOUT Actual duration until subscription expires, either number of seconds or infinite. Recommendation by a UPnP Forum working committee. Defined by UPnP vendor. Is >1800 seconds (30 minutes). Keyword Second— followed by an integer (no space) or keyword infinite.

If a service cannot accept another event subscriber, or if there is an error with the subscription request, the service sends a response with one of the following errors.

Errors

Incompatible Headers
   400 Bad Request. If SID header and one of NT or CALLBACK headers are present, the service responds with HTTP error 400 Bad Request.

Missing or invalid CALLBACK
   412 Precondition Failed. If CALLBACK header is missing or does not contain a valid HTTP URL, the service responds with HTTP error 412 Precondition Failed.

Unable to accept subscription
   5xx. If a service is not able to accept a subscription, it responds with a HTTP 500-series error code.

Other errors may be returned by layers in the protocol stack below UPnP. Consult documentation on those protocols for details.

4.1.2 Eventing: Renewing a Subscription: SUBSCRIBE with SID

To renew a subscription to eventing for a particular service, a renewal messages is sent to that service's eventing URL. However, unlike an initial subscription message, a renewal message does not contain either the service's identifier nor a delivery URL for event messages. Instead, the message contains the subscription identifier assigned by the service, providing an unambiguous reference to the subscription to be renewed. Like a subscription message, a renewal message may also include a requested subscription duration.

The renewal message uses the same method as the subscription message, but the two messages use a disjoint set of headers; renewal uses SID and subscription uses NT and CALLBACK. A message that includes SID and either of NT or CALLBACK headers is an error.

To renew a subscription to eventing for a service, a control point sends a request with method SUBSCRIBE and SID header in the following format. Values in italics are placeholders for actual values.

SUBSCRIBE publisher path HTTP/1.1
   HOST: publisher host:publisher port
   SID: uuid:subscription UUID
   TIMEOUT: Second-requested subscription duration (No body for method with request SUBSCRIBE.)

Listed below are details for the request line and headers appearing in the listing above. All header values are case sensitive except where noted.

---

Request line
SUBSCRIBE
  Method defined by GENA.
publisher path
  Path component of eventing URL (eventSubURL sub element in service element in device description). Single, relative URL.
HTTP/1.1
  HTTP version.
Headers
HOST
  Domain name or IP address and optional port components of eventing URL (eventSubURL sub element in service element in device description). If the port is missing or empty, port 80 is assumed.

---
-continued

CALLBACK
  (No CALLBACK header is used to renew an event subscription.)
NT
  (No NT header is used to renew an event subscription.)
SID

---

Subscription identifier. Is the subscription identifier assigned by service in response to subscription request. Is universally-unique. Begins with uuid:. Defined by UPnP vendor. Single URI.

TIMEOUT
  Requested duration until subscription expires, either number of seconds or infinite.
  Recommendation by a UPnP Forum working committee. Defined by UPnP vendor.
  Keyword Second—followed by an integer (no space) or keyword infinite.

To accept a renewal, the service reassigns a duration for the subscription. (No initial event message. See below.) To accept a renewal, a service sends a response in the same format as a response to a request for a new subscription.

If a service cannot accept the renewal, or if there is an error with the renewal request, the service sends a response with one of the following errors.

Errors

Incompatible headers
   400 Bad Request. If SID header and one of NT or CALLBACK headers are present, the service responds with HTTP error 400 Bad Request.

Invalid SID
   404 Not Found. If a SID does not correspond to a known, un-expired subscription, the service responds with HTTP error 404 Not Found.

Missing SID
   412 Precondition Failed. If the SID header is missing or empty, the service responds with HTTP error 412 Precondition Failed.

Unable to accept renewal
   5xx. If the service is not able to accept a renewal, it responds with a HTTP 500-series error code.

Other errors may be returned by layers in the protocol stack below UPnP. Consult documentation on those protocols for details.

4.1.3 Eventing: Canceling a Subscription: UNSUBSCRIBE

When eventing is no longer needed from a particular service, a cancellation message is sent to that service's eventing URL. The message contains the subscription identifier. Canceling a subscription generally reduces service, control point, and network load. If a control point is removed abruptly from the network, it might be impossible to send a cancellation message. As a fallback, the subscription will eventually expire on its own unless renewed.

To cancel a subscription to eventing for a service, a control point sends a request with method UNSUBSCRIBE in the following format. Values in italics are placeholders for actual values.
     UNSUBSCRIBE publisher path HTTP/1.1
     HOST: publisher host:publisher port
     SID: uuid:subscription UUID (No body for request with method UNSUBSCRIBE.)

Listed below are details for the request line and headers appearing in the listing above. All header values are case sensitive except where noted.

Request Line

UNSUBSCRIBE
   Method defined by GENA.

Publisher Path
   Path component of eventing URL (eventSubURL sub element in service element in device description). Single, relative URL.

HTTP/1.1
   HTTP version.

Headers

HOST
   Domain name or IP address and optional port components of eventing URL (eventSubURL sub element in service element in device description). If the port is missing or empty, port 80 is assumed.

CALLBACK
   (No CALLBACK header is used to cancel an event subscription.)

NT
   (No NT header is used to cancel an event subscription.)

SID
   Subscription identifier. Is the subscription identifier assigned by service in response to subscription request. Is universally-unique. Begins with uuid:. Defined by UPnP vendor. Single URI.

TIMEOUT
   (No TIMEOUT header is used to cancel an event subscription.)

To cancel a subscription, a service sends a response in the following format. Values in italics are placeholders for actual values.
     HTTP/1.1 200 OK If there is an error with the cancellation request, the service sends a response with one of the following errors.

Errors

Incompatible headers
   400 Bad Request. If SID header and one of NT or CALLBACK headers are present, the service responds with HTTP error 400 Bad Request.

Invalid SID
   404 Not Found. If a SID does not correspond to a known, un-expired subscription, the service responds with HTTP error 404 Not Found.

Missing SID
   412 Precondition Failed. If the SID header is missing or empty, the service responds with HTTP error 412 Precondition Failed.

Other errors may be returned by layers in the protocol stack below UPnP. Consult documentation on those protocols for details.

4.2 Eventing: Event Messages

A service publishes changes to its state variables by sending event messages. These messages contain the names of one or more state variables and the current value of those variables. Event messages is sent as soon as possible to get accurate information about the service to control points and allow control points to display a responsive user interface. If the value of more than one variable is changing at the same time, the service bundles these changes into a single event message to reduce processing and network traffic.

As explained above, an initial event message is sent when a control point first subscribes; this event message contains the names and values for all evented variables and allows the subscriber to initialize its model of the state of the service. This message is sent as soon as possible after the service accepts a subscription.

Event messages are tagged with an event key to detect a race condition between event messages headed for control points and control messages headed for a device. A separate event key is maintained by the service for each subscription to facilitate error detection (as explained below). The event key for a subscription is initialized to 0 when the service sends the initial event message. For each subsequent event message, the service increments the event key for a subscription, and includes that updated key in the event message. Any implementation of event keys handles overflow and wrap the event key back to 1 (not 0). Control point also handles this special case when the next event key is not an increment of the previous key.

If there is no response from a control point to the event message, the service continues to send event messages to the control point until the subscription expires.

To repair an event subscription, e.g., if a control point has missed one or more event messages, a control point unsubscribes and re-subscribes. By doing so, the control point will get a new subscription identifier, a new initial event message, and a new event key. With these, the control point can resume sending successful control messages to the service.

4.2.1 Eventing: Event Messages: NOTIFY

To send an event message, a service sends a request with method NOTIFY in the following format. Values in italics below are placeholders for actual values.
     NOTIFY delivery path HTTP/1.1
     HOST: delivery host:delivery port
     CONTENT-TYPE: text/xml
     CONTENT-LENGTH: bytes in body
     NT: upnp:event
     NTS: upnp:propchange
     SID: uuid:subscription UUID
     SEQ: event key
     <e:propertyset xmlns:e="urn:schemas-upnp-org:event:1: 0">
     <e:property>
     <variableName>new value<variableName>
     </e:property>
     Other variable names and values (if any) go here.
     </e:propertyset>

Listed below are details for the request line, headers, and body elements appearing in the listing above. All header values are case sensitive except where noted. All body elements and attributes are case sensitive; body values are not case sensitive except where noted. Except where noted, the order of elements is insignificant.

Request Line

NOTIFY
  Method defined by GENA.

Delivery Path
  Path component of delivery URL (CALLBACK header in subscription message). Destination for event message. Single, relative URL.

HTTP/1.1
  HTTP version.

Headers

HOST
  Domain name or IP address and optional port components of delivery URL (CALLBACK header in subscription message). If the port is missing or empty, port 80 is assumed.

CONTENT-LENGTH
  Length of body in bytes. Integer.

CONTENT-TYPE
  Is text/xml.

NT
  Notification Type. Is upnp:event.

NTS
  Notification Sub Type. Is upnp:propchange.

SID
  Subscription identifier. Is universally unique. Begins with uuid:. Defined by UPnP vendor. Single URI.

SEQ
  Event key. Is 0 for initial event message. Is incremented by 1 for each event message sent to a particular subscriber. Is 8 bytes. Single integer.

Body propertyset
  xmlns namespace attribute is urn:schemas-upnp-org: event:1:0. All sub elements is qualified with this namespace. Contains the following sub element.

property
  Repeat once for each variable name and value in the event message. Is qualified by propertyset namespace. Contains the following sub element.

variableName
  Element is name of a state variable that changed (name sub element of stateVariable element in service description). Is qualified by propertyset namespace. Values is the new value for this state variable. Single data type as specified by UPnP Service Template.

For future extensibility, when processing XML like the listing above, devices and control points ignore any unknown elements and any sub elements or content as specified by the Flexible XML Processing Profile (FXPP).

To acknowledge receipt of this event message, a control point responds in the following format.
  HTTP/1.1 200 OK (No body for a request with method NOTIFY.)

If there is an error with the event message, the control point responds with one of the following errors.

Errors

Missing SID
  412 Precondition Failed. If the SID header is missing or empty, the control point responds with HTTP error 412 Precondition Failed.

Invalid SID
  412 Precondition Failed. If a SID does not correspond to a known subscription, the control point responds with HTTP error 412 Precondition Failed. (Service terminates this SID when it receives this error response.)

Missing NT or NTS Header
  400 Bad Request. If the NT or NTS header is missing, the control point responds with HTTP error 400 Bad Request.

Invalid NT or NTS header
  (200 K. No error. If NT or NTS header is invalid, the control point ignores it and respond with HTTP 200 K.)

Other errors may be returned by layers in the protocol stack below UPnP. Consult documentation on those protocols for details.

4.3 Eventing: UPnP Template Language for Eventing

The UPnP Template Language defines well-formed templates for devices and services. To a lesser extent, it also provides a template for the body of event messages. The section on Description explains the UPnP Template Language as it pertains to devices, and the section on Control explains the UPnP Template Language as it pertains to services. As explained in those sections, the UPnP Template Language is written in XML syntax and is derived from XML Schema (Part 1: Structures, Part 2: Datatypes). Below is a listing of this language as it pertains to eventing. The elements it defines are used in event messages; they are colored green here, and they are colored green in the listing above. Below is where these elements are defined (though it is a minimal definition); above is where they are used.

Immediately following this is a brief explanation of the XML Schema elements, attributes, and values used. The reference to XML Schema at the end of this section has further details.

---

UPnP Template Language for eventing

```
<?xml version"1.0" ?>
<Schema name="urn:schemas-upnp-org:event:1:0"
xmlns="urn:schemas-microsoft-com:xml-data"
xmlns:dt="urn:schemas-microsoft-com:datatypes">
<ElementType name="propertyset" content="eltOnly">
<element type="property" maxOccurs="*" />
</ElementType>
<ElementType name="property" content="eltOnly" model="open" />
</Schema>
```

--- element
  References an element for the purposes of declaring nesting. maxOccurs attribute defines maximum number of times the element occurs; default is maxOccurs=1; elements that can appear one or more times have maxOccurs=*.

ElementType
> Defines an element in the new, derived language. name attribute defines element name. model attribute indicates whether elements in the new, derived language can contain elements not explicitly specified here; when only unspecified sub elements may be included, model=open. content attribute indicates what content may contain; elements that contain only other elements have content=eltOnly.

As explained in the section on Control, the UPnP Template Language for services also specifies a sendEvents attribute for a state variable. The default value for this attribute is yes. To denote that a state variable is evented, the value of this attribute is yes (or the attribute is omitted) in a service description; to denote that a state variable is non-evented, the value is no. Note that if all of a service's state variables are non-evented, the service has nothing to publish, and control points cannot subscribe and will not receive event messages from the service.

4.4 Eventing: Augmenting the UPnP Template Language

It is useful to augment the description of devices and services with annotations that are not captured in the UPnP Template Language. To a lesser extent, there is value in these annotations to capture event filtering, or moderation.

As explained above, some state variables may change value too rapidly for eventing to be useful. Below is a recommended vocabulary for UPnP Forum working committees or UPnP vendors to document moderation in the number of event messages sent due to changes in a variables value.

maximumRate=n
> Optional. State variable v will not be part of an event message more often than n seconds. If v is the only variable changing, then an event message will not be generated more often than every n seconds. If v ceases to change after an event message has been sent but before n seconds have transpired, an event message is sent with the new value of v. Recommended for variables that model continuously changing properties. Single integer.

minimumDelta=n
> Optional. State variable v will not be part of an event message unless its value has changed by more than n*allowedValueRange step since the last time an event message was sent that included v, e.g., unless v has been incremented n times. (cf. INCREMENT, INCREMENT_BOUNDED, and INCREMENT_WRAP explained in the section on Control.) Only defined variables with number and real data type. Recommended for variables that model counters. Single integer.

5. Presentation

Presentation is Step 5 in UPnP networking. Presentation comes after discovery (Step 1) where control points find interesting device(s), and after description (Step 2) where control points learn about device capabilities. Presentation exposes an HTML-based user interface for controlling and/or viewing device status. Presentation is complementary to control (Step 3) where control points send actions to devices, and eventing (Step 4) where control points listen to state changes in device(s).

After a control point has (1) discovered a device and (2) retrieved a description of the device, the control point is ready to begin presentation. If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device.

The URL for presentation is contained within the presentation URL element in the device description. The device description is delivered via a description message. The section on Description explains the device description and description messages in detail.

Retrieving a presentation page is a simple HTTP-based process and uses the following subset of the overall UPnP protocol stack. (The overall UPnP protocol stack is listed at the beginning of this document.)

At the highest layer, the presentation page is specified by a UPnP vendor. Moving down the stack, the UPnP Device Architecture specifies that this page be written in HTML. The page is delivered via HTTP over TCP over IP. For reference, colors in [square brackets] are included for consistency with other sections in this document.

To retrieve a presentation page, the control point issues an HTTP GET request to the presentation URL, and the device returns a presentation page.

Unlike the UPnP Device and Service Templates, and standard device and service types, the capabilities of the presentation page are completely specified by the UPnP vendor. The presentation page is not under the auspices of a UPnP Forum working committee. The page is an HTML page; it is version HTML 3.0 or later. However, other design aspects are left to the vendor to specify. This includes, but is not limited to, all capabilities of the control point's browser, scripting language or browser plug-ins used, and means of interacting with the device. To implement a presentation page, a UPnP vendor may wish to use UPnP mechanisms for control and/or eventing, leveraging the device's existing capabilities but is not constrained to do so.

GLOSSARY action
> Command exposed by a service. Takes one or more arguments but does not return values. For more information, see section on Control.

argument
> Parameter for action exposed by a service. For more information, see section on Control.

control point
> Retrieves device and service descriptions, sends actions to services, polls for service state variables, and receives events from services.

device
> Logical device. A container. May embed other logical devices. Embeds one or more services. For more information, see section on Description.

device definition
> Formal definition of a logical device, expressed in the UPnP Template Language. Written in XML syntax. Specified by a UPnP vendor by filling in the placeholders in a UPnP Device Template, including, e.g., manufacturer name, model name, model number, serial number, and URLs for control, eventing, and presentation. For more information, see section on Description.

device type
  Standard device types are denoted by urn:schemas-upnp-org:device: followed by a unique name assigned by a UPnP Forum working committee. One-to-one relationship with UPnP Device Templates. UPnP vendors may specify additional device types; these are denoted by urn:domain-name:device: followed by a unique name assigned by the vendor, where domain-name is a domain name registered to the vendor. For more information, see section on Description.

event
  Notification of one or more changes in state variables exposed by a service. For more information, see section on Eventing.

root device
  A logical device that is not embedded in any other logical device. For more information, see section on Description.

service
  Logical functional unit. Exposes actions and models the state of a physical device with state variables. For more information, see section on Control.

service definition
  Formal definition of a logical service, expressed in the UPnP Template language. Written in XML syntax. Specified by a UPnP vendor by filling in any placeholders in a UPnP Service Template. (Was SCPD.) For more information, see section on Control.

service type
  Standard service types are denoted by urn:schemas-upnp-org:service: followed by a unique name assigned by a UPnP forum working committee, colon, and a version number. One-to-one relationship with UPnP Service Templates. UPnP vendors may specify additional services; these are denoted by urn:domain-name:service: followed by a unique name assigned by the vendor, colon, and a version number, where domain-name is a domain name registered to the vendor. For more information, see section on Description.

SOAP
  Simple Object Access Protocol. A remote-procedure call mechanism based on XML that sends commands and receives values over HTTP. For more information, see section on Control.

SSDP
  Simple Service Discovery Protocol. A multicast discovery and search mechanism that uses a multicast variant of HTTP over UDP. For more information, see section on Discovery.

state variable
  Single facet of a model of a physical service. Exposed by a service. Has a name, data type, optional default value, optional constraints values, and may trigger events when its value changes. For more information, see section on Control.

UPnP Device Template
  Template listing device type, embedded devices (if any), and services. Written in XML syntax and derived from the UPnP Template Language. Defined by a UPnP Forum working committee. One-to-one relationship with standard device types. For more information, see section on Description.

UPnP Service Template
  Template listing action names, parameters for those actions, state variables, and properties of those state variables. Written in XML syntax and derived from the UPnP Template Language. Defined by a UPnP Forum working committee. One-to-one relationship with standard service types. For more information, see section on Control.

UPnP Template Language
  Defines the elements and attributes used in UPnP Device and Service Templates. Written in XML syntax and derived from XML Schema (Part 1: Structures, Part 2: Datatypes). Defined by the UPnP Device Architecture herein. For more information, see sections on Description and Control.

(End of Appendix)

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of programmatically controlling a service of a logical device realized on a first computer from software programs running on a second computer, the method comprising:
  from the first computer, obtaining at the second computer a service description message related to the service, the service description message detailing a service state table including at least one property associated with the service and a set of actions that can be invoked on the service via network data messages conveyed to the first computer via peer-to-peer networking connectivity over a data communications network connecting the first and the second computer, the set of actions comprising at least one action previously not available for invocation by the software programs running on the second computer;
  based on the service description message, creating a service object corresponding to the service, the service object exposing a programming interface to access by software programs running on the second computer, the programming interface comprising an action-invoking member for invoking the set of actions listed in the service description including the at least one action previously not available for invocation by the software programs running on the second computer;

based on the service description message, converting a programmatic invocation of the action-invoking member of the programming interface by a software program running on the second computer into a network data message for invoking one or more of the set of actions of the service via peer-to-peer networking connectivity over the data communications network; and transmitting the network data message to the first computer to thereby invoke the one or more of the set of actions of the service.

2. The method of claim 1 wherein the network data message for invoking the action is a mark-up language text message.

3. The method of claim 1 wherein the programming interface is an object integration interface according to an object-oriented programming model.

4. The method of claim 3 wherein the programming interface is a run-time dispatching interface.

5. The method of claim 1 wherein the action-invoking member accepts an invocation parameter indicating the action of the service that is to be invoked.

6. The method of claim 1 wherein the programming interface further has a service state-querying method member, the method further comprising:

responsive to programmatic invocation of the service state-querying method member by the software programs running on the second computer, obtaining state data of the service via peer-to-peer networking connectivity over the data communications network;

updating the service state table; and returning the state data to the invoking software program.

7. The method of claim 1 wherein the programming interface further has a service state-querying method member that accepts an invocation parameter indicative of a state data variable of the service, the method further comprising:

responsive to programmatic invocation of the service state-querying method member by the software programs running on the second computer, obtaining a value of the state data variable of the service via peer-to-peer networking connectivity over the data communications network;

updating the service state table with the obtained value; and returning a datum indicative of the value of the state data variable to the invoking software program.

8. In a networking environment providing peer-to-peer connectivity between logical devices on separate computing machines on a data communications network in accordance with a control protocol, a user-operated control device comprising:

a rehydrating module operable for:

receiving the control protocol defining an exchange between a control point and a controlled logical device service in which the controlled logical device service furnishes the control protocol to the control point in a service description message, the service description message specifying a set of actions invocable on the controlled logical device service, the set of actions comprising at least one action previously not available for invocation by the control point; and the rehydrating module further operable for creating a service object for exposing an application programming interface based on the service description message for invoking set of actions specified in the service description message including the at least one action previously not available for invocation by the control point;

the application programming interface exposed by the rehydrating module to access from application software running on the user-operated control device, the application programming interface having an invoke action member operable for invoking the set of actions specified in the service description message including the at least one action previously not available for invocation by the control point;

invoke action member-implementing code of the rehydrating module operating responsive to an invocation of the invoke action member to generate a peer networking data message to cause the controlled logical device service to perform a respective action of the controlled logical device service; and converting code of the rehydrating module operating to construct the peer networking data message based on the control protocol obtained via the service description message.

9. The user-operated control device of claim 8 wherein the application programming interface is an object integration interface conforming to an object-oriented programming model.

10. The user-operated control device of claim 9 wherein the application programming interface is a run-time method invocation dispatching interface.

11. The user-operated control device of claim 8 wherein the peer networking data message is a mark-up language text message.

12. A computer-readable data storage medium having software program code carried thereon, the software program code comprising:

a programmatic peer networking device service control module providing programmatic control of logical device services on a computing device by application software running on a different computing device on a data communications network via a peer-to-peer networking connectivity service control protocol;

an application programming interface for access by the application software, the application programming interface exposed by a service object created based on a service description message comprising a set of actions invocable on the logical device services, the service object created by the programmatic peer networking device service control module, the application programming interface being a run-time dispatch interface having an invoke service action method member, the invoke service action method member accepting an action identifier, ingoing action arguments, outgoing action arguments, and action return value as parameters upon invocation by the application software, wherein the action identifiers, the ingoing action arguments, the outgoing action arguments and the action return values correspond to those of the set of actions specified in the service description message and are specified therein, the set of actions including at least one action not available for invocation by application software previous to the creation of the service object; and invoke service action method member-implementing code of the programmatic peer networking device service control module operating responsive to an invocation of the invoke service action method member on the application programming interface by the application software to exchange data messages with a logical device service of a separate computing device on the data communications network in accordance with the peer-to-peer networking connectivity service control protocol so as to invoke an action of the logical device service including the at least one action not available for invocation by application software previous to the creation of the service object as per the parameters of the invoke service action method member and pass outgoing action arguments and action return value from the logical device service back to the application software.

13. The computer-readable data carrying medium of claim 12 wherein the software program code further comprises:
service description requesting code of the programmatic peer networking device service control module operating to obtain a service description of the logical device service via an exchange of data messages with the logical device service of the separate computing device on the data communications network in accordance with the peer-to-peer networking connectivity service control protocol.

14. The computer-readable data carrying medium of claim 13 wherein the software program code further comprises:
service control data messaging code of the programmatic peer networking device service control module operating based on the service description to construct the data messages for exchange with the logical device service in accordance with the peer-to-peer networking connectivity service control protocol to invoke the action of the logical device service.

15. The computer-readable data carrying medium of claim 14 wherein the data messages for exchange with the logical device service are mark-up language text messages.

16. A software module carried on a computer-executable software storage medium, the software module operable for:
providing programmatic control of a logical device running on a computing device by an application software on a different computing device over a data communications network by exposing a programming interface for providing programmatic logical device service control via peer networking connectivity, the programming interface comprising:
an invoke action method member having parameters for passing an action identifier, action arguments and action return value;
wherein an implementation of the invoke action method member in the software module converts an invocation of the invoke action method member into an exchange of text messages with the logical device via peer networking connectivity based on a service description obtained from the logical device to control a service of the logical device; and
a logical device state call back method member having parameters for passing a reference to a call back interface for reporting change of the logical device's state to other registered devices on the network.

17. The software module of claim 16 wherein the programming interface further comprises a state variable querying method member having parameters for passing a state variable identifier and state variable value relating to a logical device state variable.

18. The software module of claim 16 wherein the programming interface further comprises a service type querying method member having parameters for returning a type identifier relating to a service of the logical device.

19. The software module of claim 16 wherein the programming interface further comprises status method members having parameters for returning a value indicative of a status of controlling the service of the logical device.

20. The software module of claim 16 wherein the programming interface is an object integration interface conforming to an object-oriented programming model.

21. The software module of claim 16 wherein the programming interface is a run-time method invocation dispatching interface.

\* \* \* \* \*